US012790009B2

(12) United States Patent
Carle et al.

(10) Patent No.: US 12,790,009 B2
(45) Date of Patent: Nov. 10, 2026

(54) AIRCRAFT WITH AN UNDUCTED FAN PROPULSOR

(71) Applicant: General Electric Company, Evendale, OH (US)

(72) Inventors: Sara Elizabeth Carle, Columbus, OH (US); Daniel L. Tweedt, West Chester, OH (US); Syed Arif Khalid, West Chester, OH (US); Andrew Breeze-Stringfellow, Montgomery, OH (US); William Bowden, Cleves, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/387,115

(22) Filed: Nov. 12, 2025

(65) Prior Publication Data

US 2026/0070667 A1 Mar. 12, 2026

Related U.S. Application Data

(63) Continuation-in-part of application No. PCT/US2024/040754, filed on Aug. 2, 2024, which is (Continued)

(51) Int. Cl.
*B64D 27/18* (2006.01)
*F02K 3/02* (2006.01)

(52) U.S. Cl.
CPC ................ *B64D 27/18* (2013.01); *F02K 3/02* (2013.01); *F05D 2200/13* (2013.01);

(Continued)

(58) Field of Classification Search
CPC ....... B64D 27/12; B64C 11/305; B64C 11/48; F01D 5/022
See application file for complete search history.

(56) References Cited

U.S. PATENT DOCUMENTS 5,079,916 A 1/1992 Johnson
5,135,185 A 8/1992 Adamson (Continued)

FOREIGN PATENT DOCUMENTS

CN 109139259 1/2019
CN 111120101 5/2020

(Continued)

OTHER PUBLICATIONS

Edkins et al., "TF34 Turbofan Quiet Engine Study Final Report," NASA CR-120914, Dec. 31, 1972, retrieved on May 23, 2022 from https://ntrs.nasa.gov/citations/19720026093.

(Continued)

*Primary Examiner* — Joshua J Michener
*Assistant Examiner* — Cindi M Curry
(74) *Attorney, Agent, or Firm* — Fitch, Even, Tabin & Flannery LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor. The unducted fan propulsors can also include a first VPF parameter within a range of 0.10 to 0.40 and defined as the hub-to-tip radius ratio divided by the fan pressure ratio and/or a second VPF parameter within a range of 1-30 lbf/in$^2$ and defined as the bearing spanwise force divided by the fan area. In certain examples, the unducted fan propulsor further includes a pitch change mechanism and/or a gearbox.

20 Claims, 38 Drawing Sheets

Related U.S. Application Data a continuation-in-part of application No. 18/652,052, filed on May 1, 2024, now Pat. No. 12,384,522, which is a continuation-in-part of application No. 18/230,609, filed on Aug. 4, 2023, now Pat. No. 12,365,471.

(52) U.S. Cl.
CPC .... *F05D 2200/14* (2013.01); *F05D 2200/221* (2013.01); *F05D 2220/323* (2013.01)

(56) References Cited

U.S. PATENT DOCUMENTS

| | | | | |
|---|---|---|---|---|
| 5,136,185 | A | 8/1992 | Fleming | |
| 5,199,850 | A | 4/1993 | Carvalho | |
| 7,901,185 | B2 | 3/2011 | Suciu | |
| 8,714,475 | B2 | 5/2014 | Gall | |
| 8,998,577 | B2 | 4/2015 | Gustafson | |
| 9,242,721 | B2 | 1/2016 | Neuteboom | |
| 9,567,090 | B2 | 2/2017 | Gallet | |
| 9,759,160 | B2 | 9/2017 | Sankrithi | |
| 10,040,559 | B2 | 8/2018 | Hoisington | |
| 10,072,510 | B2 | 9/2018 | Miller | |
| 10,288,083 | B2 | 5/2019 | Miller | |
| 10,442,541 | B2 | 10/2019 | Miller | |
| 10,618,667 | B2 | 4/2020 | Keller | |
| 10,669,881 | B2 | 6/2020 | Breeze-Stringfellow | |
| 10,907,495 | B2 | 2/2021 | Breeze-Stringfellow | |
| 11,136,109 | B2 | 10/2021 | Wood | |
| 11,262,144 | B2 * | 3/2022 | Breeze-Stringfellow | F02K 3/06 |
| 11,454,195 | B2 | 9/2022 | Niergarth | |
| 11,946,437 | B2 | 4/2024 | Niergarth | |
| 12,000,344 | B2 | 6/2024 | Levisse | |
| 12,280,883 | B2 * | 4/2025 | Bowden | B64D 27/402 |
| 12,305,579 | B2 | 5/2025 | Taillant | |
| 12,313,081 | B2 | 5/2025 | Frantz | |
| 12,320,305 | B2 | 6/2025 | Martinez Luque | |
| 12,359,588 | B1 * | 7/2025 | Khalid | F01D 21/003 |
| 12,365,446 | B2 | 7/2025 | Carle | |
| 12,365,471 | B2 | 7/2025 | Carle | |
| 12,378,933 | B2 | 8/2025 | Fefermann | |
| 12,384,522 | B2 | 8/2025 | Carle | |
| 12,448,139 | B2 * | 10/2025 | Bowden | B64D 29/02 |
| 12,577,925 | B2 * | 3/2026 | Miller | F02C 3/06 |
| 2012/0119023 | A1 | 5/2012 | Moore | |
| 2016/0265547 | A1 | 9/2016 | Fulayter | |
| 2017/0122119 | A1 | 5/2017 | Niergarth | |
| 2017/0138207 | A1 | 5/2017 | Niergarth | |
| 2017/0138306 | A1 | 5/2017 | Miller | |
| 2017/0138370 | A1 | 5/2017 | Miller | |
| 2017/0218975 | A1 | 8/2017 | Bintz | |
| 2018/0362170 | A1 * | 12/2018 | Stuart | B64D 27/12 |
| 2018/0363678 | A1 | 12/2018 | Kroger | |
| 2019/0185170 | A1 | 6/2019 | Schelfaut | |
| 2021/0003139 | A1 | 1/2021 | Miller | |
| 2021/0108597 | A1 | 4/2021 | Marion | |
| 2022/0042461 | A1 | 2/2022 | Molesini | |
| 2023/0021836 | A1 | 1/2023 | Riddle | |
| 2024/0410319 | A1 | 12/2024 | Becoulet | |
| 2025/0018895 | A1 | 1/2025 | Howell | |
| 2025/0052165 | A1 | 2/2025 | Becoulet | |
| 2025/0075636 | A1 | 3/2025 | Frantz | |
| 2025/0101930 | A1 | 3/2025 | Auriol | |
| 2025/0116203 | A1 | 4/2025 | Olivier | |
| 2025/0129724 | A1 | 4/2025 | Millier | |
| 2025/0137407 | A1 | 5/2025 | Becoulet | |
| 2025/0188951 | A1 | 6/2025 | Lebeault | |
| 2025/0197014 | A1 | 6/2025 | Gea Aguilera | |
| 2026/0008550 | A1 | 1/2026 | Carle | |
| 2026/0015090 | A1 | 1/2026 | Carle | |

FOREIGN PATENT DOCUMENTS

| | | | |
|---|---|---|---|
| EP | 3067566 | | 9/2016 |
| EP | 3135922 | | 3/2017 |
| EP | 3597896 | | 1/2020 |
| FR | 3046438 | | 7/2017 |
| FR | 3129428 | A1 | 5/2023 |
| FR | 3129436 | A1 | 5/2023 |
| FR | 3129690 | A1 | 6/2023 |
| FR | 3129970 | A1 | 6/2023 |
| FR | 3129972 | A1 | 6/2023 |
| FR | 3130313 | A1 | 6/2023 |
| FR | 3130747 | A1 | 6/2023 |
| FR | 3130874 | A1 | 6/2023 |
| FR | 3130875 | A1 | 6/2023 |
| FR | 3130895 | A1 | 6/2023 |
| FR | 3130897 | A1 | 6/2023 |
| FR | 3132729 | A1 | 8/2023 |

OTHER PUBLICATIONS

General Electric Company, "Quiet Clean Short-Haul Experimental Engine (QC SEE)—Under-the-Wing (LJTW) Final Design Report," Jun. 1, 1977, retrieved on May 23, 2022 from https://ntrs.nasa.gov/citations/19800075257.

Schaefer et al., Dynamics of High-Bypass-Engine Thrust Reversal Using a Variable-Pitch Fan. No. NASA-TM-X-3524, May 1, 1977.

"Could an open fan engine cut carbon emissions for more sustainable aviation?"; https://www.airbus.com/en/newsroom/stories/2022-07-could-an-open-fan-engine-cut-carbon-emissions-for-more-sustainable; Jul. 19, 2022; 3 pgs.

Antonov An-70—Price, Specs, Photo Gallery, History—Aero Corner; https://aerocorner.com/aircraft/antonov-an-70/#lg=1&slide=5; Site was known as early as Dec. 2021; 5 pgs.

Attariwala, Joetey; "Coming to a Theatre near You"; published Feb./Mar. 2016 Issue (Oct. 26, 2017); https://www.armadainternational.com/2017/10/airbus-a400m-strategic-turboprop-freighter-programme/; 9 pgs.

* cited by examiner

| ENGINE | ENGINE TYPE | FAN BLADES | FAN TIP SPEED (ft/s) | FAN RADIUS RATIO ("RR") | FAN PRESSURE RATIO ("FPR") | FAN CENTER OF GRAVITY (in) | FAN REDLINE SPEED (rad/s) | FAN MASS (lbm) | F_SPAN (lbf) | FAN_AREA ($in^2$) | RR/FPR | F_SPAN/ FAN_AREA ($lbf/in^2$) |
|---|---|---|---|---|---|---|---|---|---|---|---|---|
| 1 | UNDUCTED | 12 | 805 | 0.26 | 1.07 | 39.4 | 128.8 | 48.1 | 81293 | 17851 | 0.24 | 4.55 |
| 2 | UNDUCTED | 12 | 805 | 0.22 | 1.07 | 36.8 | 130.1 | 47.1 | 76038 | 17851 | 0.2 | 4.26 |
| 3 | UNDUCTED | 12 | 805 | 0.16 | 1.07 | 33.7 | 131.5 | 46 | 69397 | 17851 | 0.15 | 3.89 |
| 4 | UNDUCTED | 10 | 735 | 0.42 | 1.08 | 43.1 | 126 | 22.5 | 39632 | 12751 | 0.39 | 3.11 |
| 5 | UNDUCTED | 8 | 735 | 0.41 | 1.08 | 42.6 | 126 | 21.5 | 37459 | 12879 | 0.38 | 2.91 |
| 6 | UNDUCTED | 14 | 760 | 0.29 | 1.07 | 38.4 | 118 | 40.0 | 55219 | 17275 | 0.27 | 3.20 |
| 7 | UNDUCTED | 12 | 760 | 0.29 | 1.07 | 38.8 | 118 | 45.5 | 63335 | 17275 | 0.27 | 3.67 |
| 8 | UNDUCTED | 14 | 798 | 0.27 | 1.07 | 35.6 | 128 | 45.5 | 68624 | 16296 | 0.25 | 4.21 |
| 9 | UNDUCTED | 12 | 702 | 0.27 | 1.07 | 33.5 | 122 | 41.7 | 53989 | 13875 | 0.25 | 3.89 |
| 10 | UNDUCTED | 12 | 684 | 0.27 | 1.07 | 46.0 | 90 | 65.3 | 62910 | 24203 | 0.25 | 2.60 |
| 11 | UNDUCTED | 14 | 684 | 0.27 | 1.07 | 41.8 | 96 | 43.3 | 43464 | 21142 | 0.25 | 2.06 |
| 12 | UNDUCTED | 12 | 798 | 0.27 | 1.07 | 38.4 | 115 | 48.5 | 63279 | 20319 | 0.25 | 3.11 |
| 13 | UNDUCTED | 12 | 798 | 0.27 | 1.07 | 41.5 | 107 | 58.6 | 71421 | 23508 | 0.25 | 3.04 |

FIG. 28

AIRCRAFT WITH AN UNDUCTED FAN PROPULSOR

CROSS-REFERENCE TO RELATED APPLICATIONS

This application is a continuation-in-part of International Appl. No. PCT/US2024/040754, filed Aug. 2, 2024, which claims priority to U.S. patent application Ser. No. 18/230,609, filed on Aug. 4, 2023, and Ser. No. 18/652,052, filed May 1, 2024, the latter of which is a continuation-in-part of the former, the disclosures of which are hereby incorporated by reference in their entireties.

FIELD

The present disclosure relates generally to an aircraft with a fan propulsor.

BACKGROUND

Winged aircraft have undermounted propulsors in the form of a turboprop engine. The addition of a propulsor to a wing can lead to installation penalties, including increased drag. As the size of the undermounted propulsor increases, installation penalties can also increase, such as increased weight.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which:

FIG. 28 depicts various fan parameters of several exemplary turbomachinery engines comprising unducted variable pitch fans.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "or" when used herein shall be interpreted as having a disjunctive construction rather than a conjunctive construction unless otherwise specifically indicated.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

"Airfoil section" and "effective quarter chord point (QC)" are defined as follows.

Figure 6A:
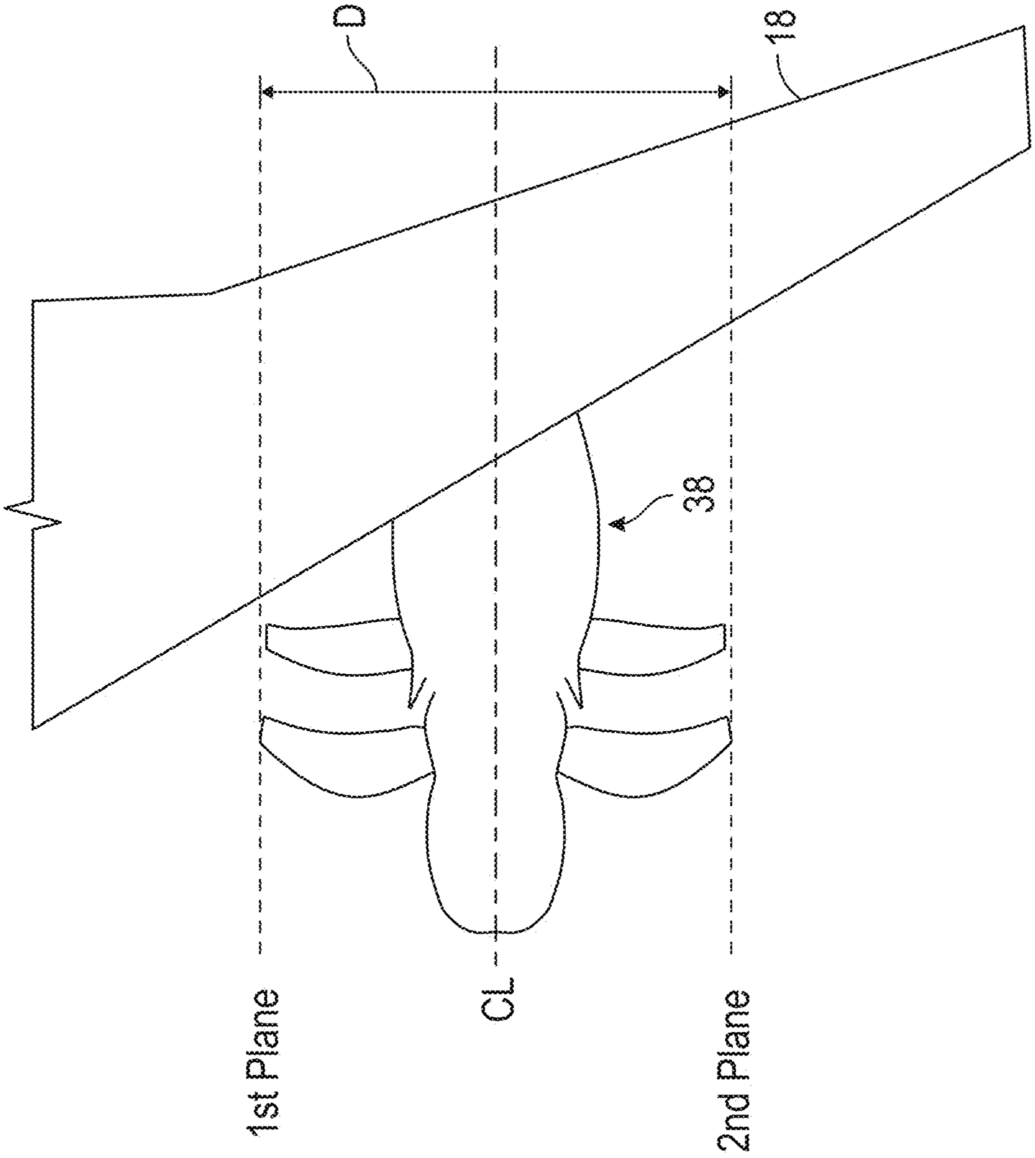
FIG. 6A comprises a top plan view of the propulsor of FIG. 4 and inboard and outboard locations of the wing relative to an unducted fan propulsor centerline, with the inboard and outboard locations in FIG. 6A used to determine a chord length (C) of the airfoil section in FIG. 4.
Figure 6B:
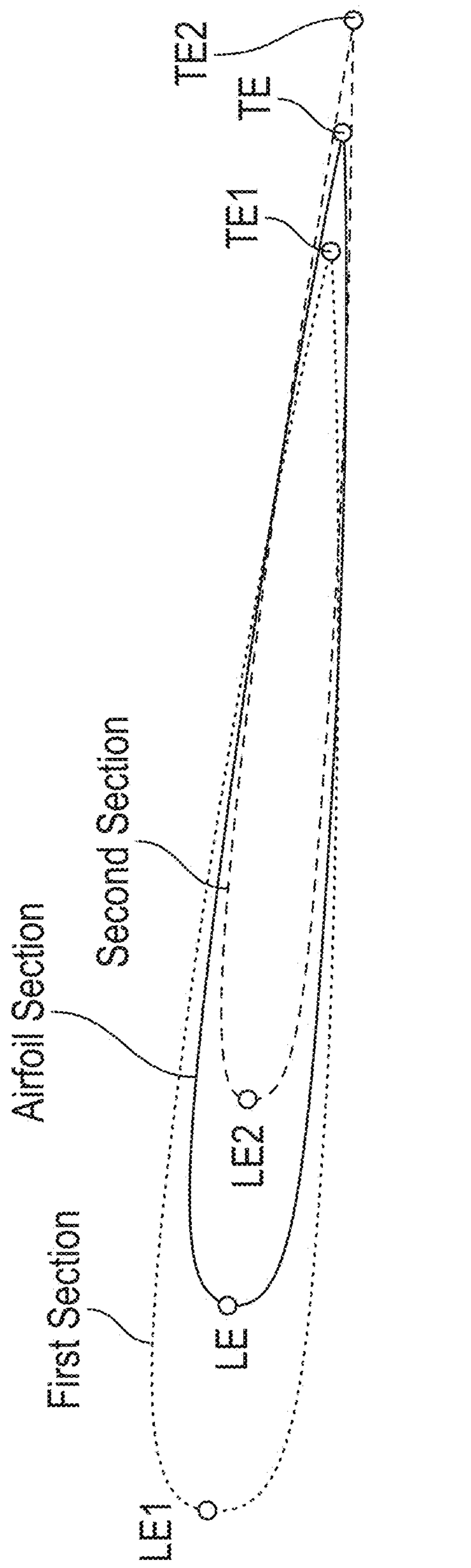
FIG. 6B comprises a schematic side elevation view of a first section and a second section of the aircraft wing, which sections are used to determine an effective quarter chord point (QC) of the airfoil section in FIG. 4.

"Airfoil section" is defined as the average of a first offset plane section and a second offset plane section of an airfoil (e.g., an airfoil associated with a horizontal stabilizer or wing of an aircraft), where the first offset plane section is the section of the airfoil taken at a first plane and the second offset plane section is the section of the airfoil taken at a second plane, the first and second planes each being offset in a direction perpendicular to, and equidistant from a central plane by a distance of ½ of a fan diameter (D) of rotating blades of a propulsor mounted to the portion of the aircraft body associated with the airfoil section (wing or horizontal stabilizer). The first plane is inboard of the central plane (towards the fuselage) and the second plane is outboard of the central plane. When the aircraft is on the ground, both the gravity vector and axis of rotation of the rotating blades lie in the central plane. The intersection of the first offset plane with the airfoil defines a first section having a first section leading edge (LE1) and a first section trailing edge (TE1), with the LE1 at the forward-most point of the first section and the TE1 at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIGS. 6 and 6B. An "Airfoil Section" defined herein has its leading and trailing edges TE, LE determined in this manner. "Effective Quarter-chord point" ("QC") is defined as ¼ of the distance from the leading edge LE of the airfoil section determined in the foregoing manner, measured along the chord of this airfoil section. QC is dependent on the fan diameter (D) because the airfoil section LE and TE values change if D for the unducted fan propulsor changes.

"Cruise Speed" refers to aircraft speed and applies to a vehicle with a cruising altitude up to approximately 65,000 ft. In certain embodiments, cruise altitude is between approximately 28,000 ft. and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

It is understood that the plurality blades, whether forward or rearward, may have a variation of root forward-most points and root rearward-most points. This can be due to both installed position as well as orientation in the case of variable pitch blades. For purposes of defining the distances TRL, RTL, and VTL it is understood that a rotating blade or rotating array of blades are orientated such that the respective leading edges of the blades are in their most forward position, e.g., a feathered position. The respective trailing edge position is also obtained when the leading edge is in the most forward position. For purposes of defining the distances TRL, RTL, and VTL it is understood that the forward or leading edge or rearward or trailing edge of a stationary blade (or vane) or array of stationary blades (or vanes) is the most forward or leading edge position across the array of vanes or the most rearward or trailing edge position across the array of vanes.

"Blade" can refer to a stationary or rotating blade. "Stationary blade(s)" has the same meaning as "vane(s)".

Figure 3:
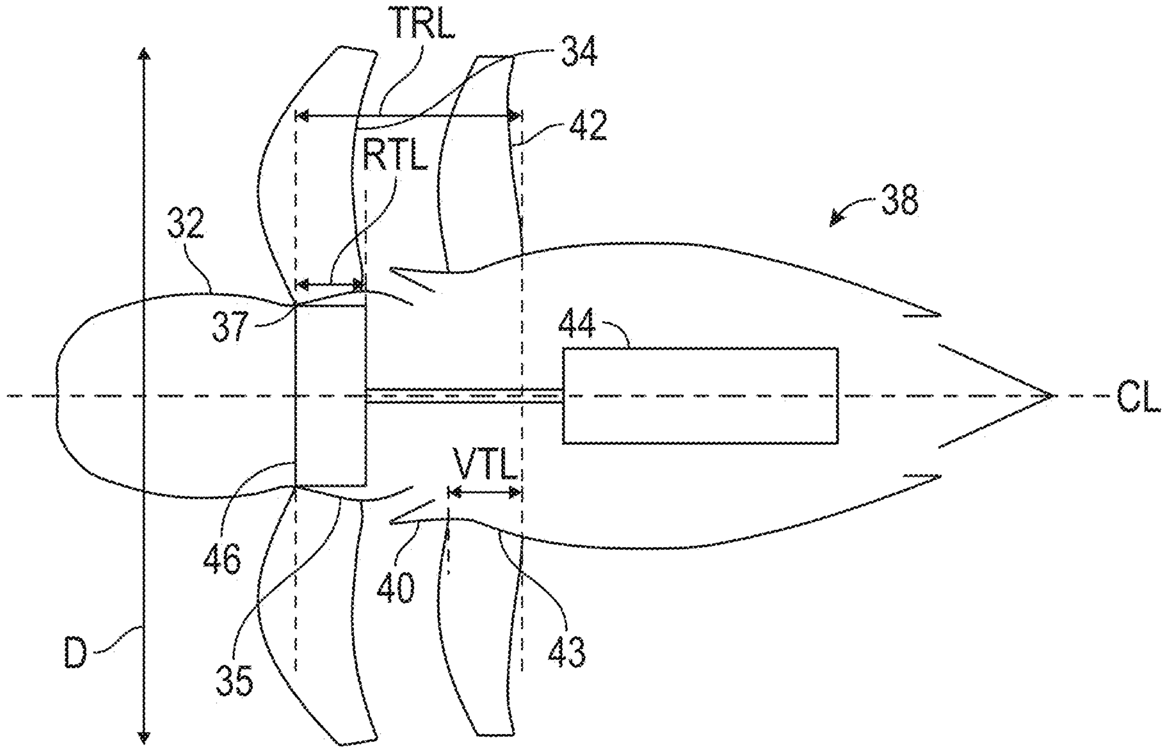
FIG. 3 comprises an elevational cross-sectional view of an exemplary unducted fan propulsor having a plurality of blades arranged in a forward array and a rearward array.
Figure 12:
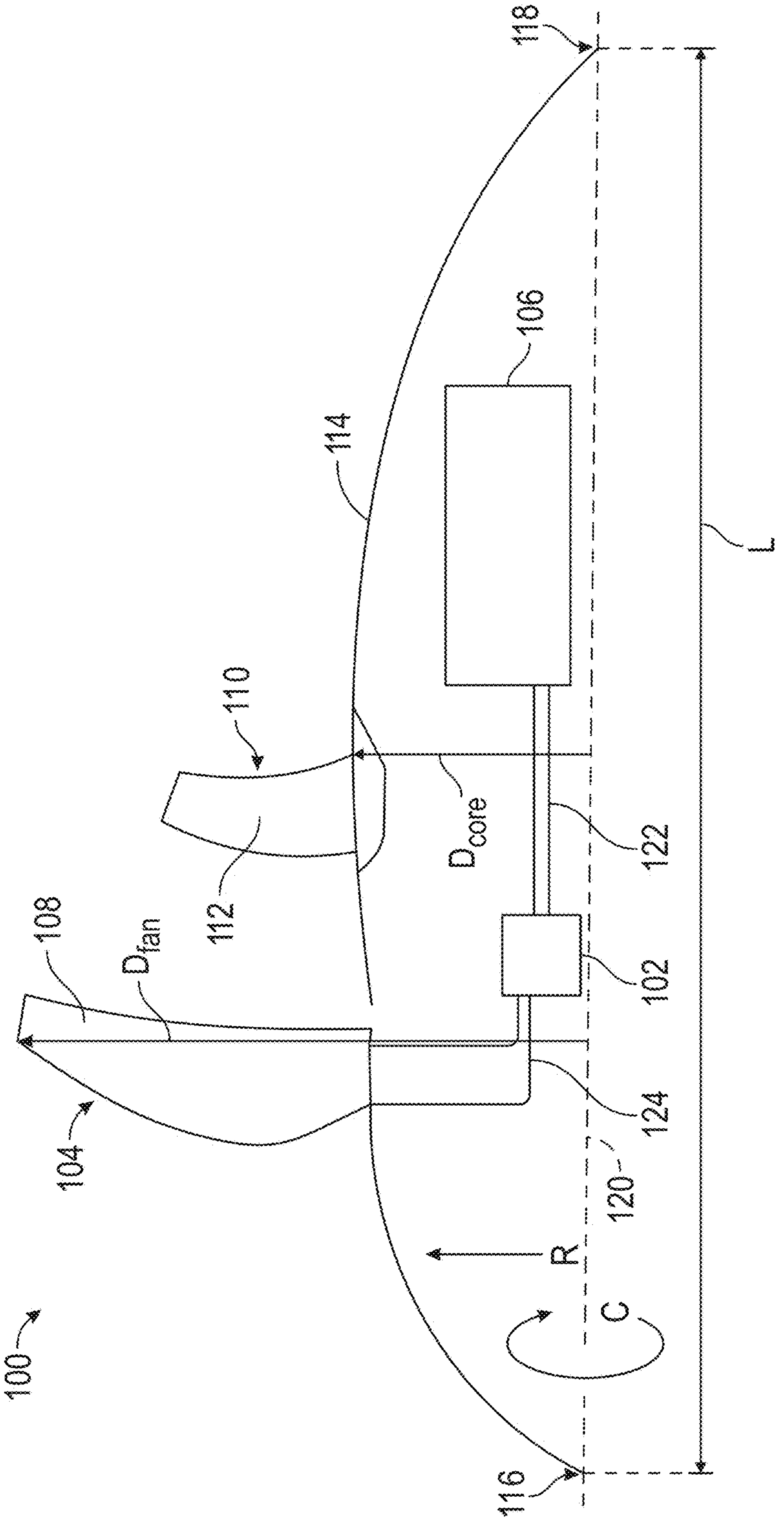
FIG. 12 depicts a cross-sectional schematic illustration of an exemplary embodiment of a turbomachinery engine configured with an open rotor propulsion system and a variable pitch fan.
Figure 13:
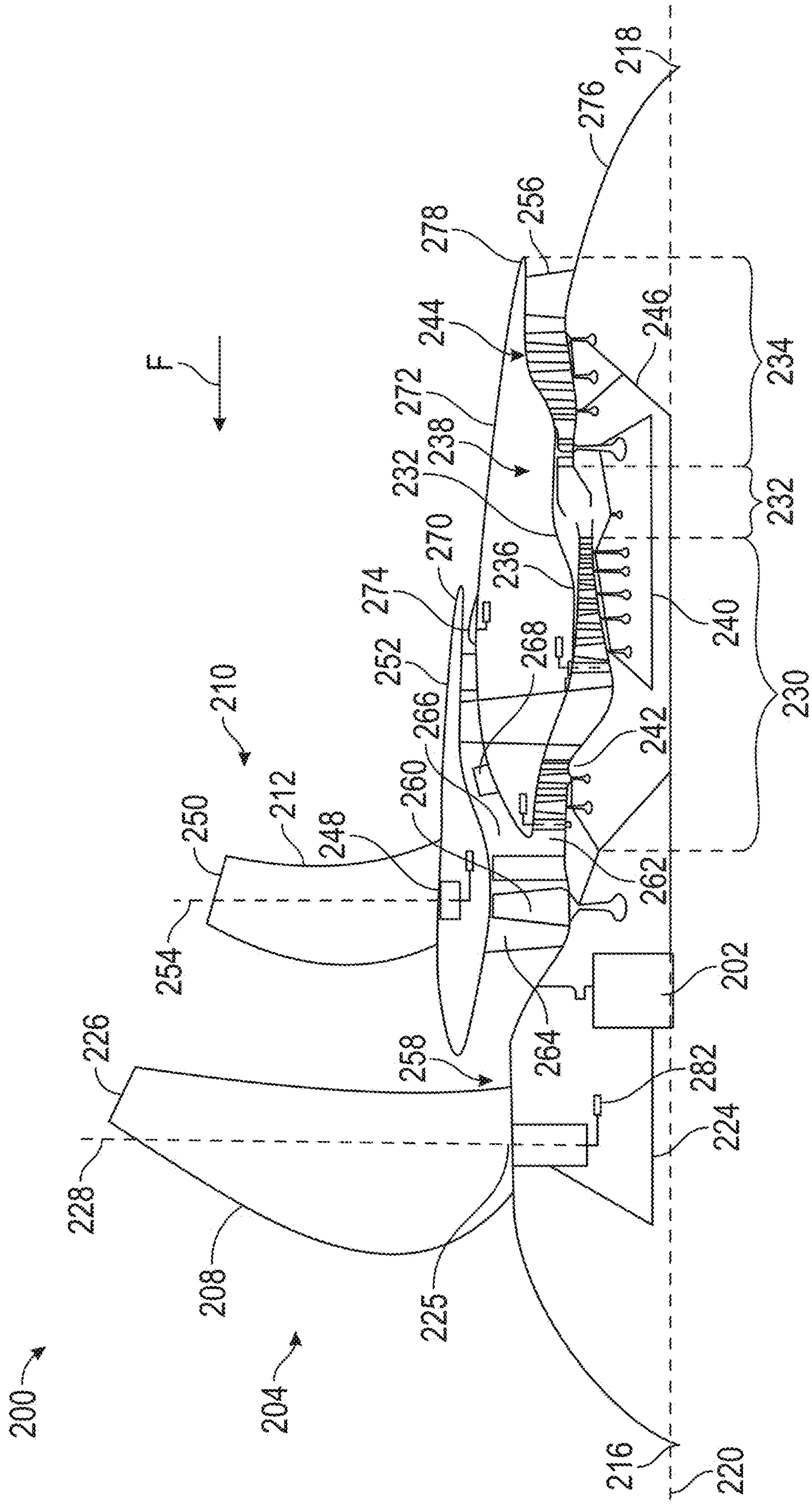
FIG. 13 depicts a cross-sectional schematic illustration of an exemplary embodiment of a turbomachinery engine comprising an open rotor propulsion system, a variable pitch fan, a three-stream architecture, and one or more heat exchangers in a third stream of the three-stream architecture.

"Unducted fan propulsor" as used herein means an aircraft engine characterized by an array of rotating fan blades and static (or non-rotating), outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or fan nacelle. FIGS. 3, 12, and 13 depicts examples of unducted fan propulsors. Unducted fan propulsors can also be referred to herein as "turbomachinery engines," "unducted turbomachinery engines," or "open rotor turbomachinery engines." Additionally, the term unducted fan propulsor means an unducted, fan driven aircraft engine capable of providing thrust to an aircraft to enable cruise flight speeds between 0.7 Mach and 0.90 Mach, or 0.75 to 0.85 Mach.

"Aircraft" means a vehicle having a wing (and/or horizontal stabilizer), an airfoil defined by the wing (and/or horizontal stabilizer), and one or two unducted fan propulsors mounted to the wing, and the aircraft is operable at cruise flight speeds between 0.7 Mach and 0.90 Mach, or 0.75 to 0.85 Mach.

"Fuselage centerplane" ("FCP") is defined as a plane that is located equidistant from the wingtips, intersecting the fuselage, and containing the gravity vector when the aircraft is on the ground.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

The inventors were faced with a problem of how to improve thrust delivered to an aircraft by an unducted fan propulsor without increasing the required engine power delivered to the unducted fan of the unducted fan propulsor.

It was surprisingly found that the solution to this problem is heavily dependent on the location of the unducted fan propulsor relative to the aircraft wing.

The inventors found that installing an unducted fan propulsor presents the challenge of addressing penalties that can result due to the interaction with the rest of the aircraft. The manner in which these penalties are addressed according to the claimed subject matter is unique for this type of engine.

An unducted fan propulsor is particularly challenged due to the scrubbing and interference drags relative to a ducted turbofan. That additional drag then results in a higher thrust needed from the propulsor. Generally, higher thrust for a ducted turbofan comes with a larger power requirement and thus more fuel flow. For the unducted fan propulsor it was surprisingly found by placing the engine so that it can take advantage of the high pressure flow induced by the wing (and/or a horizontal stabilizer), engine thrust may increase without increasing the power requirement on the engine. This placement of the engine relative to the wing then acts to offset the scrubbing and interference drag, thus not increasing the required fuel (or reducing the increased fuel flow required for a non-optimum engine placement). The inventors found that increased drag effects associated with an unducted fan propulsor, rather than addressed directly, may instead be offset by placing the engine at a more optimal location relative to the wing.

Additionally, the inventors found that the installed engine's improved position also positively influences the noise produced by the wing-engine interaction during flight at cruise conditions.

It was surprisingly found that by adapting a particular location on an unducted fan propulsor relative to an aircraft wing's effective quarter chord point (QC), the desired result of offsetting interference and scrubbing drag without increasing the power delivered to the fan could be achieved for an unducted fan propulsor.

It was also found that the improved position is dependent on the fan blade size of the unducted fan propulsor.

As explained below, after recognizing the novel flow characteristics associated with an unducted fan propulsor installed on an aircraft, taking into account the limitations on where to place this propulsor, the inventors were surprisingly able to establish criteria for positioning the propulsor relative to an aircraft wing to offset interference and scrubbing effects by defining a midpoint (P) location between external output guide vanes (OGV) or input guide vanes (IGV) and a forward or aft rotating array of fan blades, respectively, and additionally defining the distance from the effective quarter chord point (QC) to P. The position of P relative to QC and QC itself were found dependent on the rotating fan diameter. The correlation of these parameters to offset interference and scrubbing effects was not used before and was the surprising finding of the inventors for an unducted fan propulsor. Thus, mounting unducted fan propulsors relative to the effective quarter-chord point (QC) and fan blade size as described in embodiments provided herein offsets interference and scrubbing effects associated with an unducted fan propulsor and is an improvement over other mounting locations, including conventional mounting locations that are more forward of, and more in line with, a wing chord line.

Various aspects of the present disclosure describe aspects of an aircraft characterized in part by a specific relation between an effective quarter chord point (QC) of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 1:
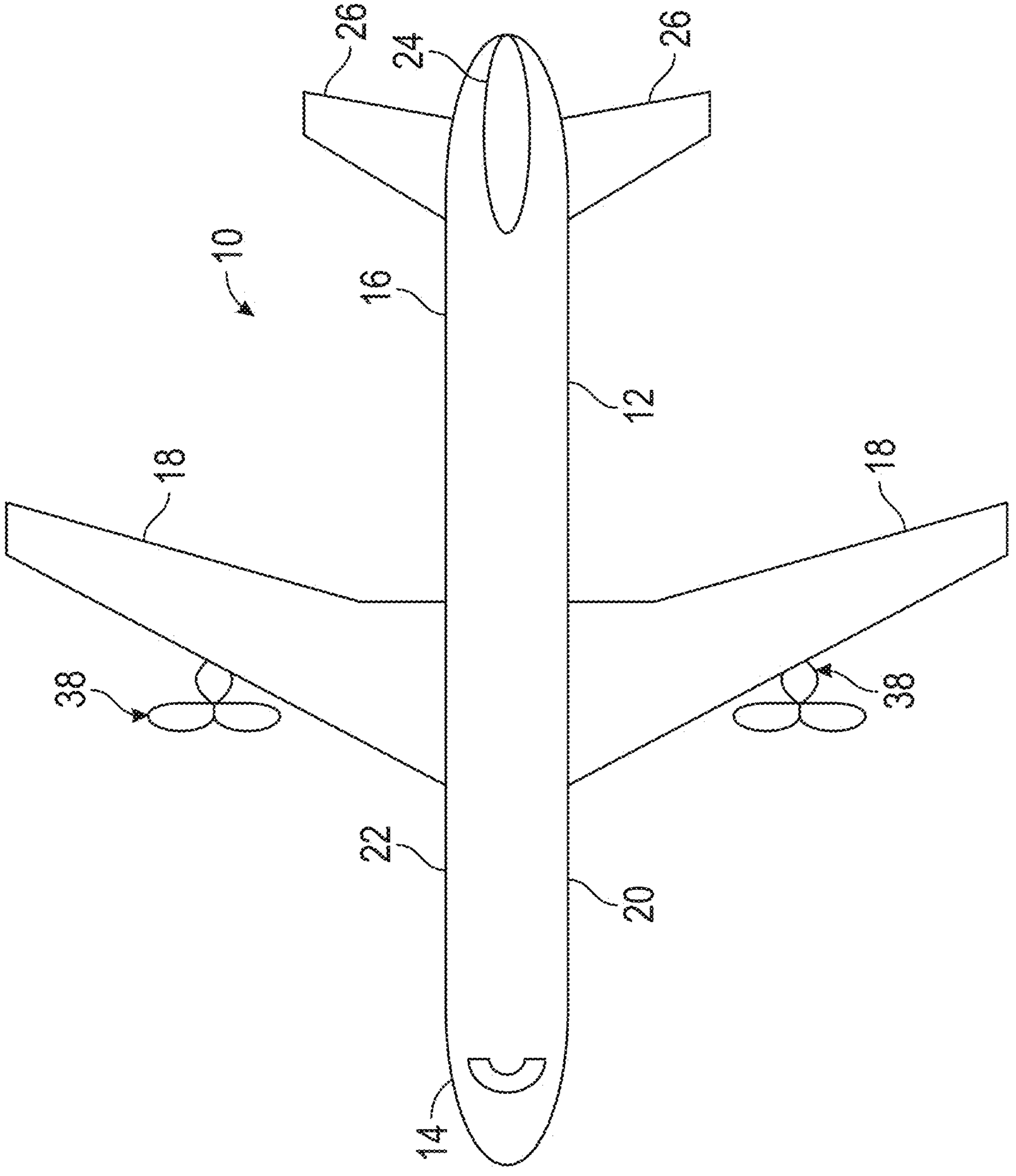
FIG. 1 comprises atop plan view of an aircraft as configured in accordance with various embodiments of these teachings, with undermounted, unducted fan propulsors mounted on forward wings of the aircraft.
Figure 2:
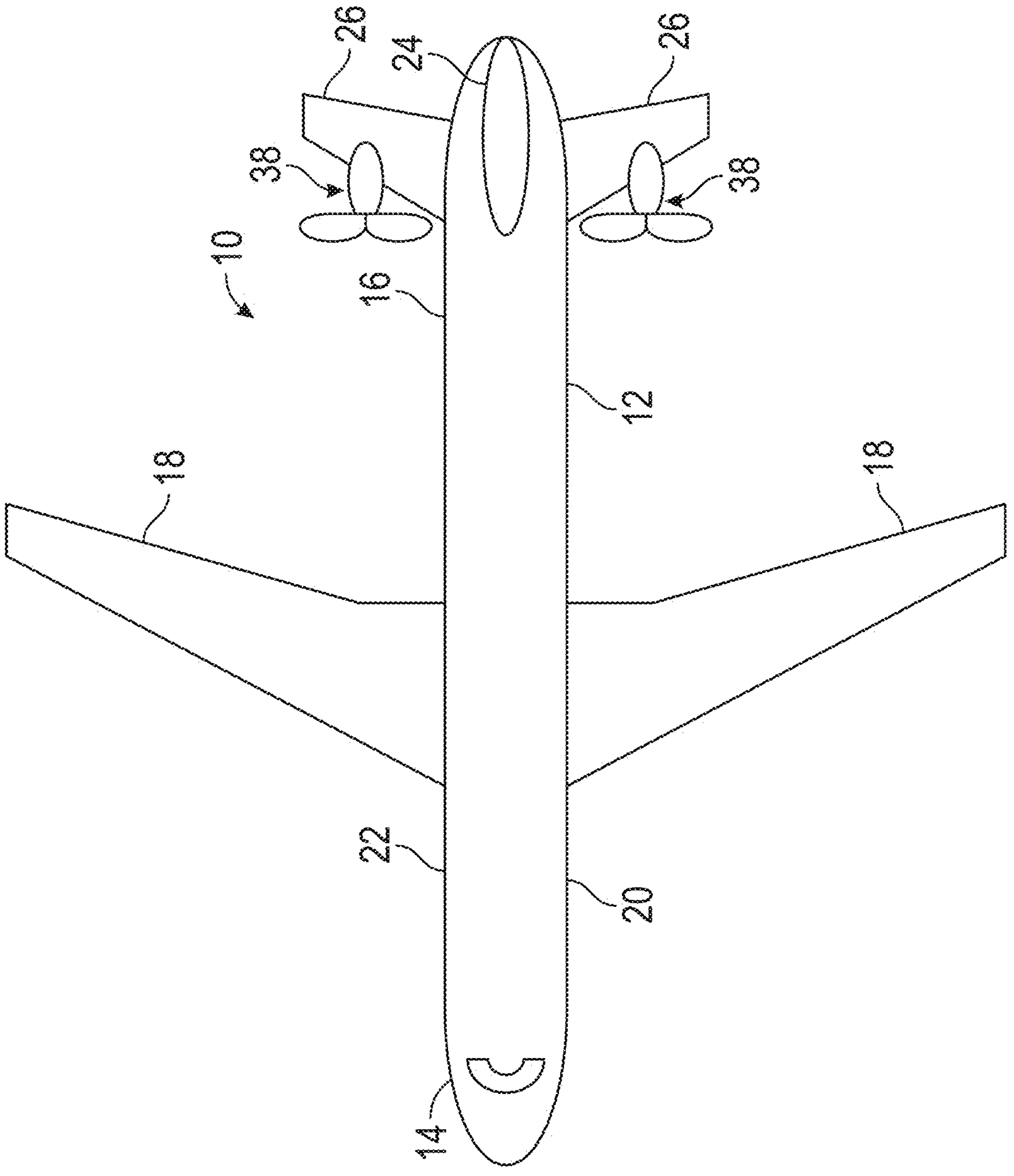
FIG. 2 comprises atop plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. An unducted fan propulsor 38 is undermounted relative to each of the wings 18, as shown in the embodiment of FIG. 1. Alternatively, the unducted fan propulsor 38 is mounted relative to the top of each of the horizontal stabilizers 26, as shown in FIG. 2. In some embodiments, more than one of the unducted fan propulsors 30 or 38 may be mounted to each of the wings 18 or each of the horizontal stabilizers 26.

FIG. 3 shows an elevational cross-sectional view of an embodiment of one of the unducted fan propulsors 38. As is seen from FIG. 3, the unducted fan propulsor 38 takes the form of an open fan propulsion system and has a rotating element in the form of rotatable propeller assembly 32 on which is mounted a first array of blades 34 around a centerline (CL) of the unducted fan propulsor 38. The first array of blades 34 defines a diameter D representing the tip-to-tip diameter of the blades and a maximum radial extent from CL. This diameter D is measured along a radial direction perpendicular to CL. The unducted fan propulsor 38 of FIG. 3 includes a second array of blades or vanes, which are non-rotating or static. In some embodiments, a non-rotating stationary element in the form of vane assembly 40 includes an array of vanes 42 disposed around CL.

Each of the blades 34 has a root 35 where the blade 34 is attached to the rotatable propeller assembly 32, and each blade 34 defines a root length (RTL). The root length (RTL) is defined as the axial extent (in a direction parallel to CL) from the radially innermost leading edge (LE) of the blade 34 airfoil, e.g., closest to CL, to the axial location of the radially innermost trailing edge (TE) of the blade 34 airfoil.

Figure 4:
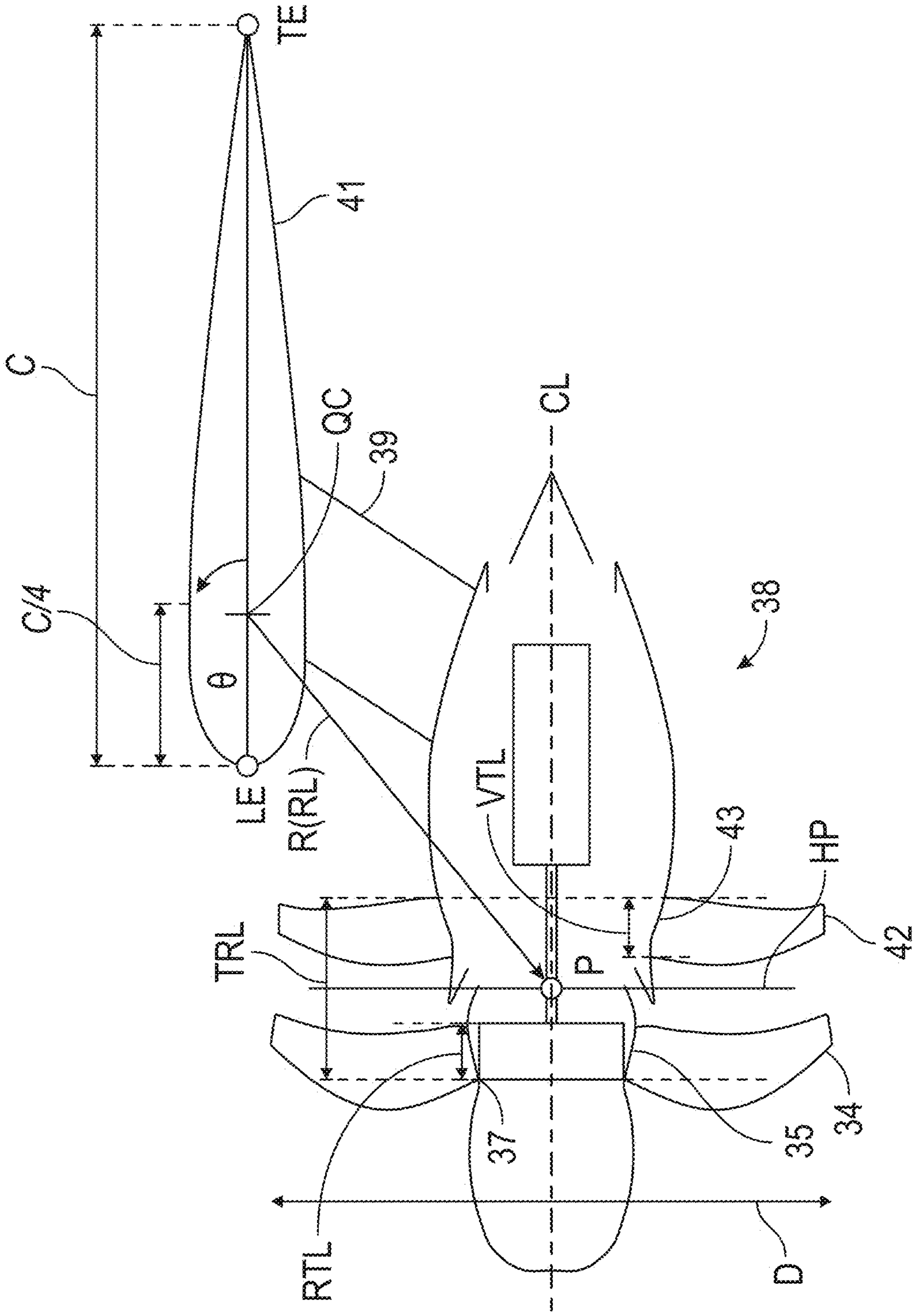
FIG. 4 comprises a schematic side elevation view showing the location of the unducted fan propulsor of FIG. 3 relative to an airfoil section.

Each of the vanes 42 also has a root 43 with a vane root distance VTL where the vane 42 is attached to the non-rotating vane assembly 40. The total root length (TRL) is the distance between the leading edge (LE) of the blade 34 airfoil (radially nearest to CL) of the blades 34 and the trailing edge (LE) of the root 43 of the vanes 42, as shown in FIGS. 3 and 4. TRL is a measured axial distance from the radial innermost LE of the foremost row of blades/vanes and the trailing edge (TE) of the vanes 42. In some embodiments, the second array may instead be a second rotating elements and the TRL is the measured axial distance from the radially innermost LE of the blades 34 of the first rotating element and the TE of the root of the blades of the second rotating elements. In some embodiments, the vanes 42 may be forward of the rotating blades, and the TRL is the distance between the LE edge of the root of the vanes and the TE of the root of the rotating blades. In some embodiments, an unducted fan propulsor having rotating elements (e.g., rotating blades) and stationary elements (e.g. vanes) may be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rearward edge of the root of the aftmost row of blades/vanes of the unducted fan propulsor.

Referring to FIG. 4, for purposes explained more later, the unducted fan propulsor 38 has a point P. For the unducted fan propulsor 38 with a first array of blades or vanes 34 and a second array of blades or vanes 42, as shown in FIGS. 3 and 4, the point P is located at the intersection of CL and a line HP perpendicular to CL and that passes through an axial midpoint of the total root length TRL between a forward end at the root of one of the blades 34 of the forward array and a rearward end at the root of one of the blades 42 of the rearward array when aligned with the one of the blades 34 of the forward array, as shown in FIG. 6. Either the forward or rearward array can be vanes or blades. In other words, the line HP is located equidistant from a forward end of the root of one of the forward vanes or blades 34 and a rearward end of the root of one of the rearward blades or vanes 42. The TRL of an unducted fan propulsor is defined as the distance between the LE of the root of the forward row of blades/vanes and the rearward edge of the root of the aftmost blade/vane.

Referring again to FIG. 3, the exemplary unducted fan propulsor 38 includes a drive mechanism 44 that provides torque and power to the propeller assembly 32 through a transmission 46. The drive mechanism 44 may be a gas turbine engine and associated transmission 46. Transmission 46 delivers torque from the drive mechanism 44 to the propeller assembly 32. The transmission system can be configured as a direct drive engine, transferring power from a power turbine or low pressure turbine (LPT) to the propeller assembly, or an indirect drive system where torque from the LPT is transferred to the propeller assembly 32 through a gearbox. The gearbox reduces a rotation speed of the drive shaft to match a desired rotational speed for the propeller assembly 32. The gas turbine engine includes in serial order a compressor, combustor, high pressure turbine and the LPT. In other embodiments the drive mechanism may generate power partially or fully by an electric motor. In the former case the drive mechanism is a hybrid electric drive mechanism including a gas turbine engine where a drive shaft includes an electric motor-generator for generating torque. In the latter case the drive mechanism is an electric motor.

The unducted fan propulsor 38 is attached relative to the wings 18 or horizontal stabilizer 26 through one or more intermediate components or features, e.g., a pylon 39, as shown in FIG. 4.

Each of the wings 18 shown in FIG. 1, and horizontal stabilizers 26 shown in FIG. 2, has an airfoil section 41 associated with it, where the airfoil section 41 is defined above.

As depicted in FIG. 4, a chord line C of the airfoil section, length C as shown, is a straight line extending from LE to TE of the airfoil section (it will be understood that the airfoil section as shown and defined herein is not meant to indicate any particular camber associated with an aircraft wing). The effective quarter-chord point (QC) of the airfoil section is located on the chord line. QC is located at a distance of C/4 from the LE of the airfoil section 41.

Figure 5A:
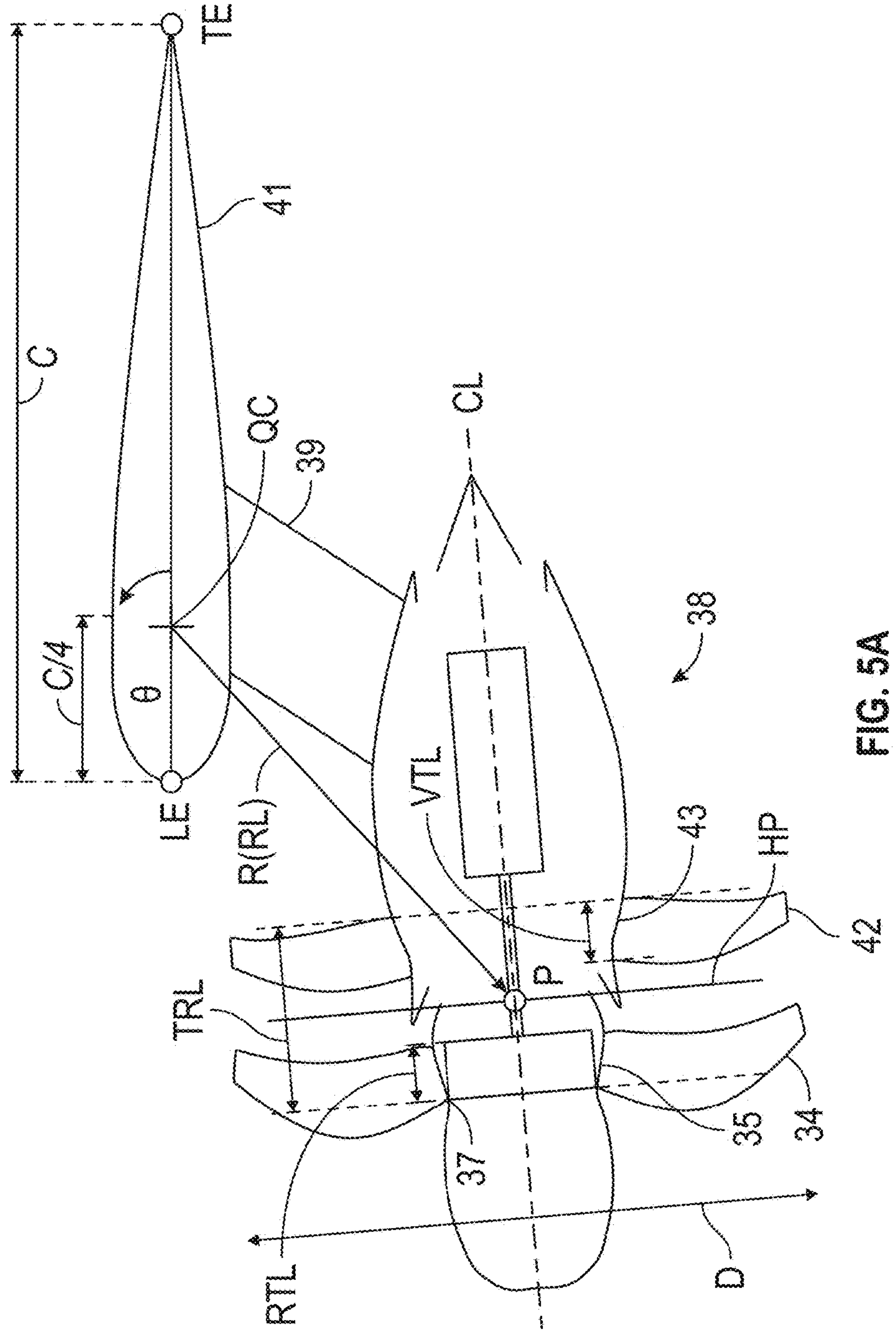
FIG. 5A is a schematic side elevation view similar to FIG. 4 and showing the unducted fan propulsor pitched downward relative to the airfoil section.
Figure 5B:
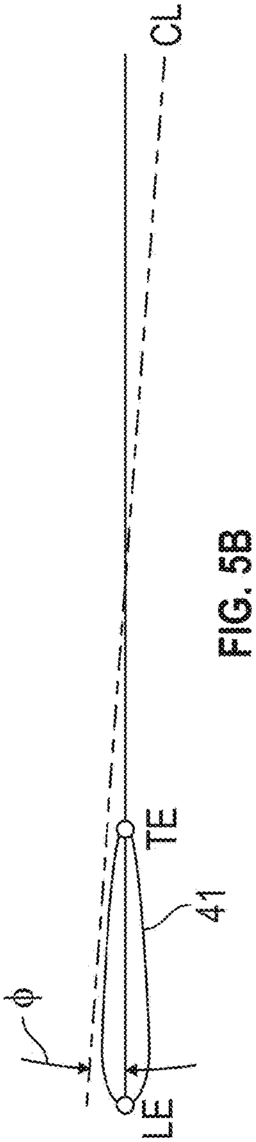
FIG. 5B defines a pitch angle Φ for the unducted fan propulsor relative to a chord line of the airfoil section in FIG. 4.

As shown in FIG. 4, the CL of the propulsor 38 and the chord line C are parallel to each other, corresponding to a zero pitch of the propulsor relative to the chord line C. The propulsor 38 can be pitched at different angles relative to the chord line, such as pitched downward as shown in FIG. 5A. FIG. 5B defines a pitch angle Φ for the propulsor 38, which is the angle spanned between the propulsor centerline CL and chord line C. Positive pitch corresponds to a clockwise rotation of CL relative to C. The pitch angle Φ can be fixed or variable during flight. For underwing installations, the pitch angle Φ can vary between −5 and +2 degrees, or it can vary between −3 and 0 degrees. During cruise conditions, propulsor pitch and toe angle (FIG. 6E, defined below) provide for an improved installed aerodynamic performance for the unducted fan propulsor in terms of reduced cabin noise and reduced off-axis loading of the unducted fan propulsor's drive shaft. For aft horizontal stabilizer or aft fuselage installations, the angle Φ can vary between −2 and +5 degrees to more align with downwash created by the wing.

The position of the open fan propulsor 38 is defined relative to QC. The airfoil section, as defined above, is the average of a first offset plane section and a second offset plane section of the airfoil (of the wing), where the first offset plane section is the section of the airfoil taken at a first plane and the second offset plane section is the section of the airfoil taken at a second plane, the first and second planes being offset in a direction perpendicular to, and equidistant from a central plane by a distance of ½ the maximum fan diameter (D) for the rotating blades, as shown in FIG. 6A. Both the gravity vector and axis of rotation of the rotating blades of the propulsor lie in this central plane when the aircraft is on the ground.

Figure 6C:
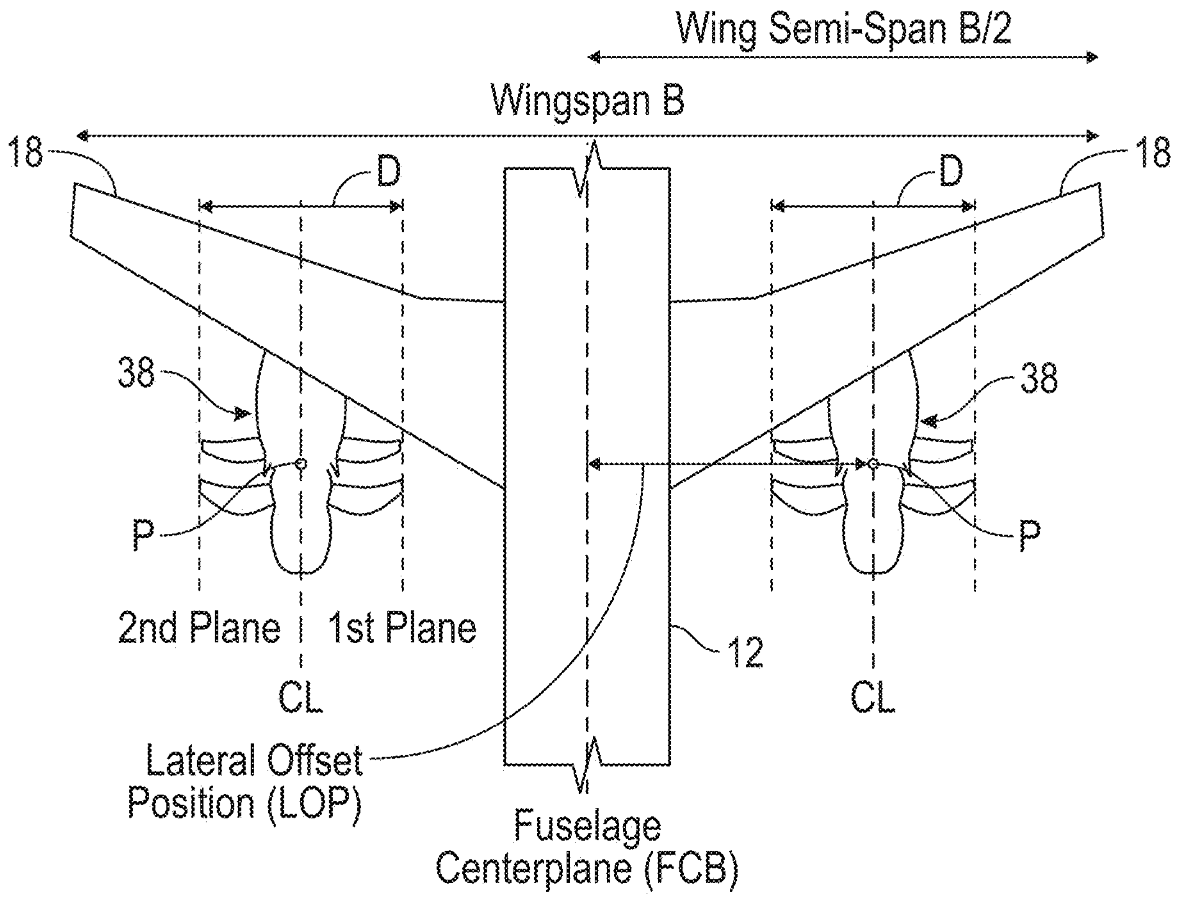
FIG. 6C comprises a schematic top plan view of a portion of an aircraft having a pair of wings extending from the fuselage with the propulsor of FIG. 3 mounted relative to each of the wings.

Referring to FIG. 6C, the propulsor 38—specifically, point P of the propulsor 38—has a spanwise location laterally offset from the fuselage centerplane (FCP) relative to the aircraft's wingspan B. P has a laterally offset position (LOP) between 10% and 80%, 20% and 40%, or between 25% and 35% of B/2 measured from the fuselage centerplane (FCP), as defined above. The location of P is also chosen to avoid interference with the fuselage or an adjacent propulsor if more than one propulsor is mounted relative to the wing. For an aft fuselage installation, the LOP of the propulsor will be closer to the fuselage, but far enough away from the fuselage's boundary layer to reduce or avoid undue interaction with the fuselage boundary layer.

Figure 6D:
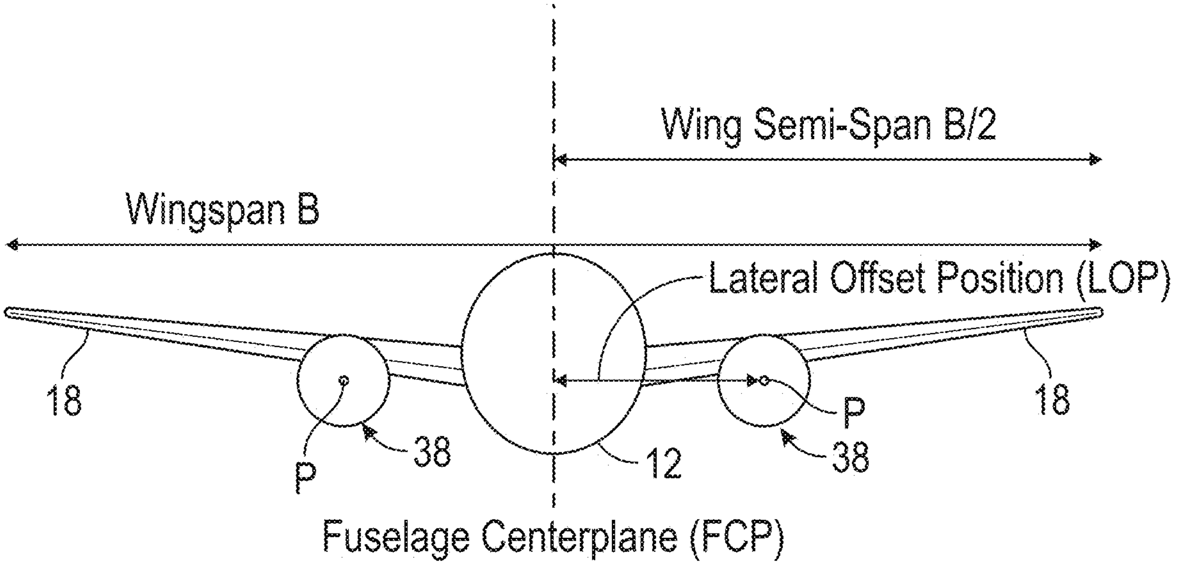
FIG. 6D comprises a schematic front elevation view of the aircraft portion of FIG. 6C.
Figure 6E:
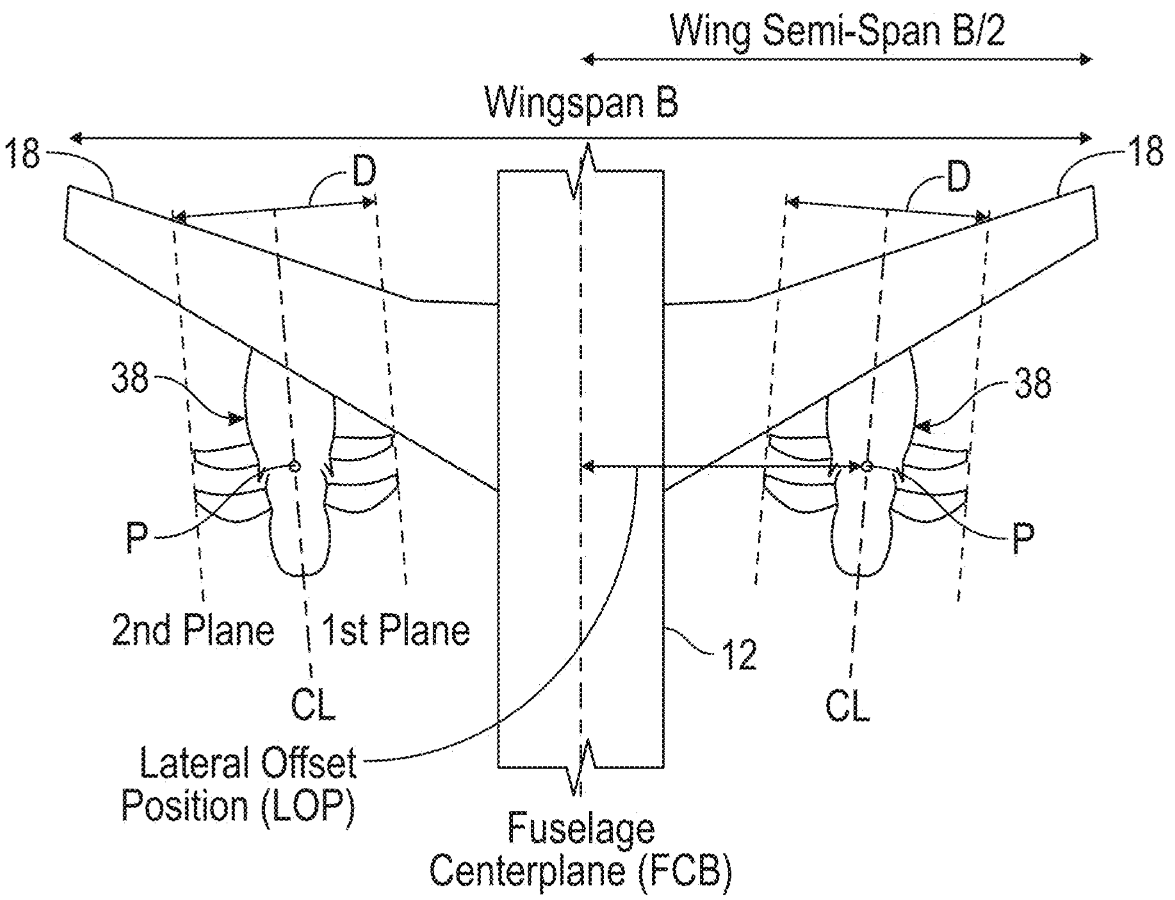
FIG. 6E comprises a schematic top plan view of a portion of an aircraft having a pair of wings extending from the fuselage with the propulsor of FIG. 3 mounted relative to each of the wings, similar to FIG. 6C but showing the propulsors toed inwardly toward the fuselage.

As shown in FIG. 6C, the propulsor centerline CL and the fuselage centerplane (FCP) can be orientated parallel to each other. Referring to FIG. 6D, other angles between propulsor centerline CL and the fuselage centerplane (FCP) are contemplated. For an underwing mounted propulsor, the toe angle can provide added benefit when positive (i.e., the rotor toed-in towards the fuselage with the forward end of the propulsor 38 being more inboard than the aft end). The propulsor can have an inward toe angle of between 0 and 5 degrees, or between 1 and 3 degrees.

There are specific locations that the inventors have found to be advantageous to position the unducted fan propulsor 38 to generate increased thrust using higher pressure air flow, in order to offset the scrubbing and interference drag. The higher pressure air flow can be beneath the wings 18. In the case of a horizontal stabilizer 26, the higher pressure air flow is above the horizontal stabilizer 26. Accordingly, the high-pressure side of an airfoil may refer to the underside of a wing 18 or the top side of a horizontal stabilizer 26.

The aircraft described herein has a fuselage, wings and/or stabilizers, and two or more unducted fan propulsor systems (or propulsors). The unducted fan propulsor system, which is mounted on the pressure side of a wing or horizontal stabilizer, provides thrust to the aircraft. To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. For example, placement can affect loads on and size of the pylon, wing loads, landing gear length and associated forces, weight, and cost.

The teachings described below enable improved balancing of the tradeoffs required in the aircraft design while positioning the unducted fan propulsor relative to the airfoil section's effective quarter chord point QC to offset scrubbing and interference drag loses.

Referring to FIG. 4, the location of an unducted fan propulsor relative to an airfoil section 41 is defined herein using a polar coordinate system having an angular (θ) coordinate and a radial (R) component, with origin located at the effective quarter chord point (QC) of the airfoil section having a chord length (C) as shown. The radial component is referred to herein as a "positioning line (R)". The location of the point P of the unducted fan propulsor 38 relative to the origin (QC) of the polar coordinate system (the origin of the coordinate system is the same as the effective quarter chord point for airfoil section 41) is expressed in terms of a vector having radial component R with magnitude RL and angular component θ. The vector magnitude RL is called a "positioning line length (RL)".

The angle θ is measured relative to a datum that is the airfoil section chord line (e.g., in FIG. 6 the vector R is located by an angle that is between 180 and 270 degrees measured counter-clockwise about origin QC relative to the chord line). When viewed looking from an outboard position towards an inboard position (e.g., the fuselage), θ is positive in a counter-clockwise direction when the propulsor is below the airfoil section 41 (wing, FIG. 9), and θ is positive in a clockwise direction when the propulsor is above the airfoil section (horizontal stabilizer, FIG. 10) as indicated in the drawings, respectively, by the direction of the arrow from the origin.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section) of FIGS. 5 and 6 the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θ locating the unducted fan propulsor system relative to the airfoil section tend to offset scrubbing and interference drag for an unducted fan propulsor.

Figure 9:
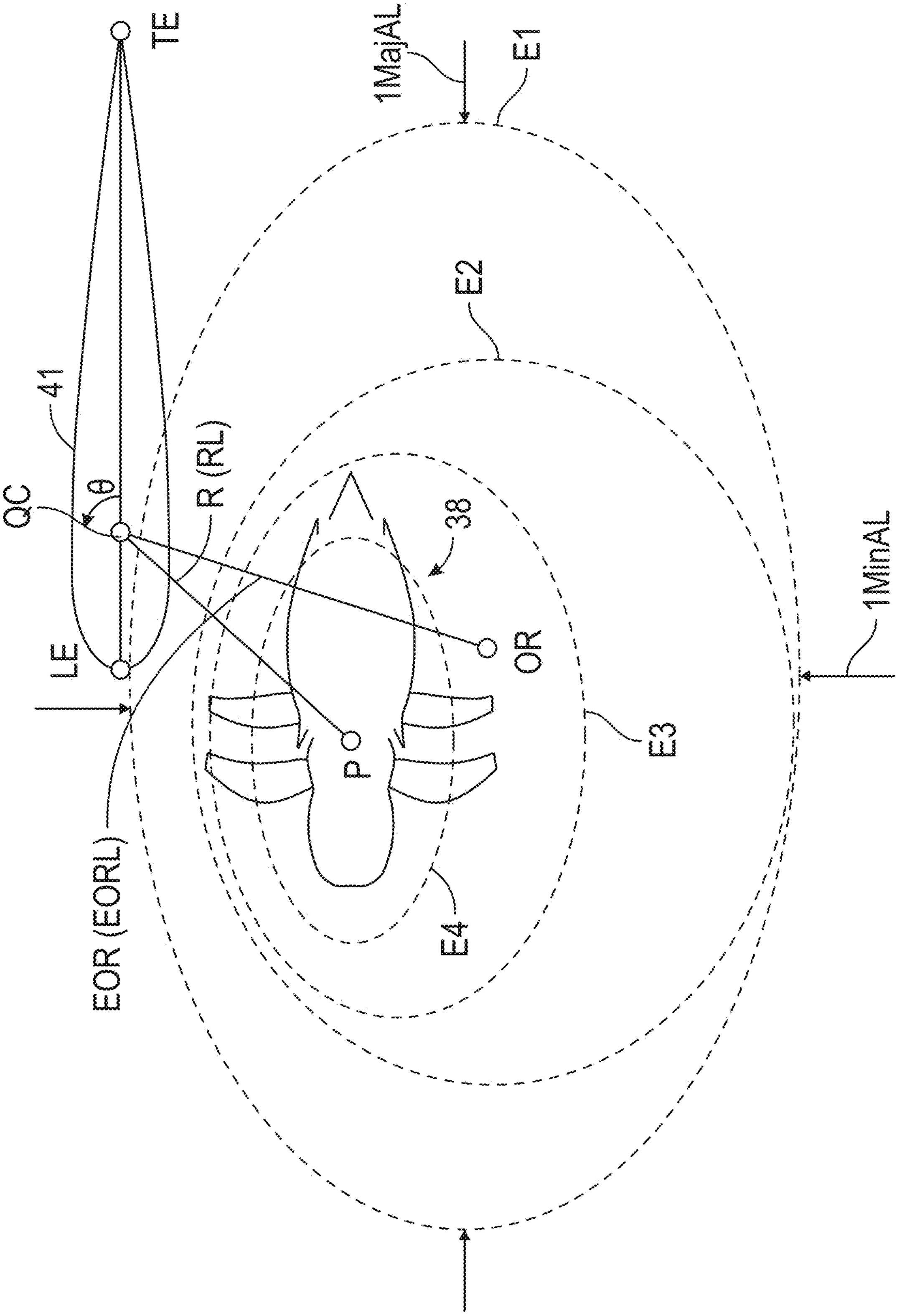
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
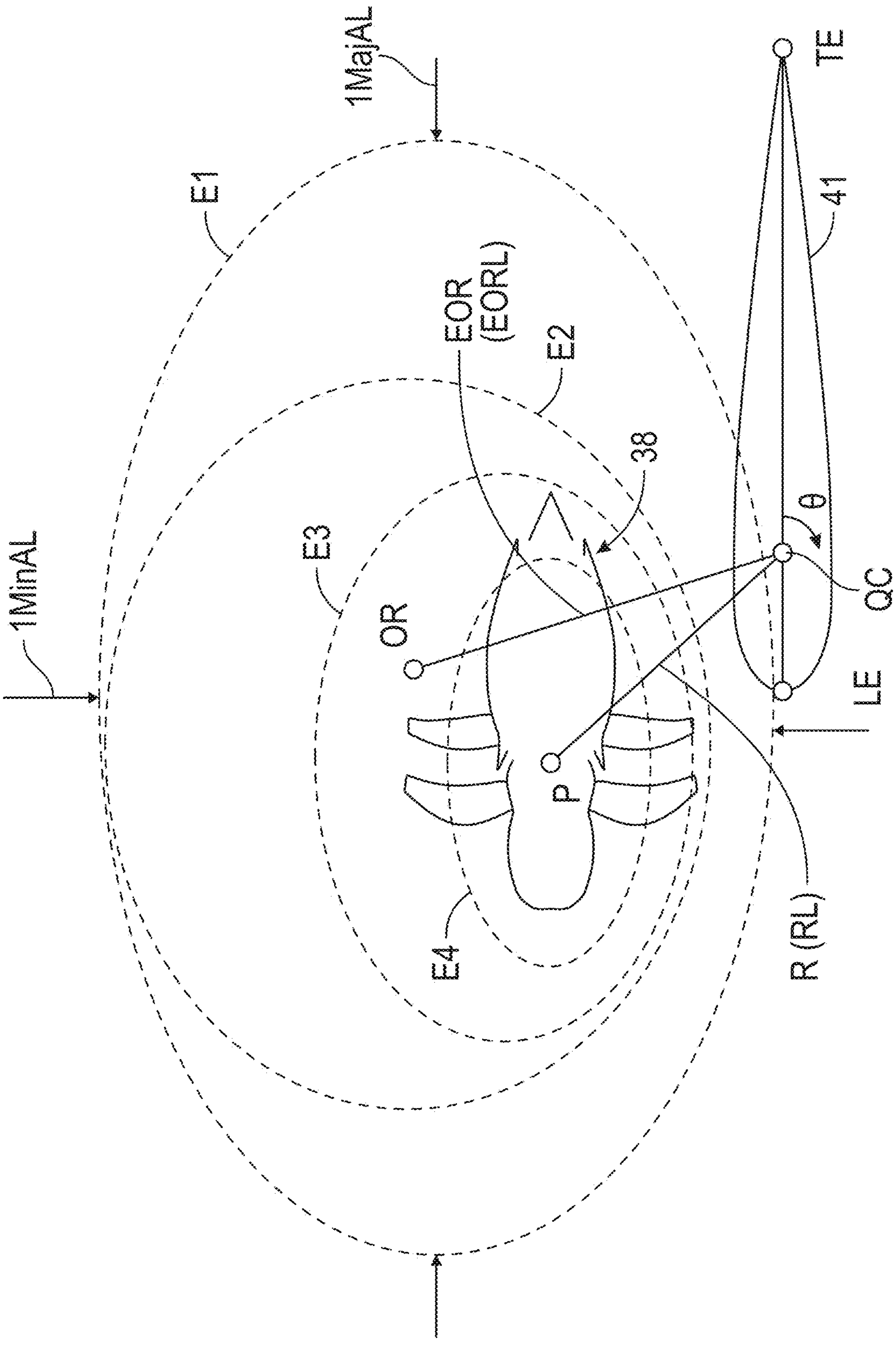
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse defining a region relative to QC where scrubbing and interference drag tends to offset. FIGS. 7-10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The location of OR is expressed relative to QC using the polar coordinate system frame of reference defined earlier. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to QC. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. The angle θ is measured relative to the chord line (as defined earlier) and positive in a clockwise direction when the propulsor is above the airfoil section (horizontal stabilizer, FIG. 10) as indicated in the drawings, respectively, by the direction of the arrow from the origin.

An angle θ for the ellipse origin positioning line EOR is measured from a datum that is the chord line to an ellipse positioning line EOR (e.g., in FIG. 9 the vector EOR is located by an angle that is between 180 and 270 degrees measured counter-clockwise about origin QC). A positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 38 is located in a first ellipse E1 with a first ellipse origin defined by EORL/D of 0.938 and θ of 253.6°. The first ellipse E1 also has a first major axis length (1MajAL) and a first minor axis length (1MinAL), where 1MajAL/D is 2.8 and 1MinAL/D is 1.7. A unducted fan propulsor located within E1 tends to offset scrubbing and interference drag.

In a second embodiment, the point P of the unducted fan propulsor 38 is located in a second ellipse E2 having a second ellipse origin defined by EORL/D of 1.051 and θ of 248.8°. The second ellipse E2 has a second major axis length (2MajAL) and a second minor axis length (2MinAL), where 2MajAL/D is 1.86 and 2MinAL/D is 1.56. A unducted fan propulsor located within E2 tends to offset scrubbing and interference drag.

In a third embodiment, the point P of the unducted fan propulsor 38 is located in a third ellipse E3 having a third ellipse origin defined by EORL/D of 0.870 and θ of 239.6°. The third ellipse E3 has a third major axis length (3MajAL) and a third minor axis length (3MinAL), where 3MajAL/D is 1.4 and 3MinAL/D is 0.9. A unducted fan propulsor located within E3 tends to offset scrubbing and interference drag.

In a fourth embodiment, the point P of the unducted fan propulsor 38 is located in a fourth ellipse E4 having a fourth ellipse origin defined by EORL/D of 0.763 and θ of 235.7°. The fourth ellipse E4 has a fourth major axis length (4MajAL) and a fourth minor axis length (4MinAL), where 4MajAL/D is 0.94 and 4MinAL/D is 0.44. A unducted fan propulsor located within E4 tends to offset scrubbing and interference drag.

The location of the unducted fan propulsor system (i.e., point P) relative to the airfoil section may also be expressed in terms of the following expressions:

$$\frac{RL}{D}+\frac{\left(\sqrt{a*\left[b*\sin^2(\theta)-c*\cos^2(\theta)+d*\sin(\theta)*\cos(\theta)\right]}+e*\sin(\theta)+f*\cos(\theta)\right)}{g*\sin^2(\theta)+h*\cos^2(\theta)}>0$$

and $$\frac{RL}{D}+\frac{\left(-\sqrt{a*\left[b*\sin^2(\theta)-c*\cos^2(\theta)+d*\sin(\theta)*\cos(\theta)\right]}+e*\sin(\theta)+f*\cos(\theta)\right)}{g*\sin^2(\theta)+h*\cos^2(\theta)}<0$$

where 0.07<RL/D<1.98 and θ is between 187° and 340°, and where a, b, c, d, e, f, g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |
| g | 1.96 | 0.8649 | 0.49 | 0.2209 |
| h | 0.7225 | 0.6084 | 0.2025 | 0.0484 |

In a sixth embodiment, the point P of the unducted fan propulsor 38 can be defined by the above expression, but where 0.254<RL/D<1.86 and θ is between 199° and 306°, and where a, b, c, d, e, f, g and h have the values set forth in the above table under the heading "Sixth Emb."

In a seventh embodiment, the point P of the unducted fan propulsor 38 can be defined by the above expression, but where 0.369<RL/D<1.43 and θ is between 204° and 291°, and where a, b, c, d, e, f, g and h have the values set forth in the above table under the heading "Seventh Emb.".

In an eighth embodiment, the point P of the unducted fan propulsor 38 can be defined by the above expression, but where 0.477<RL/D<0.9455 and θ is between 211° and 274°, And where a, b, c, d, e, f, g and h have the values set forth in the above table under the heading "Eighth Emb."

Figure 7:
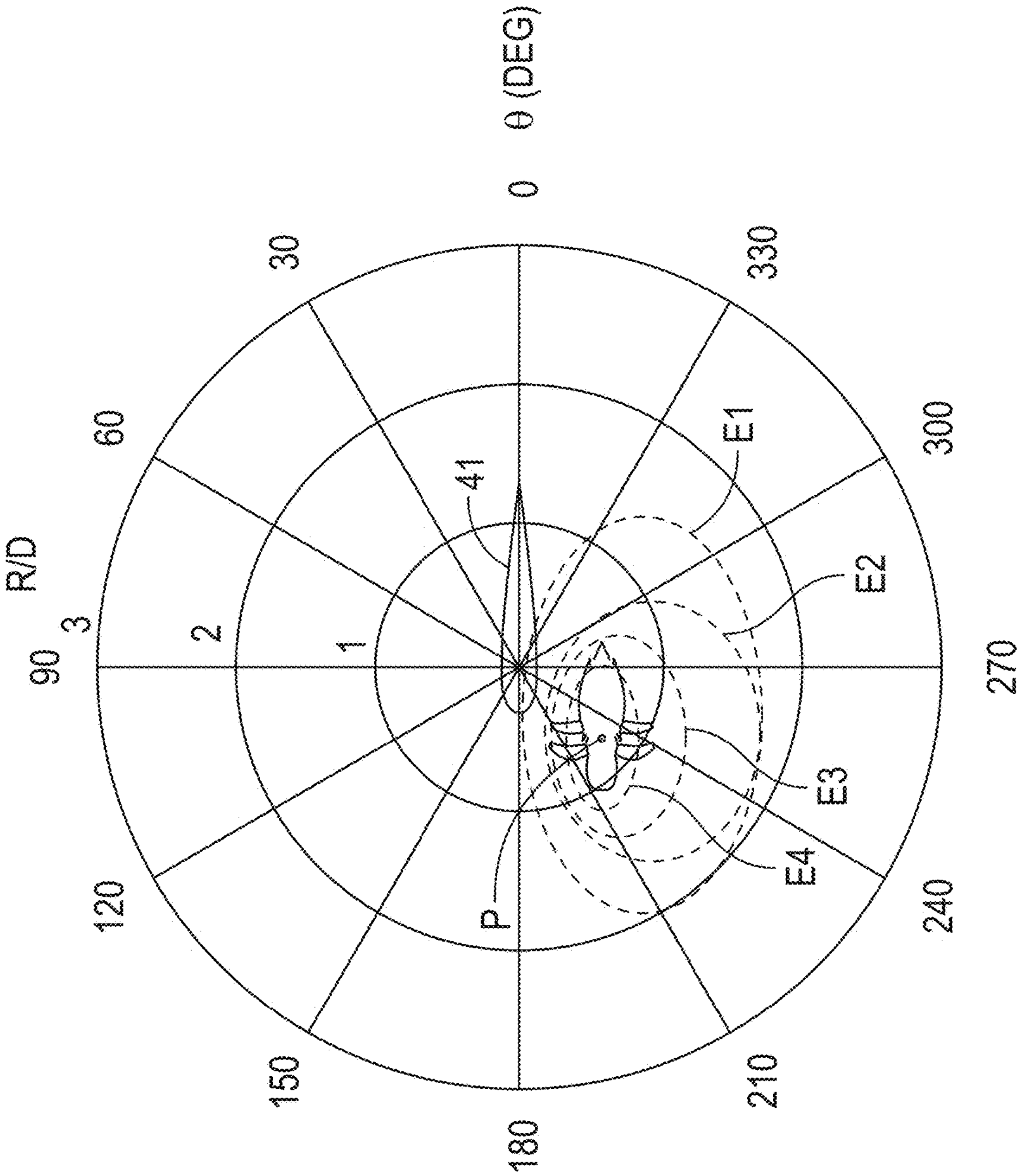
FIG. 7 comprises a schematic side elevation view similar to that of FIG. 4, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system.

Figure 11:
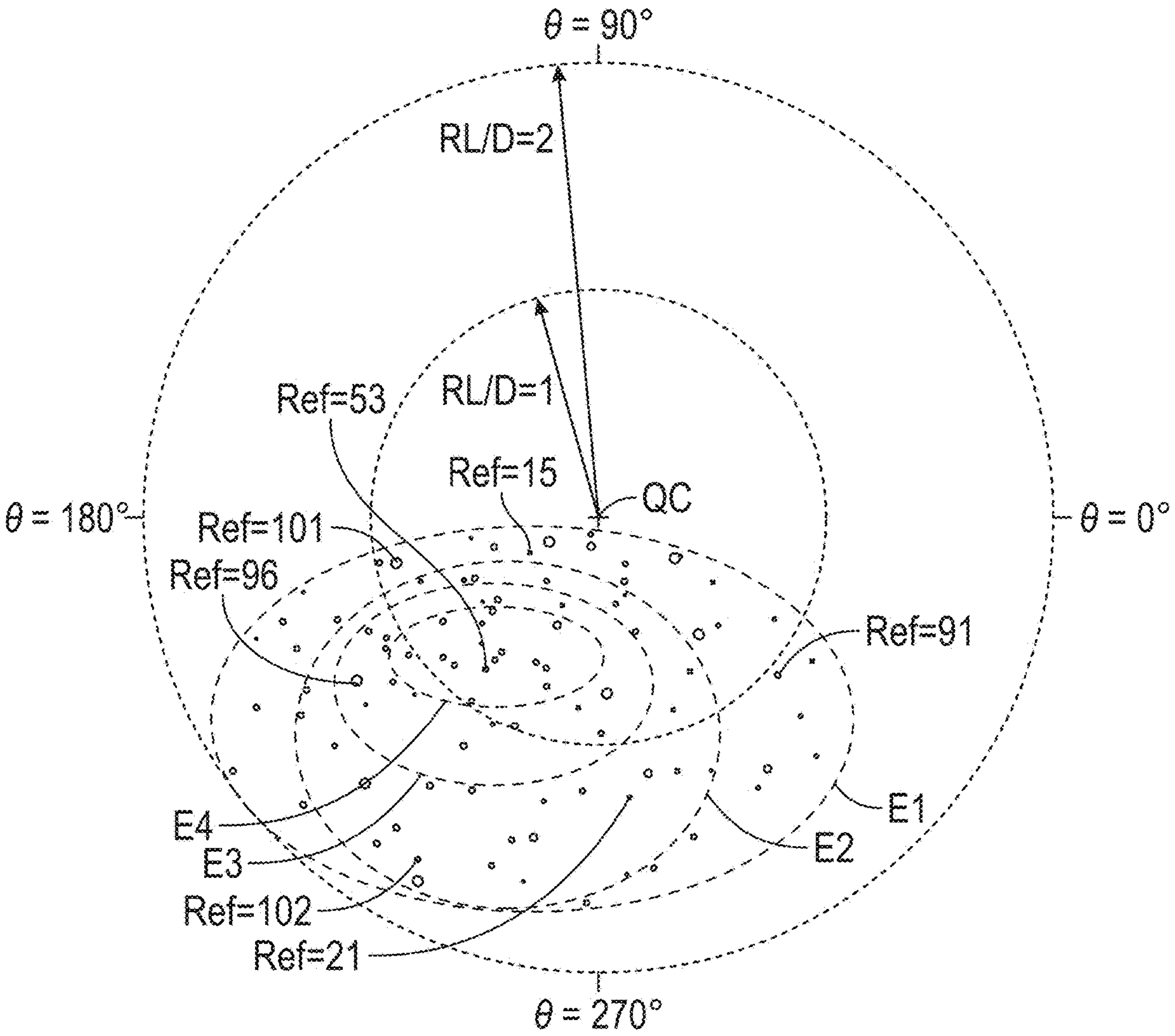
FIG. 11 comprises a schematic representation showing exemplary locations of a point P of one of the unducted fan propulsors, as defined herein, within the first ellipse, the second ellipse, the third ellipse, and the fourth ellipse.

TABLES 1 and 3-6 set forth examples of embodiments of invention. TABLE 1 shows each maximum outer diameter (D) and the location of point P of the unducted fan propulsor relative to the effective quarter chord point, QC, contemplated, where the point P is defined by RL and θ. The term "Ref." refers to the row in Table 1 for reference. The exemplary types of aircraft indicated with reference letters A through I in TABLE 1 are identified in TABLE 2. The point P of the unducted fan propulsor locations from TABLE 1 are shown in FIG. 11 for an under-wing mounted propulsor (for a propulsor mounted above a horizontal stabilizer the maximum outer diameter (D) and the point P of the unducted fan propulsor locations would be mirrored about the chord line of the airfoil section, which, for purposes of explanation, may be thought of as an axis passing through θ=0 deg and θ=180 deg in FIG. 11) relative to the first ellipse (E1), second ellipse (E2), third ellipse (E3), and the fourth ellipse (E4). The size of the points in FIG. 11 represent the relative size of D for the range provided in TABLE 1 (not to scale). The rotating blades diameter (D) may be between 2-50, 8-16, 10-15, 12-14, or 14-16 feet.

TABLE 1

P-location relative to airfoil section quarter chord point

| Ref. | Type of aircraft | RL (ft) | D (ft) | θ (deg) | RL/D |
|---|---|---|---|---|---|
| 1 | C I | 2.60 | 2.0 | 220.00 | 1.30 |
| 2 | F I | 1.07 | 2.0 | 189.00 | 0.54 |
| 3 | I | 3.13 | 2.0 | 199.73 | 1.57 |
| 4 | C F I | 2.18 | 3.0 | 319.20 | 0.73 |
| 5 | F I | 2.82 | 3.0 | 242.40 | 0.94 |
| 6 | C I | 1.47 | 4.0 | 293.60 | 0.37 |
| 7 | C I | 2.43 | 4.0 | 217.87 | 0.61 |
| 8 | I | 6.64 | 4.0 | 259.47 | 1.66 |
| 9 | C F I | 4.23 | 5.0 | 265.87 | 0.85 |
| 10 | C H I | 6.57 | 5.0 | 194.40 | 1.31 |
| 11 | F I | 2.03 | 5.0 | 250.93 | 0.41 |
| 12 | C F H I | 8.03 | 5.0 | 275.47 | 1.61 |
| 13 | C | 2.52 | 6.0 | 337.33 | 0.42 |
| 14 | H | 4.44 | 6.0 | 228.53 | 0.74 |
| 15 | C I | 1.88 | 6.0 | 208.27 | 0.31 |
| 16 | C F | 7.14 | 7.0 | 244.53 | 1.02 |
| 17 | B F H | 4.15 | 7.0 | 332.00 | 0.59 |
| 18 | B C I | 6.49 | 7.0 | 292.53 | 0.93 |
| 19 | C G | 8.05 | 8.0 | 216.80 | 1.01 |
| 20 | B F I | 11.89 | 8.0 | 256.27 | 1.49 |
| 21 | C G H | 10.08 | 8.0 | 277.60 | 1.26 |
| 22 | B C G I | 7.31 | 8.0 | 330.93 | 0.91 |
| 23 | C H | 9.97 | 8.0 | 294.67 | 1.25 |
| 24 | G I | 11.57 | 8.0 | 312.80 | 1.45 |
| 25 | B F I | 11.58 | 9.0 | 260.53 | 1.29 |
| 26 | C H | 6.06 | 9.0 | 224.27 | 0.67 |
| 27 | F G H | 3.06 | 9.0 | 233.87 | 0.34 |
| 28 | C I | 12.78 | 9.0 | 204.00 | 1.42 |
| 29 | B H | 10.47 | 10.0 | 210.40 | 1.05 |
| 30 | B I | 5.53 | 10.0 | 221.07 | 0.55 |
| 31 | A B C F G H | 7.00 | 10.0 | 253.07 | 0.70 |
| 32 | I | 2.47 | 10.0 | 306.40 | 0.25 |
| 33 | A C | 15.27 | 10.0 | 222.13 | 1.53 |
| 34 | G | 11.67 | 10.0 | 241.33 | 1.17 |
| 35 | A C F H | 17.13 | 10.0 | 243.47 | 1.71 |
| 36 | A B G I | 18.70 | 11.0 | 210.00 | 1.70 |
| 37 | G | 10.93 | 11.0 | 249.87 | 0.99 |
| 38 | A H | 4.33 | 11.0 | 285.07 | 0.39 |
| 39 | F I | 6.82 | 11.0 | 206.13 | 0.62 |
| 40 | A F H | 11.60 | 12.0 | 272.27 | 0.97 |
| 41 | A B F I | 10.64 | 12.0 | 227.47 | 0.89 |
| 42 | A H | 21.84 | 12.0 | 232.80 | 1.82 |
| 43 | A G | 8.56 | 12.0 | 236.00 | 0.71 |
| 44 | B F H | 0.78 | 12.0 | 263.50 | 0.07 |
| 45 | A F | 10.00 | 12.5 | 200.00 | 0.80 |
| 46 | A B G H I | 15.25 | 12.5 | 268.00 | 1.22 |
| 47 | B | 19.92 | 12.5 | 279.73 | 1.59 |

TABLE 1-continued

P-location relative to airfoil section quarter chord point

| Ref. | Type of aircraft | RL (ft) | D (ft) | θ (deg) | RL/D |
|---|---|---|---|---|---|
| 48 | A B F | 15.92 | 12.5 | 316.00 | 1.27 |
| 49 | A B | 6.25 | 12.5 | 270.13 | 0.50 |
| 50 | A F H | 18.42 | 12.5 | 211.47 | 1.47 |
| 51 | F G | 24.25 | 12.5 | 215.73 | 1.94 |
| 52 | A B H | 19.50 | 13.0 | 287.20 | 1.50 |
| 53 | H | 10.66 | 13.0 | 234.93 | 0.82 |
| 54 | B | 14.99 | 13.0 | 326.67 | 1.15 |
| 55 | I | 18.11 | 13.0 | 239.20 | 1.39 |
| 56 | A B F H | 23.49 | 13.0 | 225.33 | 1.81 |
| 57 | A F G H | 10.49 | 13.0 | 302.13 | 0.81 |
| 58 | B I | 3.38 | 13.0 | 231.73 | 0.26 |
| 59 | A B G | 13.95 | 13.0 | 212.53 | 1.07 |
| 60 | A B H | 10.14 | 13.0 | 255.20 | 0.78 |
| 61 | F | 10.80 | 13.5 | 215.00 | 0.80 |
| 62 | A H I | 19.35 | 13.5 | 198.67 | 1.43 |
| 63 | B F | 15.39 | 13.5 | 220.00 | 1.14 |
| 64 | A G H I | 7.83 | 13.5 | 207.20 | 0.58 |
| 65 | B H | 10.30 | 13.5 | 235.70 | 0.76 |
| 66 | A B | 23.49 | 13.5 | 237.07 | 1.74 |
| 67 | A H | 22.05 | 13.5 | 238.13 | 1.63 |
| 68 | F G | 13.08 | 13.5 | 192.00 | 0.97 |
| 69 | A B F | 6.03 | 13.5 | 195.47 | 0.45 |
| 70 | A F | 13.23 | 13.5 | 200.80 | 0.98 |
| 71 | B H | 16.89 | 14.0 | 201.87 | 1.21 |
| 72 | B I | 22.68 | 14.0 | 254.13 | 1.62 |
| 73 | A B F H | 24.17 | 14.0 | 269.07 | 1.73 |
| 74 | B E G | 19.69 | 14.0 | 301.07 | 1.41 |
| 75 | A | 12.60 | 14.0 | 223.20 | 0.90 |
| 76 | H I | 23.30 | 15.0 | 214.67 | 1.55 |
| 77 | A B E G H | 10.30 | 15.0 | 248.80 | 0.69 |
| 78 | A B E H | 17.90 | 15.0 | 288.27 | 1.19 |
| 79 | F G | 21.23 | 16.0 | 246.67 | 1.33 |
| 80 | A E | 8.64 | 16.0 | 290.40 | 0.54 |
| 81 | E G | 17.60 | 16.0 | 207.00 | 1.10 |
| 82 | A E | 25.20 | 18.0 | 230.00 | 1.40 |
| 83 | F | 19.80 | 18.0 | 225.00 | 1.10 |
| 84 | A G | 6.84 | 18.0 | 263.73 | 0.38 |
| 85 | A E | 35.64 | 18.0 | 221.00 | 1.98 |
| 86 | A E | 6.17 | 20.0 | 297.03 | 0.31 |
| 87 | F | 30.55 | 21.0 | 259.78 | 1.45 |
| 88 | A D | 10.99 | 22.0 | 252.33 | 0.50 |
| 89 | A E | 21.50 | 22.0 | 237.43 | 0.98 |
| 90 | D | 14.29 | 24.0 | 222.53 | 0.60 |
| 91 | D E | 25.75 | 24.0 | 319.38 | 1.07 |
| 92 | D E | 3.41 | 29.0 | 267.23 | 0.12 |
| 93 | D | 39.42 | 29.0 | 304.48 | 1.36 |
| 94 | E | 38.55 | 33.0 | 282.13 | 1.17 |
| 95 | D | 51.16 | 33.0 | 229.98 | 1.55 |
| 96 | D E | 44.23 | 35.0 | 215.08 | 1.26 |
| 97 | E | 24.18 | 35.0 | 311.93 | 0.69 |
| 98 | D | 8.53 | 40.0 | 207.63 | 0.21 |
| 99 | D | 31.45 | 40.0 | 274.68 | 0.79 |
| 100 | D | 18.19 | 45.0 | 334.28 | 0.40 |
| 101 | D | 42.32 | 48.0 | 192.73 | 0.88 |
| 102 | D | 90.00 | 50.0 | 244.88 | 1.80 |

TABLE 2

| Designator for TABLE 1 | Aircraft Type |
|---|---|
| A | Narrow Body, twin engine |
| B | Narrow Body, 4 engines |
| C | Narrow Body, distributed propulsors (>4 engines) |
| D | Wide Body, twin engine |
| E | Wide Body, 4 engines |
| F | Wide Body, distributed propulsors (>4 engines) |
| G | Regional Jet |
| H | Business Jet |
| I | UAV |

For Aircraft Type A, B, C and G having a Mach flight speed at cruise conditions of between 0.70 and 0.85 the fan diameter (D) is between 8 and 16 feet, or more preferably between 12 feet and 16 feet.

TABLES 3-6 provide exemplary embodiments for EORL and D for each of the first ellipse E1, second ellipse E2, third ellipse E3 and fourth ellipse E4, respectively, relative to the quarter chord point (QC).

TABLE 3

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 2 | 253.6 | 1.876 | 5.6 | 3.4 | 0.938 | 2.8 | 1.7 |
| 3 | 253.6 | 2.814 | 8.4 | 5.1 | 0.938 | 2.8 | 1.7 |
| 4 | 253.6 | 3.752 | 11.2 | 6.8 | 0.938 | 2.8 | 1.7 |
| 5 | 253.6 | 4.69 | 14 | 8.5 | 0.938 | 2.8 | 1.7 |
| 6 | 253.6 | 5.628 | 16.8 | 10.2 | 0.938 | 2.8 | 1.7 |
| 7 | 253.6 | 6.566 | 19.6 | 11.9 | 0.938 | 2.8 | 1.7 |
| 8 | 253.6 | 7.504 | 22.4 | 13.6 | 0.938 | 2.8 | 1.7 |
| 9 | 253.6 | 8.442 | 25.2 | 15.3 | 0.938 | 2.8 | 1.7 |
| 10 | 253.6 | 9.38 | 28 | 17 | 0.938 | 2.8 | 1.7 |
| 11 | 253.6 | 10.318 | 30.8 | 18.7 | 0.938 | 2.8 | 1.7 |
| 12 | 253.6 | 11.256 | 33.6 | 20.4 | 0.938 | 2.8 | 1.7 |
| 12.5 | 253.6 | 11.725 | 35 | 21.25 | 0.938 | 2.8 | 1.7 |
| 13 | 253.6 | 12.194 | 36.4 | 22.1 | 0.938 | 2.8 | 1.7 |
| 13.5 | 253.6 | 12.663 | 37.8 | 22.95 | 0.938 | 2.8 | 1.7 |
| 14 | 253.6 | 13.132 | 39.2 | 23.8 | 0.938 | 2.8 | 1.7 |
| 15 | 253.6 | 14.07 | 42 | 25.5 | 0.938 | 2.8 | 1.7 |
| 16 | 253.6 | 15.008 | 44.8 | 27.2 | 0.938 | 2.8 | 1.7 |
| 18 | 253.6 | 16.884 | 50.4 | 30.6 | 0.938 | 2.8 | 1.7 |
| 20 | 253.6 | 18.76 | 56 | 34 | 0.938 | 2.8 | 1.7 |
| 21 | 253.6 | 19.698 | 58.8 | 35.7 | 0.938 | 2.8 | 1.7 |
| 22 | 253.6 | 20.636 | 61.6 | 37.4 | 0.938 | 2.8 | 1.7 |
| 24 | 253.6 | 22.512 | 67.2 | 40.8 | 0.938 | 2.8 | 1.7 |
| 29 | 253.6 | 27.202 | 81.2 | 49.3 | 0.938 | 2.8 | 1.7 |
| 33 | 253.6 | 30.954 | 92.4 | 56.1 | 0.938 | 2.8 | 1.7 |
| 35 | 253.6 | 32.83 | 98 | 59.5 | 0.938 | 2.8 | 1.7 |
| 40 | 253.6 | 37.52 | 112 | 68 | 0.938 | 2.8 | 1.7 |
| 45 | 253.6 | 42.21 | 126 | 76.5 | 0.938 | 2.8 | 1.7 |
| 48 | 253.6 | 45.024 | 134.4 | 81.6 | 0.938 | 2.8 | 1.7 |
| 50 | 253.6 | 46.9 | 140 | 85 | 0.938 | 2.8 | 1.7 |

TABLE 4

| Second Ellipse E2 Embodiments | | | | | | | |
|---|---|---|---|---|---|---|---|
| D (ft) | θ (deg) | EORL (ft) | 2MajAL (ft) | 2MinAL (ft) | EORL/D | 2MajAL/D | 2MinAL/D |
| 2 | 248.8 | 2.102 | 3.72 | 3.12 | 1.051 | 1.86 | 1.56 |
| 3 | 248.8 | 3.153 | 5.58 | 4.68 | 1.051 | 1.86 | 1.56 |
| 4 | 248.8 | 4.204 | 7.44 | 6.24 | 1.051 | 1.86 | 1.56 |
| 5 | 248.8 | 5.255 | 9.3 | 7.8 | 1.051 | 1.86 | 1.56 |
| 6 | 248.8 | 6.306 | 11.16 | 9.36 | 1.051 | 1.86 | 1.56 |
| 7 | 248.8 | 7.357 | 13.02 | 10.92 | 1.051 | 1.86 | 1.56 |
| 8 | 248.8 | 8.408 | 14.88 | 12.48 | 1.051 | 1.86 | 1.56 |
| 9 | 248.8 | 9.459 | 16.74 | 14.04 | 1.051 | 1.86 | 1.56 |
| 10 | 248.8 | 10.51 | 18.6 | 15.6 | 1.051 | 1.86 | 1.56 |
| 11 | 248.8 | 11.561 | 20.46 | 17.16 | 1.051 | 1.86 | 1.56 |
| 12 | 248.8 | 12.612 | 22.32 | 18.72 | 1.051 | 1.86 | 1.56 |
| 12.5 | 248.8 | 13.1375 | 23.25 | 19.5 | 1.051 | 1.86 | 1.56 |
| 13 | 248.8 | 13.663 | 24.18 | 20.28 | 1.051 | 1.86 | 1.56 |
| 13.5 | 248.8 | 14.1885 | 25.11 | 21.06 | 1.051 | 1.86 | 1.56 |
| 14 | 248.8 | 14.714 | 26.04 | 21.84 | 1.051 | 1.86 | 1.56 |
| 15 | 248.8 | 15.765 | 27.9 | 23.4 | 1.051 | 1.86 | 1.56 |
| 16 | 248.8 | 16.816 | 29.76 | 24.96 | 1.051 | 1.86 | 1.56 |
| 18 | 248.8 | 18.918 | 33.48 | 28.08 | 1.051 | 1.86 | 1.56 |
| 20 | 248.8 | 21.02 | 37.2 | 31.2 | 1.051 | 1.86 | 1.56 |
| 21 | 248.8 | 22.071 | 39.06 | 32.76 | 1.051 | 1.86 | 1.56 |
| 22 | 248.8 | 23.122 | 40.92 | 34.32 | 1.051 | 1.86 | 1.56 |
| 24 | 248.8 | 25.224 | 44.64 | 37.44 | 1.051 | 1.86 | 1.56 |
| 29 | 248.8 | 30.479 | 53.94 | 45.24 | 1.051 | 1.86 | 1.56 |
| 33 | 248.8 | 34.683 | 61.38 | 51.48 | 1.051 | 1.86 | 1.56 |
| 35 | 248.8 | 36.785 | 65.1 | 54.6 | 1.051 | 1.86 | 1.56 |
| 40 | 248.8 | 42.04 | 74.4 | 62.4 | 1.051 | 1.86 | 1.56 |
| 45 | 248.8 | 47.295 | 83.7 | 70.2 | 1.051 | 1.86 | 1.56 |
| 48 | 248.8 | 50.448 | 89.28 | 74.88 | 1.051 | 1.86 | 1.56 |
| 50 | 248.8 | 52.55 | 93 | 78 | 1.051 | 1.86 | 1.56 |

TABLE 5

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 2 | 239.6 | 1.74 | 2.8 | 1.8 | 0.87 | 1.4 | 0.9 |
| 3 | 239.6 | 2.61 | 4.2 | 2.7 | 0.87 | 1.4 | 0.9 |
| 4 | 239.6 | 3.48 | 5.6 | 3.6 | 0.87 | 1.4 | 0.9 |
| 5 | 239.6 | 4.35 | 7 | 4.5 | 0.87 | 1.4 | 0.9 |
| 6 | 239.6 | 5.22 | 8.4 | 5.4 | 0.87 | 1.4 | 0.9 |
| 7 | 239.6 | 6.09 | 9.8 | 6.3 | 0.87 | 1.4 | 0.9 |
| 8 | 239.6 | 6.96 | 11.2 | 7.2 | 0.87 | 1.4 | 0.9 |
| 9 | 239.6 | 7.83 | 12.6 | 8.1 | 0.87 | 1.4 | 0.9 |
| 10 | 239.6 | 8.7 | 14 | 9 | 0.87 | 1.4 | 0.9 |
| 11 | 239.6 | 9.57 | 15.4 | 9.9 | 0.87 | 1.4 | 0.9 |
| 12 | 239.6 | 10.44 | 16.8 | 10.8 | 0.87 | 1.4 | 0.9 |
| 12.5 | 239.6 | 10.875 | 17.5 | 11.25 | 0.87 | 1.4 | 0.9 |
| 13 | 239.6 | 11.31 | 18.2 | 11.7 | 0.87 | 1.4 | 0.9 |
| 13.5 | 239.6 | 11.745 | 18.9 | 12.15 | 0.87 | 1.4 | 0.9 |
| 14 | 239.6 | 12.18 | 19.6 | 12.6 | 0.87 | 1.4 | 0.9 |
| 15 | 239.6 | 13.05 | 21 | 13.5 | 0.87 | 1.4 | 0.9 |
| 16 | 239.6 | 13.92 | 22.4 | 14.4 | 0.87 | 1.4 | 0.9 |
| 18 | 239.6 | 15.66 | 25.2 | 16.2 | 0.87 | 1.4 | 0.9 |
| 20 | 239.6 | 17.4 | 28 | 18 | 0.87 | 1.4 | 0.9 |
| 21 | 239.6 | 18.27 | 29.4 | 18.9 | 0.87 | 1.4 | 0.9 |
| 22 | 239.6 | 19.14 | 30.8 | 19.8 | 0.87 | 1.4 | 0.9 |
| 24 | 239.6 | 20.88 | 33.6 | 21.6 | 0.87 | 1.4 | 0.9 |
| 29 | 239.6 | 25.23 | 40.6 | 26.1 | 0.87 | 1.4 | 0.9 |
| 33 | 239.6 | 28.71 | 46.2 | 29.7 | 0.87 | 1.4 | 0.9 |
| 35 | 239.6 | 30.45 | 49 | 31.5 | 0.87 | 1.4 | 0.9 |
| 40 | 239.6 | 34.8 | 56 | 36 | 0.87 | 1.4 | 0.9 |
| 45 | 239.6 | 39.15 | 63 | 40.5 | 0.87 | 1.4 | 0.9 |
| 48 | 239.6 | 41.76 | 67.2 | 43.2 | 0.87 | 1.4 | 0.9 |
| 50 | 239.6 | 43.5 | 70 | 45 | 0.87 | 1.4 | 0.9 |

TABLE 6

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 2 | 235.7 | 1.526 | 1.88 | 0.88 | 0.763 | 0.94 | 0.44 |
| 3 | 235.7 | 2.289 | 2.82 | 1.32 | 0.763 | 0.94 | 0.44 |
| 4 | 235.7 | 3.052 | 3.76 | 1.76 | 0.763 | 0.94 | 0.44 |
| 5 | 235.7 | 3.815 | 4.7 | 2.2 | 0.763 | 0.94 | 0.44 |
| 6 | 235.7 | 4.578 | 5.64 | 2.64 | 0.763 | 0.94 | 0.44 |
| 7 | 235.7 | 5.341 | 6.58 | 3.08 | 0.763 | 0.94 | 0.44 |
| 8 | 235.7 | 6.104 | 7.52 | 3.52 | 0.763 | 0.94 | 0.44 |
| 9 | 235.7 | 6.867 | 8.46 | 3.96 | 0.763 | 0.94 | 0.44 |
| 10 | 235.7 | 7.63 | 9.4 | 4.4 | 0.763 | 0.94 | 0.44 |
| 11 | 235.7 | 8.393 | 10.34 | 4.84 | 0.763 | 0.94 | 0.44 |
| 12 | 235.7 | 9.156 | 11.28 | 5.28 | 0.763 | 0.94 | 0.44 |
| 12.5 | 235.7 | 9.5375 | 11.75 | 5.5 | 0.763 | 0.94 | 0.44 |
| 13 | 235.7 | 9.919 | 12.22 | 5.72 | 0.763 | 0.94 | 0.44 |
| 13.5 | 235.7 | 10.3005 | 12.69 | 5.94 | 0.763 | 0.94 | 0.44 |
| 14 | 235.7 | 10.682 | 13.16 | 6.16 | 0.763 | 0.94 | 0.44 |
| 15 | 235.7 | 11.445 | 14.1 | 6.6 | 0.763 | 0.94 | 0.44 |
| 16 | 235.7 | 12.208 | 15.04 | 7.04 | 0.763 | 0.94 | 0.44 |
| 18 | 235.7 | 13.734 | 16.92 | 7.92 | 0.763 | 0.94 | 0.44 |
| 20 | 235.7 | 15.26 | 18.8 | 8.8 | 0.763 | 0.94 | 0.44 |
| 21 | 235.7 | 16.023 | 19.74 | 9.24 | 0.763 | 0.94 | 0.44 |
| 22 | 235.7 | 16.786 | 20.68 | 9.68 | 0.763 | 0.94 | 0.44 |
| 24 | 235.7 | 18.312 | 22.56 | 10.56 | 0.763 | 0.94 | 0.44 |
| 29 | 235.7 | 22.127 | 27.26 | 12.76 | 0.763 | 0.94 | 0.44 |
| 33 | 235.7 | 25.179 | 31.02 | 14.52 | 0.763 | 0.94 | 0.44 |
| 35 | 235.7 | 26.705 | 32.9 | 15.4 | 0.763 | 0.94 | 0.44 |
| 40 | 235.7 | 30.52 | 37.6 | 17.6 | 0.763 | 0.94 | 0.44 |
| 45 | 235.7 | 34.335 | 42.3 | 19.8 | 0.763 | 0.94 | 0.44 |
| 48 | 235.7 | 36.624 | 45.12 | 21.12 | 0.763 | 0.94 | 0.44 |
| 50 | 235.7 | 38.15 | 47 | 22 | 0.763 | 0.94 | 0.44 |

Figure 8:
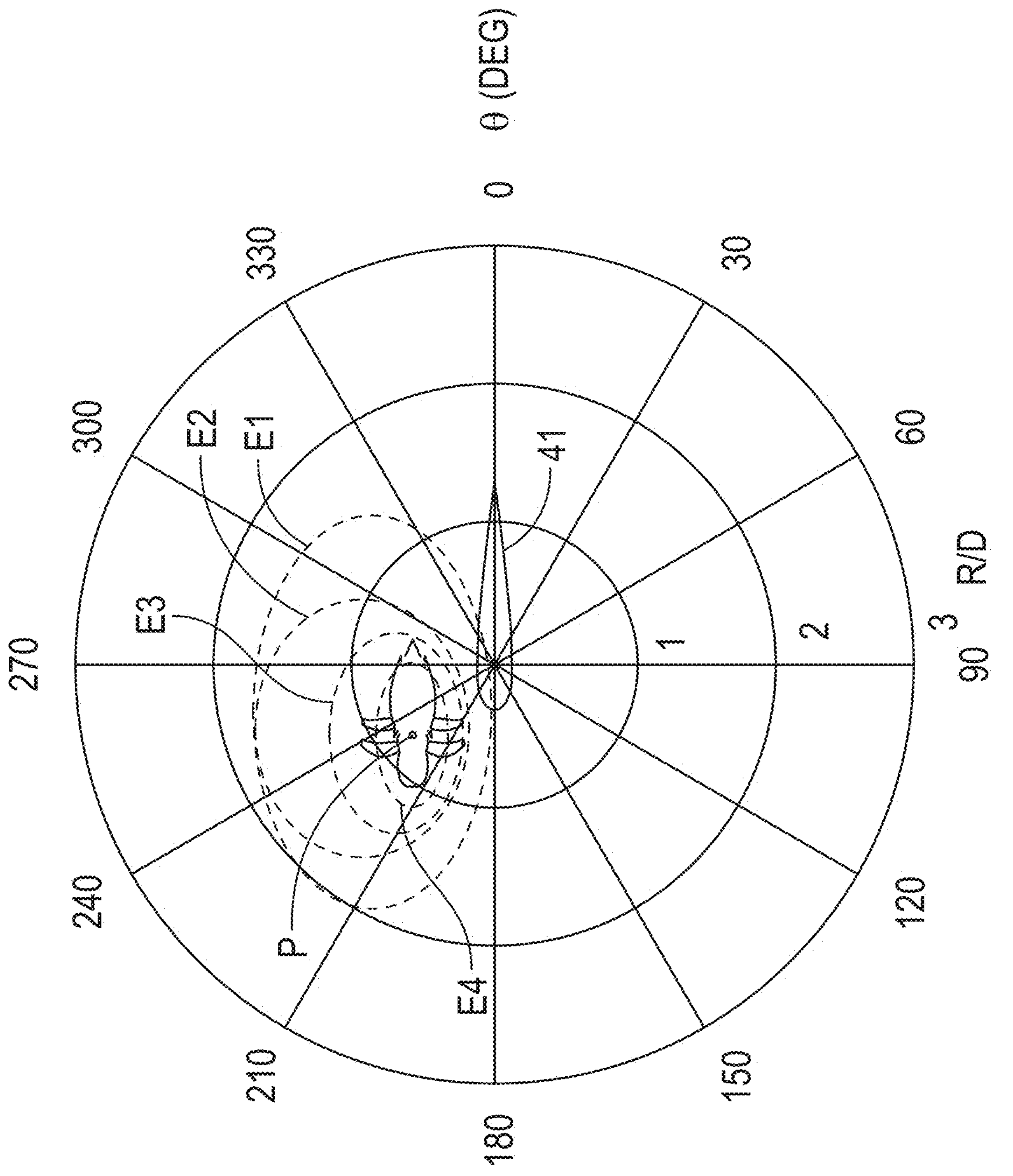
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.

Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section (again, for purposes of explanation, this chord line may be thought of as an axis passing through θ=0 deg and θ=180 deg in FIG. 11) for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

According to the foregoing examples or embodiments, the unducted fan propulsor 38, incorporating the vane assembly described herein, can be incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9. A propulsor that is part of an airplane that operates at a high cruise flight Mach number (e.g., greater than 0.7) encounters velocities near the surfaces of the rotor, vanes, and nacelle that approach or exceed the speed of sound, or Mach 1.0. In general, friction drag increases roughly in proportion to the square of the air velocity. However, as the Mach number increases, a significant contributor to the increase in drag can come from wave drag. Wave drag is a drag resulting from shock waves that form as the flow of air near a surface becomes supersonic (e.g., Mach >1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on the rotor, vanes, and nacelle.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, $\rho_0$ is ambient air density, $V_o$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there may be a particularly beneficial range of a dimensionless cruise fan net thrust parameter normalized by ambient density, cruise flight speed squared, and fan stream tube annular area at fan inlet defined by the following expression:

$$0.15 > \frac{F_{net}}{\rho_0 A_{an} V_0^2} > 0.06$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors wing. While the mounting configuration can be fixed, it is contemplated that the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or any other operating condition.

FIGS. 12 and 13 depicted additional examples of unducted propulsors that can be used in lieu of the unducted propulsor 38.

FIG. 12 is an exemplary embodiment of an engine 100 including a gear assembly 102 according to aspects of the present disclosure. The engine 100 includes a fan assembly 104 driven by a core engine 106. In various embodiments, the core engine 106 is a Brayton cycle system configured to drive the fan assembly 104. The core engine 106 is shrouded, at least in part, by an outer casing 114. The fan assembly 104 includes a plurality of fan blades 108. A vane assembly 110 extends from the outer casing 114 in a cantilevered manner. Thus, the vane assembly 110 can also be referred to as an unducted vane assembly. The vane assembly 110, including a plurality of vanes 112, is positioned in operable arrangement with the fan blades 108 to provide thrust, control thrust vector, abate or re-direct undesired acoustic noise, and/or otherwise desirably alter a flow of air relative to the fan blades 108.

In some embodiments, the fan assembly 104 includes eight (8) to twenty-six (26) fan blades 108. In particular embodiments, the fan assembly 104 includes ten (10) to twenty-two (22) fan blades 108. In certain embodiments, the fan assembly 104 includes twelve (12) to eighteen (18) fan blades 108. In some embodiments, the vane assembly 110 includes three (3) to thirty (30) vanes 112. In certain embodiments, the vane assembly 110 includes an equal or fewer quantity of vanes 112 to fan blades 108. For example, in particular embodiments, the engine 100 includes twelve (12) fan blades 108 and ten (10) vanes 112. In other embodiments, the vane assembly 110 includes a greater quantity of vanes 112 to fan blades 108. For example, in particular embodiments, the engine 100 includes ten (10) fan blades 108 and twenty-three (23) vanes 112. In another particular embodiment, the engine includes fourteen (14) fan blades.

In certain embodiments, such as depicted in FIG. 12, the vane assembly 110 is positioned downstream or aft of the fan assembly 104. However, it should be appreciated that in some embodiments, the vane assembly 110 may be positioned upstream or forward of the fan assembly 104. In still various embodiments, the engine 100 may include a first vane assembly positioned forward of the fan assembly 104 and a second vane assembly positioned aft of the fan assembly 104. The fan assembly 104 may be configured to desirably adjust pitch at one or more fan blades 108, such as to control thrust vector, abate or re-direct noise, and/or alter thrust output. The vane assembly 110 may be configured to desirably adjust pitch at one or more vanes 112, such as to control thrust vector, abate or re-direct noise, and/or alter thrust output. Pitch control mechanisms at one or both of the fan assembly 104 or the vane assembly 110 may co-operate to produce one or more desired effects described above.

In certain embodiments, such as depicted in FIG. 12, the engine 100 is an un-ducted thrust producing system, such that the plurality of fan blades 108 is unshrouded by a nacelle or fan casing. As such, in various embodiments, the engine 100 may be configured as an unshrouded turbofan engine, an open rotor engine, or a propfan engine. In particular embodiments, the engine 100 is an unducted rotor engine with a single row of fan blades 108. The fan blades 108 can have a large diameter, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally higher cruise speed than aircraft with turboprop engines), and/or relatively low rotational speeds.

The fan blades 108 comprise a diameter ($D_{fan}$). It should be noted that for purposes of illustration only half of the $D_{fan}$ is shown (i.e., the radius of the fan). In some embodiments, the $D_{fan}$ is 72-216 inches. In particular embodiments the $D_{fan}$ is 100-200 inches. In certain embodiments, the $D_{fan}$ is 120-190 inches. In other embodiments, the $D_{fan}$ is 72-120 inches. In other embodiments, the $D_{fan}$ is 80-100 inches. In yet other embodiments, the $D_{fan}$ is 50-80 inches.

In some embodiments, the fan blade tip speed at a cruise flight condition can be 650 to 900 fps, or 700 to 800 fps. A fan pressure ratio (FPR) for the fan assembly 104 can be 1.04 to 1.10, or in some embodiments 1.05 to 1.08, as measured across the fan blades at a cruise flight condition. In other examples, a fan pressure ratio for the fan assembly can be 1.05-1.5 (or 1.05-1.15 or 1.2-1.4) as measured at a static sea-level takeoff operating condition.

Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft. and approximately 45,000 ft. In still certain embodiments, cruise altitude is expressed in flight levels (FL) based on a standard air pressure at sea level, in which a cruise flight condition is between FL280 and FL650. In another embodiment, cruise flight condition is between FL280 and FL450. In certain embodiments, cruise altitude is defined based at least on a barometric pressure, in which cruise altitude is between approximately 4.85 psia and approximately 0.82 psia based on a sea-level pressure of approximately 14.70 psia and sea-level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea-level pressure and/or sea-level temperature.

The core engine 106 is generally encased in outer casing 114 defining one half of a core diameter ($D_{core}$), which may be thought of as the maximum extent from the centerline axis (datum for R). In certain embodiments, the engine 100 includes a length (L) from a longitudinally (or axial) forward end 116 to a longitudinally aft end 118. In various embodiments, the engine 100 defines a ratio of $L/D_{core}$ that provides for reduced installed drag. In one embodiment, $L/D_{core}$ is at least 2. In another embodiment, $L/D_{core}$ is at least 2.5. In some embodiments, the $L/D_{core}$ is less than 5, less than 4, and less than 3. In various embodiments, it should be appreciated that the $L/D_{core}$ is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the $L/D_{core}$, the fan assembly 104, and/or the vane assembly 110 separately or together configure, at least in part, the engine 100 to operate at a maximum cruise altitude operating speed between approximately Mach 0.55 and approximately Mach 0.85; or between approximately 0.72 to 0.85 or between approximately 0.75 to 0.85.

Referring still to FIG. 12, the core engine 106 extends in a radial direction (R) relative to an engine centerline axis 120. The gear assembly 102 receives power or torque from the core engine 106 through a power input source 122 and provides power or torque to drive the fan assembly 104, in a circumferential direction C about the engine centerline axis 120, through a power output source 124.

The gear assembly 102 of the engine 100 can include a plurality of gears, including an input and an output. The gear assembly can also include one or more intermediate gears disposed between and/or interconnecting the input and the output. The input can be coupled to a turbine section of the core engine 106 and can comprise a first rotational speed. The output can be coupled to the fan assembly and can have a second rotational speed. In some embodiments, a gear ratio of the first rotational speed to the second rotational speed is greater than 4.1 (e.g., within a range of 4.1-14.0).

The gear assembly 102 (which can also be referred to as “a gearbox”) can comprise various types and/or configuration. For example, in some embodiments, the gearbox is an epicyclic gearbox configured in a star gear configuration. Star gear configurations comprise a sun gear, a plurality of star gears (which can also be referred to as “planet gears”), and a ring gear. The sun gear is the input and is coupled to the power turbine (e.g., the low-pressure turbine) such that the sun gear and the power turbine rotate at the same rotational speed. The star gears are disposed between and interconnect the sun gear and the ring gear. The star gears are rotatably coupled to a fixed carrier. As such, the star gears can rotate about their respective axes but cannot collectively orbit relative to the sun gear or the ring gear. As another example, the gearbox is an epicyclic gearbox configured in a planet gear configuration. Planet gear configurations comprise a sun gear, a plurality of planet gears, and a ring gear. The sun gear is the input and is coupled to the power turbine. The planet gears are disposed between and interconnect the sun gear and the ring gear. The planet gears are rotatably coupled to a rotatable carrier. As such, the planet gears can rotate about their respective axes and also collectively rotate together with the carrier relative to the sun gear and the ring gear. The carrier is the output and is coupled to the fan assembly. The ring gear is fixed from rotation.

Figure 14:
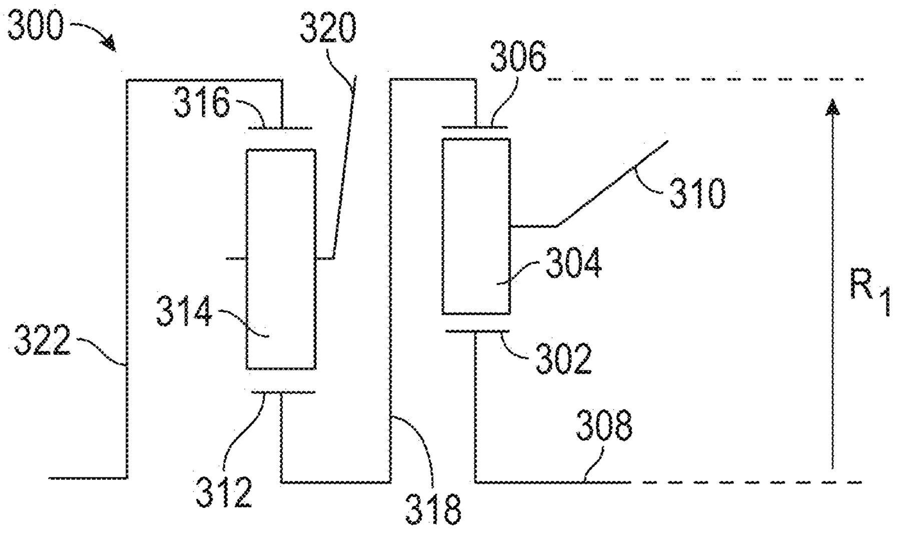
FIG. 14 depicts a cross-sectional schematic illustration of an exemplary embodiment of a gearbox configuration for a turbomachinery engine.
Figure 15:
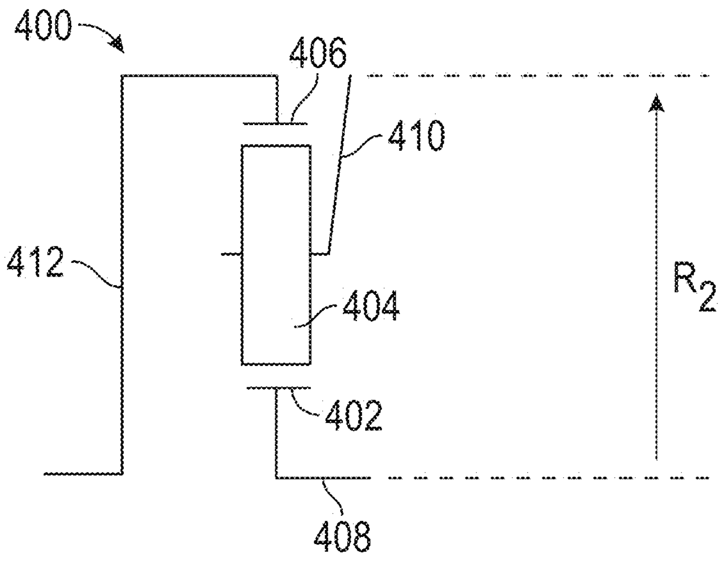
FIG. 15 depicts a cross-sectional schematic illustration of an exemplary embodiment of a gearbox configuration for a turbomachinery engine.
Figure 16:
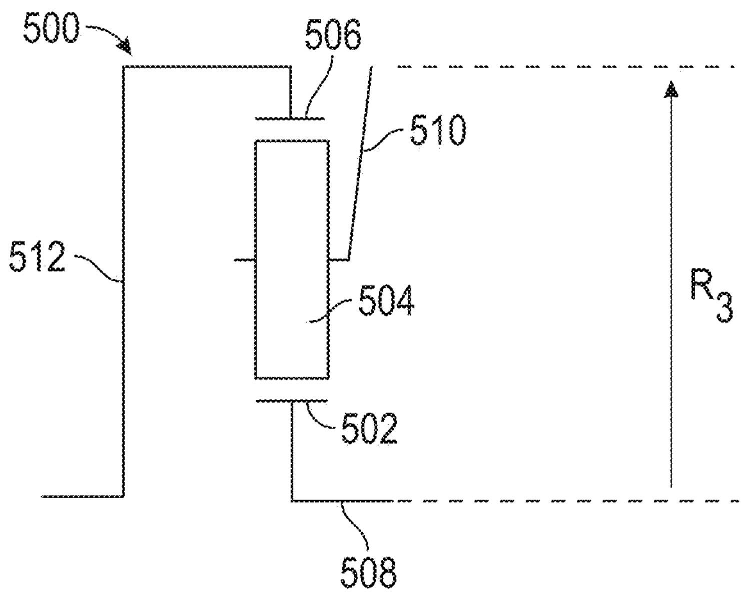
FIG. 16 depicts a cross-sectional schematic illustration of an exemplary embodiment of a gearbox configuration for a turbomachinery engine.

In some embodiments, the gearbox is a single-stage gearbox (e.g., FIGS. 15-16). In other embodiments, the gearbox is a multi-stage gearbox (e.g., FIGS. 14 and 17). In some embodiments, the gearbox is an epicyclic gearbox. In some embodiments, the gearbox is a non-epicyclic gearbox (e.g., a compound gearbox—FIG. 18).

As noted above, the gear assembly can be used to reduce the rotational speed of the output relative to the input. In some embodiments, a gear ratio of the input rotational speed to the output rotational speed is greater than 4.1. For example, in particular embodiments, the gear ratio is within a range of 4.1-14.0, within a range of 4.5-14.0, or within a range of 6.0-14.0. In certain embodiments, the gear ratio is within a range of 4.5-12 or within a range of 6.0-11.0. As such, in some embodiments, the fan assembly can be configured to rotate at a rotational speed of 700-1500 rpm at a cruise flight condition, while the power turbine (e.g., the low-pressure turbine) is configured to rotate at a rotational speed of 2,500-15,000 rpm at a cruise flight condition. In particular embodiments, the fan assembly can be configured to rotate at a rotational speed of 850-1350 rpm at a cruise flight condition, while the power turbine is configured to rotate at a rotational speed of 5,000-10,000 rpm at a cruise flight condition.

In some examples, a gear ratio of the input rotational speed to the output rotational speed is less than 6.0. For example, in particular embodiments, the gear ratio is within a range of 2.0-4.1, within a range of 2.5-3.75, or within a range of 3.2-4.1. In certain embodiments, the gear ratio is within a range of 3.0-3.5 or within a range of 3.25-3.55.

Various gear assembly configurations are depicted schematically in FIGS. 9-13. These gearboxes can be used any of the engines disclosed herein, including the engine 100. Additional details regarding the gearboxes are provided below.

FIG. 13 shows a cross-sectional view of an engine 200, which is configured as an exemplary embodiment of an open rotor propulsion engine. The engine 200 is generally similar to the engine 100 and corresponding components have been numbered similarly. For example, the gear assembly of the engine 100 is numbered "102" and the gear assembly of the engine 200 is numbered "202," and so forth. In addition to the gear assembly 202, the engine 200 comprises a fan assembly 204 that includes a plurality of fan blades 208 distributed around the engine centerline axis 220. Fan blades 208 are circumferentially arranged in an equally spaced relation around the engine centerline axis 220, and each fan blade 208 has a root 225 and a tip 226, and an axial span defined therebetween, as well as a central blade axis 228.

The core engine 206 includes a compressor section 230, a combustion section 232, and a turbine section 234 (which may be referred to as "an expansion section") together in a serial flow arrangement. The core engine 206 extends circumferentially relative to an engine centerline axis 220. The core engine 206 includes a high-pressure spool that includes a high-pressure compressor 236 and a high-pressure turbine 238 operably rotatably coupled together by a high-pressure shaft 240. The combustion section 232 is positioned between the high-pressure compressor 236 and the high-pressure turbine 238.

The combustion section 232 may be configured as a deflagrative combustion section, a rotating detonation combustion section, a pulse detonation combustion section, and/or other appropriate heat addition system. The combustion section 232 may be configured as one or more of a rich-burn system or a lean-burn system, or combinations thereof. In still various embodiments, the combustion section 232 includes an annular combustor, a can combustor, a cannular combustor, a trapped vortex combustor (TVC), or other appropriate combustion system, or combinations thereof.

The core engine 206 also includes a booster or low-pressure compressor positioned in flow relationship with the high-pressure compressor 236. The low-pressure compressor 242 is rotatably coupled with the low-pressure turbine 244 via a low-pressure shaft 246 to enable the low-pressure turbine 244 to drive the low-pressure compressor 242. The low-pressure shaft 246 is also operably connected to the gear assembly 202 to provide power to the fan assembly 204, such as described further herein.

It should be appreciated that the terms "low" and "high," or their respective comparative degrees (e.g., "lower" and "higher", where applicable), when used with compressor, turbine, shaft, or spool components, each refer to relative pressures and/or relative speeds within an engine unless otherwise specified. For example, a "low spool" or "low-speed shaft" defines a component configured to operate at a rotational speed, such as a maximum allowable rotational speed, lower than a "high spool" or "high-speed shaft" of the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed turbine within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

The compressors and/or turbines disclosed herein can include various stage counts. As disclosed herein the stage count includes the number of rotors or blade stages in a particular component (e.g., a compressor or turbine). For example, in some embodiments, a low-pressure compressor can comprise 1-8 stages or more narrowly 3 or 4 stages, a high-pressure compressor can comprise 8-15 stages or more narrowly 8-11 stages, or 8-10 stages, or 8 or 9 stages, a high-pressure turbine comprises 1-2 stages, and/or a low-pressure turbine comprises 3-7 stages, or more narrowly 3-5 stages. For example, in certain embodiments, an engine can comprise a one, two, or three stage low-pressure compressor, a 9 or 10 stage high-pressure compressor, a one or two stage high-pressure turbine, and a 4 stage low-pressure turbine. As another example, an engine can comprise a three or four stage low-pressure compressor, a 10 stage high-pressure compressor, a two stage high-pressure turbine, and a 4 stage low-pressure turbine.

As discussed in more detail below, the core engine 206 includes the gear assembly 202 that is configured to transfer power from the turbine section 234 and reduce an output rotational speed at the fan assembly 204 relative to the low-pressure turbine 244. Embodiments of the gear assembly 202 depicted and described herein can allow for gear ratios suitable for large-diameter unducted fans (e.g., gear ratios of 4.1-4.5, 4.1-14.0, 4.5-14.0, and/or 6.0-14.0). Additionally, embodiments of the gear assembly 202 provided herein may be suitable within the radial or diametrical constraints of the core engine 206 within the outer casing 214.

Various gearbox configurations are depicted schematically in FIGS. 14-18. These gearboxes can be used in any of the engines disclosed herein, including the engine 200. Additional details regarding the gearboxes are provided below.

Engine 200 also includes a vane assembly 210 comprising a plurality of vanes 212 disposed around engine centerline axis 220. Each vane 212 has a root 248 and a tip 250, and a span defined therebetween. Vanes 212 can be arranged in a variety of manners. In some embodiments, for example, they are not all equidistant from the rotating assembly.

In some embodiments, vanes 212 are mounted to a stationary frame and do not rotate relative to the engine centerline axis 220 but may include a mechanism for adjusting their orientation relative to their axis 254 and/or relative to the fan blades 208. For reference purposes, FIG. 13 depicts a forward direction denoted with arrow F, which in turn defines the forward and aft portions of the system.

As depicted in FIG. 13, the fan assembly 204 is located forward of the core engine 106 with the exhaust 256 located aft of core engine 206 in a "puller" configuration. Other configurations are possible and contemplated as within the scope of the present disclosure, such as what may be termed a "pusher" configuration embodiment where the engine core is located forward of the fan assembly. The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

Left- or right-handed engine configurations, useful for certain installations in reducing the impact of multi-engine torque upon an aircraft, can be achieved by mirroring the airfoils (e.g., 208, 212) such that the fan assembly 204 rotates clockwise for one propulsion system and counter-clockwise for the other propulsion system. Alternatively, an optional reversing gearbox can be provided to permits a common gas turbine core and low-pressure turbine to be used to rotate the fan blades either clockwise or counter-clockwise, i.e., to provide either left- or right-handed configurations, as desired, such as to provide a pair of oppositely-rotating engine assemblies can be provided for certain aircraft installations while eliminating the need to have internal engine parts designed for opposite rotation directions.

The engine 200 also includes the gear assembly 202 which includes a gear set for decreasing the rotational speed of the fan assembly 204 relative to the low-pressure turbine 244. In operation, the rotating fan blades 208 are driven by the low-pressure turbine 244 via gear assembly 202 such that the fan blades 208 rotate around the engine centerline axis 220 and generate thrust to propel the engine 200, and hence an aircraft on which it is mounted, in the forward direction F.

In some embodiments, a gear ratio of the input rotational speed to the output rotational speed is greater than 4.1, such as between 4.1 and 4.5 for a ducted turbofan with variable pitch and between 6.0 and 10.0 for an open rotor turbofan. For example, in particular embodiments, the gear ratio is within a range of 4.1-14.0, within a range of 4.5-14.0, or within a range of 6.0-14.0. In certain embodiments, the gear ratio is within a range of 4.5-12 or within a range of 6.0-11.0. As such, in some embodiments, the fan assembly can be configured to rotate at a rotational speed of 700-1500 rpm at a cruise flight condition, while the power turbine (e.g., the low-pressure turbine) is configured to rotate at a rotational speed of 5,000-10,000 rpm at a cruise flight condition. In particular embodiments, the fan assembly can be configured to rotate at a rotational speed of 850-1350 rpm at a cruise flight condition, while the power turbine is configured to rotate at a rotational speed of 5,500-9,500 rpm a cruise flight condition.

It may be desirable that either or both of the fan blades 208 or the vanes 212 to incorporate a pitch change mechanism such that the blades can be rotated with respect to an axis of pitch rotation (annotated as 228 and 254, respectively) either independently or in conjunction with one another. Such pitch change can be utilized to vary thrust and/or swirl effects under various operating conditions, including to provide a thrust reversing feature which may be useful in certain operating conditions such as upon landing an aircraft.

Vanes 212 can be sized, shaped, and configured to impart a counteracting swirl to the fluid so that in a downstream direction aft of both fan blades 208 and vanes 212 the fluid has a greatly reduced degree of swirl, which translates to an increased level of induced efficiency. Vanes 212 may have a shorter span than fan blades 208, as shown in FIG. 13. For example, vanes 212 may have a span that is at least 50% of a span of fan blades 208. In some embodiments, the span of the vanes can be the same or longer than the span as fan blades 208, if desired. Vanes 212 may be attached to an aircraft structure associated with the engine 200, as shown in FIG. 2, or another aircraft structure such as a wing, pylon, or fuselage. Vanes 212 may be fewer or greater in number than, or the same in number as, the number of fan blades 208. In some embodiments, the number of vanes 212 are greater than two, or greater than four, in number. Fan blades 208 may be sized, shaped, and contoured with the desired blade loading in mind.

In the embodiment shown in FIG. 13, an annular 360-degree inlet 258 is located between the fan assembly 204 and the vane assembly 210 and provides a path for incoming atmospheric air to enter the core engine 206 radially inwardly of at least a portion of the vane assembly 210. Such a location may be advantageous for a variety of reasons, including management of icing performance as well as protecting the inlet 258 from various objects and materials as may be encountered in operation.

In the exemplary embodiment of FIG. 13, in addition to the open rotor or unducted fan assembly 204 with its plurality of fan blades 208, an optional ducted fan assembly 260 is included behind fan assembly 204, such that the engine 200 includes both a ducted and an unducted fan which both serve to generate thrust through the movement of air at atmospheric temperature without passage through the core engine 206. The ducted fan assembly 260 is shown at about the same axial location as the vane 212, and radially inward of the root 248 of the vane 212. Alternatively, the ducted fan assembly 260 may be between the vane 212 and core duct 262 or be farther forward of the vane 212. The ducted fan assembly 260 may be driven by the low-pressure turbine 244, or by any other suitable source of rotation, and may serve as the first stage of the low-pressure compressor 242 or may be operated separately. Air entering the inlet 258 flows through an inlet duct 264 and then is divided such that a portion flows through a core duct 262 and a portion flows through a fan duct 266. Fan duct 266 may incorporate one or more heat exchangers 268 and exhausts to the atmosphere through an independent fixed or variable nozzle 270 aft of the vane assembly 210, at the aft end of the fan cowl 252 and outside of the engine core cowl 272. Air flowing through the fan duct 266 thus "bypasses" the core of the engine and does not pass through the core.

Thus, in the exemplary embodiment, engine 200 includes an unducted fan formed by the fan blades 208, followed by the ducted fan assembly 260, which directs airflow into two concentric or non-concentric ducts 262 and 266, thereby forming a three-stream engine architecture with three paths for air which passes through the fan assembly 204. The "first stream" of the engine 200 comprises airflow that passes through the vane assembly 210 and/or outside the fan cowl 252. As such, the first stream can be referred to as "the bypass stream" since the airflow of the first stream does not pass through the core duct 262. The first stream produces the majority of the thrust of the engine 200 and can thus also be referred to as "the primary propulsion stream." The "second stream" of the engine 200 comprises the airflow that flows into the inlet 258, through the inlet duct 264, through the core duct 262, and exits the core nozzle 278. In this manner, the second stream can be referred to as "the core stream." The "third stream" of the engine 200 comprises the airflow that flows into the inlet 258, through the inlet duct 264, through the fan duct 266, and exits the nozzle 270.

A "third stream" as used herein means a secondary air stream capable of increasing fluid energy to produce a minority of total thrust of an engine (e.g., the engine 200). Accordingly, in various embodiments the fan duct 266, having the one or heat exchangers 268 located within the flowpath of the fan duct 266, may be referred to as the "third-stream" of the three-stream engine architecture.

The pressure ratio of the third stream is higher than that of the primary propulsion stream (i.e., the bypass stream). This thrust is produced through a dedicated nozzle or through mixing of the secondary stream with a fan stream or a core stream (e.g., into a common nozzle). In certain exemplary embodiments the operating temperature of an airflow through the third stream is less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures facilitate the heat transfer to or from the fluid in the third stream and a secondary fluid stream. Further, in certain exemplary embodiments, the airflow through the third stream may contribute less than 50% of the total engine thrust (and at least, e.g., 2% of the total engine thrust), and at a takeoff condition, or more particularly while operating at a rated takeoff power at sea level, static flight speed, 86 degrees Fahrenheit ambient temperature operating conditions. Furthermore, in certain exemplary embodiments the airstream, mixing, or exhaust properties (and thereby the aforementioned exemplary percent contribution to total thrust) of the third stream may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

In the exemplary embodiment shown in FIG. 13, a slidable, moveable, and/or translatable plug nozzle 274 with an actuator may be included in order to vary the exit area of the nozzle 270. A plug nozzle is typically an annular, symmetrical device which regulates the open area of an exit such as a fan stream or core stream by axial movement of the nozzle such that the gap between the nozzle surface and a stationary structure, such as adjacent walls of a duct, varies in a scheduled fashion thereby reducing or increasing a space for airflow through the duct. Other suitable nozzle designs may be employed as well, including those incorporating thrust reversing functionality. Such an adjustable, moveable nozzle may be designed to operate in concert with other systems such as VBV's, VSV's, or blade pitch mechanisms and may be designed with failure modes such as fully-open, fully-closed, or intermediate positions, so that the nozzle 270 has a consistent "home" position to which it returns in the event of any system failure, which may prevent commands from reaching the nozzle 270 and/or its actuator. In other embodiments a static nozzle may be utilized.

In some embodiments, a mixing device 276 can be included in a region aft of a core nozzle 278 to aid in mixing the fan stream and the core stream to improve acoustic performance by directing core stream outward and fan stream inward.

Since the engine 200 shown in FIG. 13 includes both an open rotor fan assembly 204, a ducted fan assembly 260 and the third stream, the engine's thrust output and work split can be tailored to achieve specific thrust, fuel burn, thermal management, and/or acoustic signature objectives which may be superior to those of a typical ducted or unducted fan gas turbine propulsion assembly of comparable thrust class. Operationally, the engine 200 may include a control system that manages the loading of the respective open and ducted fans, as well as potentially the exit area of the variable fan nozzle, to provide different thrust, noise, cooling capacity and other performance characteristics for various portions of the flight envelope and various operational conditions associated with aircraft operation. For example, in climb mode the ducted fan may operate at maximum pressure ratio there-by maximizing the thrust capability of stream, while in cruise mode, the ducted fan may operate a lower pressure ratio, raising overall efficiency through reliance on thrust from the unducted fan. Nozzle actuation modulates the ducted fan operating line and overall engine fan pressure ratio independent of total engine airflow. In other embodiments, loading may be managed using a static nozzle.

As noted above, the third stream (e.g., the fan duct 266) may include one or more heat exchangers 268 for removing heat from various fluids used in engine operation (such as an air-cooled oil cooler (ACOC), cooled cooling air (CCA), etc.). Heat exchangers 268 located in the third stream take advantage of the integration into the fan duct 266 with reduced performance penalties (such as fuel efficiency and thrust) compared with traditional ducted fan architectures, due to not impacting the primary source of thrust which is, in this case, the unducted fan stream. Heat exchangers may cool fluids such as gearbox oil, engine sump oil, thermal transport fluids such as supercritical fluids or commercially available single-phase or two-phase fluids (supercritical CO2, EGV, Slither 800, liquid metals, etc.), engine bleed air, etc. Heat exchangers may also be made up of different segments or passages that cool different working fluids, such as an ACOC paired with a fuel cooler. Heat exchangers 268 may be incorporated into a thermal management system which provides for thermal transport via a heat exchange fluid flowing through a network to remove heat from a source and transport it to a heat exchanger.

The third stream can provide advantages in terms of reduced nacelle drag, enabling a more aggressive nacelle close-out, improved core stream particle separation, and inclement weather operation. By exhausting the fan duct flow over the core cowl, this aids in energizing the boundary layer and enabling the option of a steeper nacelle close out angle between the maximum dimension of the engine core cowl 272 and the exhaust 256. The close-out angle is normally limited by air flow separation, but boundary layer energization by air from the fan duct 266 exhausting over the core cowl reduces air flow separation. This yields a shorter, lighter structure with less frictional surface drag.

It should be appreciated that certain aspects of the disclosure address issues that specific to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

The unducted engines 38, 100, 200 can comprise pitch change mechanism configured for adjusting the pitch for fan. In this manner, the fans of the engines 38, 100, 200 can therefore be referred to as "VPFs." For example, the engine 200 comprises a pitch change mechanism 282 coupled to the fan assembly 204 and configured to vary the pitch of the fan blades 208. In certain embodiments, the pitch change mechanism 282 can be a linear actuated pitch change mechanism.

According to some embodiments there is an unducted engine characterized by a high gear ratio. A high gear ratio gearbox means a gearbox with a gear ratio of above about 4:1 to about 14:1 (or about 4.5:1 to about 12:1 in particular embodiments). For example, the engines disclosed herein can include a gearbox configured such the output speed (i.e., the speed of the propulsor) is about 400-800 rpm at a cruise flight condition, or more particularly 450-1000 rpm at a cruise flight condition.

Various exemplary gear assemblies are shown and described herein. In particular, FIGS. 14-18 schematically depict several exemplary gear assemblies that can be used with the engines 38, 100, 200. The disclosed gear assemblies may be utilized with any of the exemplary engines and/or any other suitable engine for which such gear assemblies may be desirable. In such a manner, it will be appreciated that the gear assemblies disclosed herein may generally be operable with an engine having a rotating element with a plurality of rotor blades and a turbomachinery having a turbine and a shaft rotatable with the turbine. With such an engine, the rotating element (e.g., fan assembly 104) may be driven by the shaft (e.g., low-pressure shaft) of the engine through the gear assembly.

Various embodiments of the gear assembly provided herein may allow for gear ratios of up to 14:1 (e.g., 2:1 to 14:1). Still various embodiments of the gear assemblies provided herein may allow for gear ratios of at least 4.1:1 or 4.5:1. Still yet various embodiments of the gear assemblies provided herein allow for gear ratios of 6:1 to 12:1. Still yet various embodiments of the gear assemblies provided herein allow for gear ratios of 6:1 to 9:1 or 7:1 to 9:1.

FIG. 14 schematically depicts a gearbox 300 that can be used, for example, with engines 38, 100, 200. The gearbox 300 comprises a two-stage star configuration.

The first stage of the gearbox 300 includes a first-stage sun gear 302, a first-stage carrier 304 housing a plurality of first-stage star gears, and a first-stage ring gear 306. The first-stage sun gear 302 can be coupled to a low-pressure shaft 308, which in turn is coupled to the low-pressure turbine of the engine. The first-stage sun gear 302 can mesh with the first-stage star gears, which mesh with the first-stage ring gear. The first-stage carrier 304 can be fixed from rotation by a support member 310.

The second stage of the gearbox 300 includes a second-stage sun gear 312, a second-stage carrier 314 housing a plurality of second-stage star gears, and a second-stage ring gear 316. The second-stage sun gear 312 can be coupled to a shaft 318 which in turn is coupled to the first-stage ring gear 306. The second-stage carrier 314 can be fixed from rotation by a support member 320. The second-stage ring gear 316 can be coupled to a fan shaft 322.

In some embodiments, each stage of the gearbox 300 can comprise five star gears. In other embodiments, the gearbox 300 can comprise fewer or more than five star gears in each stage. In some embodiments, the first-stage carrier can comprise a different number of star gears than the second-stage carrier. For example, the first-stage carrier can comprise five star gears, and the second-stage carrier can comprise three star gears, or vice versa.

In some embodiments, the radius $R_1$ of the gearbox 300 can be about 16-19 inches. In other embodiments, the radius $R_1$ of the gearbox 300 can be about 22-24 inches. In other embodiments, the radius $R_1$ of the gearbox 300 can be smaller than 16 inches or larger than 24 inches.

FIG. 15 schematically depicts a gearbox 400 that can be used, for example, with engines 38, 100, 200. The gearbox 400 comprises a single-stage star configuration. The gearbox 400 includes a sun gear 402, a carrier 404 housing a plurality of star gears (e.g., 3-5 star gears), and a ring gear 406. The sun gear 402 can mesh with the star gears, and the star gears can mesh with the ring gear 406. The sun gear 402 can be coupled to a low-pressure shaft 408, which in turn is coupled to the low-pressure turbine of the engine. The carrier 404 can be fixed from rotation by a support member 410. The ring gear 406 can be coupled to a fan shaft 412.

In some embodiments, the radius $R_2$ of the gearbox 400 can be about 18-23 inches. In other embodiments, the radius $R_2$ of the gearbox 700 can be smaller than 18 inches or larger than 23 inches.

FIG. 16 schematically depicts a gearbox 500 that can be used, for example, with engines 38, 100, 200. The gearbox 500 comprises a single-stage star configuration. The gearbox 500 includes a sun gear 502, a carrier 504 housing a plurality of star gears (e.g., 3-5 star gears), and a ring gear 506. The sun gear 502 can mesh with the star gears, and the star gears can mesh with the ring gear 506. The sun gear 502 can be coupled to a low-pressure shaft 508, which in turn is coupled to the low-pressure turbine of the engine. The carrier 504 can be fixed from rotation by a support member 510. The ring gear 506 can be coupled to a fan shaft 512.

In some embodiments, the radius $R_3$ of the gearbox 500 can be about 10-13 inches. In other embodiments, the radius $R_3$ of the gearbox 500 can be smaller than 10 inches or larger than 13 inches.

Figure 17:
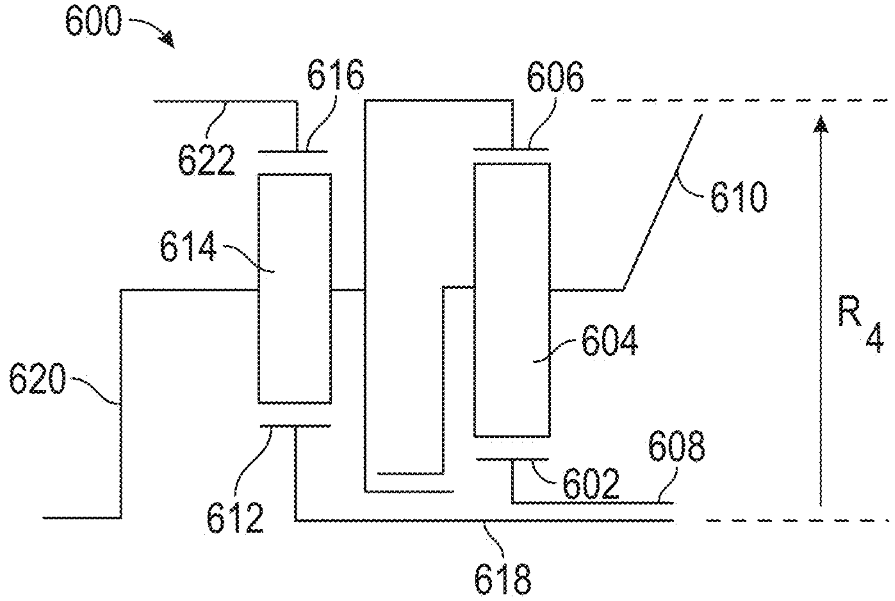
FIG. 17 depicts a cross-sectional schematic illustration of an exemplary embodiment of a gearbox configuration for a turbomachinery engine.

FIG. 17 schematically depicts a gearbox 600 that can be used, for example, with engines 38, 100, 200. The gearbox 600 comprises a two-stage configuration in which the first stage is a star configuration and the second stage is a planet configuration.

The first stage of the gearbox 600 includes a first-stage sun gear 602, a first-stage star carrier 604 comprising a plurality of first-stage star gears (e.g., 3-5 star gears), and a first-stage ring gear 606. The first-stage sun gear 602 can mesh with the first-stage star gears, and the first-stage star gears can mesh with the first-stage ring gear 606. The first-stage sun gear 602 can be coupled to a higher-speed shaft 608 of the low spool, which in turn is coupled to the inner blades of the low-pressure turbine of the engine. The first-stage star carrier 604 can be fixed from rotation by a support member 610.

The second stage of the gearbox 600 includes a second-stage sun gear 612, a second-stage planet carrier 614 comprising a plurality of second-stage planet gears (e.g., 3-5 planet gears), and a second-stage ring gear 616. The second-stage sun gear 612 can mesh with the second-stage planet gears. The second-stage planet carrier 614 can be coupled to the first-stage ring gear 606. The second-stage sun gear 612 can be coupled to a lower-speed shaft 618 of the low spool, which in turn is coupled to the outer blades of the low-pressure turbine of Engine 4. The second-stage planet carrier 614 can be coupled to the first-stage ring gear 606. The second-stage planet carrier 614 can also be coupled to a fan shaft 620. The second-stage ring gear 616 can be fixed from rotation by a support member 622.

In some embodiments, each stage of the gearbox 600 can comprise three star/planet gears. In other embodiments, the gearbox 600 can comprise fewer or more than three star/planet gears in each stage. In some embodiments, the first-stage carrier can comprise a different number of star gears than the second-stage carrier has planet gears. For example, the first-stage carrier can comprise five star gears, and the second-stage carrier can comprise three planet gears, or vice versa.

Since the first stage of the gearbox 600 is coupled to the higher-speed shaft 608 of the low spool and the second stage of the gearbox 600 is coupled to the lower-speed shaft 618 of the low spool, the gear ratio of the first stage of the gearbox 600 can be greater than the gear ratio of the second stage of the gearbox. For example, in certain embodiments, the first stage of the gearbox can comprise a gear ratio of 4.1-14, and the second stage of the gearbox can comprise a gear ratio that is less than the gear ratio of the first stage of the gearbox. In particular embodiments, the first stage of the gearbox can comprise a gear ratio of 7, and the second stage of the gearbox can comprise a gear ratio of 6.

In some embodiments, an engine comprising the gearbox 600 can be configured such that the higher-speed shaft 608 provides about 50% of the power to the gearbox 600 and the lower-speed shaft 618 provides about 50% of the power to the gearbox 600. In other embodiments, an engine comprising the gearbox 600 can be configured such that the higher-speed shaft 608 provides about 60% of the power to the gearbox 600 and the lower-speed shaft 618 provides about 40% of the power to the gearbox 600.

In some embodiments, the radius $R_4$ of the gearbox 600 can be about 18-22 inches. In other embodiments, the radius $R_4$ of the gearbox 600 can be smaller than 18 inches or larger than 22 inches.

Figure 18:
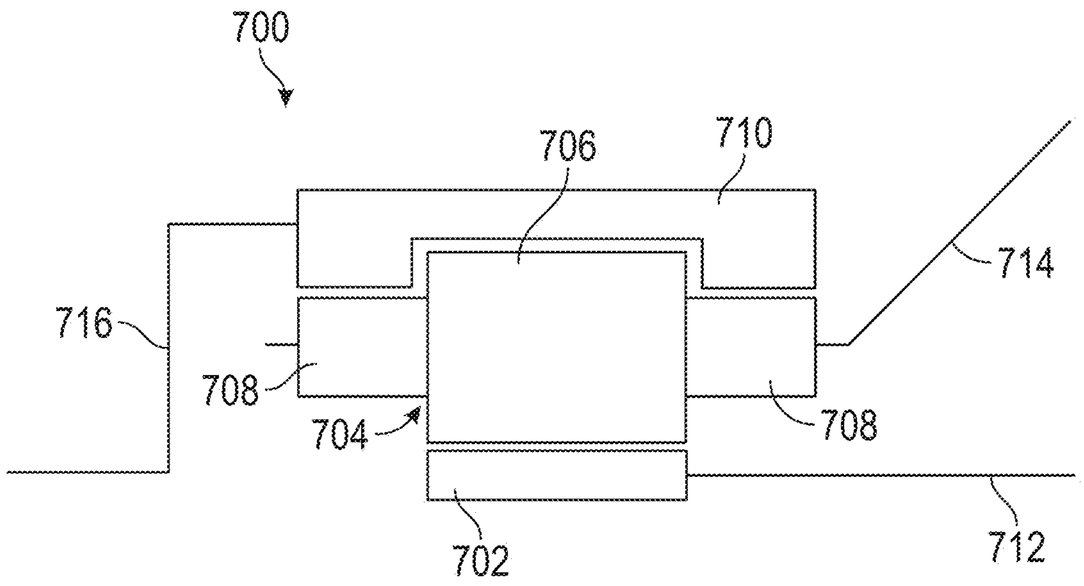
FIG. 18 depicts a cross-sectional schematic illustration of an exemplary embodiment of a gearbox configuration for a turbomachinery engine.

FIG. 18 depicts a gearbox 700 that can be used, for example, with the engines disclosed herein (e.g., the engines 38, 100, 200). The gearbox 700 is configured as a compound star gearbox. The gearbox 700 comprises a sun gear 702 and a star carrier 704, which includes a plurality of compound star gears having one or more first portions 706 and one or more second portions 708. The gearbox 700 further comprises a ring gear 710. The sun gear 702 can also mesh with the first portions 706 of the star gears. The star carrier can be fixed from rotation via a support member 714. The second portions 708 of the star gears can mesh with the ring gear 710. The sun gear 702 can be coupled to a low-pressure turbine via the turbine shaft 712. The ring gear 710 can be coupled to a fan shaft 716.

The engines depicted herein are configured such that the fan assembly and the core engine are concentric (i.e., the rotate about a common axis, which may also be referred to as “coaxial”). In other embodiments, an engine can be configured such that the fan assembly rotates about a first axis and the core engine rotates about a second axis that are non-concentric (also referred to as “eccentric”).

Each embodiment of unducted fan propulsor disclosed herein can comprise a variable pitch fan (“VPF”) and actuation member (e.g., the pitch change mechanism 282). The disclosed engines can also comprise a gearbox. Adoption of a variable pitch fan provides one or more advantages (e.g., increased propulsive efficiency) and also presents significant challenges. For example, incorporating variable pitch fan blades creates challenges with the mechanical packaging and mechanical integration including the packaging and integration of the actuation member and coupling between the blades and actuation member. Turbomachinery that instead has a fixed pitch for fan blades are comparatively simpler to implement. For example, when a fixed pitch turbomachinery is adopted, it is much easier to achieve a reduction in fan radius ratio (as defined below) because less space is needed for packaging and integration of a fan blade below the blade root, e.g., less space is needed because attachment of a blade is made directly to the fan disk as opposed to through a bearing assembly. The desire to achieve an acceptable fan radius ratio while providing a variable pitch capability for a fan blade, and arriving at a turbomachinery design incorporating such a capability while satisfying other necessary requirements, such as acceptable reliability for its intended use, mission requirements, etc., safety margin in the event of, e.g., debris impacting and damaging a fan blade, and accessibility for servicing of a variable pitch fan, blade replacement, etc. presents formidable challenges to overcome.

A few particular fan parameters arranged in a unique combination provided a good approximation for an overall variable pitch fan design. More specifically, certain ranges of values define embodiments of a variable pitch fan including, but not limited to bearing size, shape, orientation, material, etc., can inform the skilled artisan of the positive and negative attributes of choosing one embodiment over another, and as a function of the performance requirements of the turbomachinery. Thus, the discovered values define not only benefits but also penalties associated with choosing one design over another depending on the requirements of the engine (e.g., blade size, tip speed of fan, packaging, integration, etc.). The embodiments defined by these VPF parameters, as they are called, therefore provide a significant benefit because they define a design space down to a reduced number of practical embodiments based on the underlying structural requirements needed to meet the demand. Those structural requirements implicated are with respect to demands such as achieving a particular weight, size, drag, and/other factors relevant to the mechanical packaging of the VPF. For example, the VPF parameter ranges disclosed herein account for limitations (e.g., bearing stress) and thus allow for adequate mechanical integration.

There are two VPF parameters of particular significance. The first VPF parameter is defined as the hub-to-tip radius ratio of the fan (“RR”) divided by the fan pressure ratio (“FPR”) measured at a static sea-level takeoff operating condition. The second VPF parameter is defined as the bearing spanwise force of the fan (“F_span”) at a redline operating condition measured in pounds force divided by the fan area (“F_area”) measured in square inches.

Integrating an engine with a variable pitch fan architecture and the first and second VPF parameters with the propulsor placement and aerodynamic criteria enables a unified propulsion system that simultaneously improves propulsive efficiency, reduces installation drag, and mitigates acoustic and vibratory penalties. In particular, when a variable pitch unducted fan designed in accordance with the disclosed VPF parameters (e.g., optimized hub-to-tip ratio, fan pressure ratio, and bearing loading) is mounted at the empirically defined positional envelopes relative to the wing QC, the resulting configuration can provide relatively higher net thrust, with reduced mechanical and aerodynamic losses. This combination produces synergy between mechanical design and aerodynamic placement—achieving improved overall efficiency, reduced structural weight, and lower noise through cooperative tuning of the fan's variable pitch mechanism, gearbox ratio, and location on the aircraft.

Figure 29:
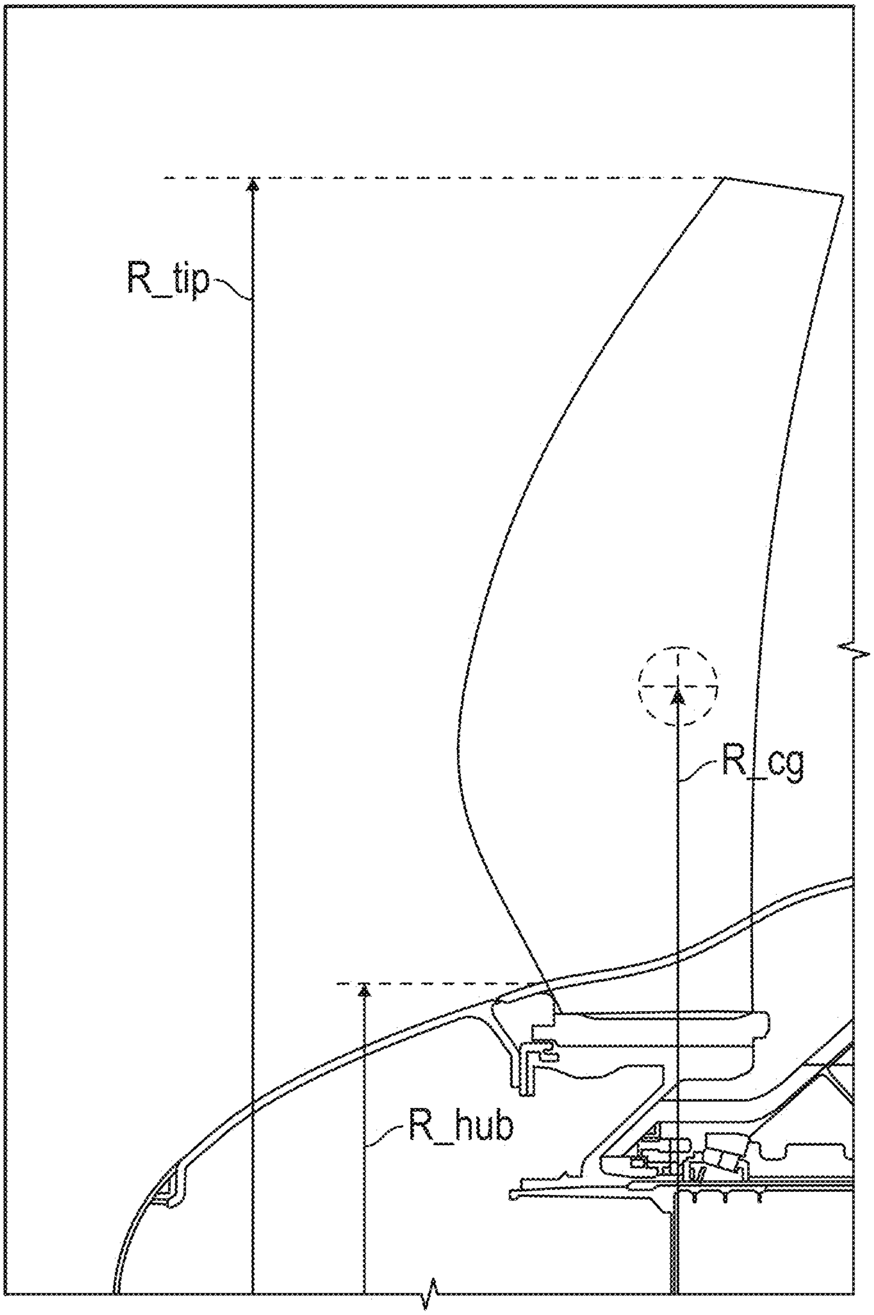
FIG. 29 depicts a partial cross-sectional schematic illustration of an exemplary embodiment of a turbomachinery engine configured with an unducted propulsion system and a variable pitch fan.

As used herein, fan radius ratio is defined as the fan hub radius (R_hub) divided by the fan tip radius (R_tip), both measured at the leading edge of the fan blades from the fan rotation axis. An exemplary fan comprising the various dimensions is depicted in FIG. 29. In some examples, the fan radius ratio is within a range of 0.125-0.55. In other examples, the fan radius ratio is within a range of 0.2-0.5. In particular examples, the fan radius ratio is within a range of 0.25-0.35.

Fan pressure ratio is defined as the ratio of total pressures across the fan (exit/inlet) during a static sea-level takeoff (SLTO) operating condition. In some examples, the fan pressure ratio at a static sea-level takeoff operating condition is within a range of 1.05-1.5. In some examples, the fan pressure ratio at a static sea-level takeoff operating condition is within a range of 1.05-1.15, which (in certain instances) can correspond to an unducted fan.

Bearing spanwise force (F_span) of a fan blade is defined as (mass of the fan blade/386.4)*R_cg*$\omega^2$, where R_cg is the radius of the center of gravity of the fan blade measured from the fan rotation axis (inches), and ω is a redline speed of the fan measured in radians/second. The center of gravity and thus the R_cg can be calculated or approximated in various ways. As one example, R_cg can be approximated by the following equation: R_hub+⅓*(R_tip−R_hub). F_span is measured in pounds force (lbf). In some examples, F_span is within a range of 20,000-200,000 lbf at a redline operating condition. In other examples, F_span is within a range of 50,000-100,000 lbf at a redline operating condition.

The fan blade area (F_area) equals π*(R_tip$^2$−R_hub$^2$), which results in an area in square inches. In some examples, F_area is within a range of 3,000-25,000 in$^2$. In other examples, F_area is within a range of 5,000-15,000 in$^2$. In particular examples, F_area is within a range of 4,000-8,000 in$^2$.

It should be noted that the terms of "Fan Center of Gravity," "Fan Mass," "F_Span," and "Fan_Area" are for any one fan blade of an engine. Therefore, it should be noted that the values of "Fan Center of Gravity," "Fan Mass," "F_Span," and "Fan_Area" listed herein (e.g., in the table of FIG. 28, other examples, the clauses, and the claims) apply to any one fan blade of the engine.

Figure 19:
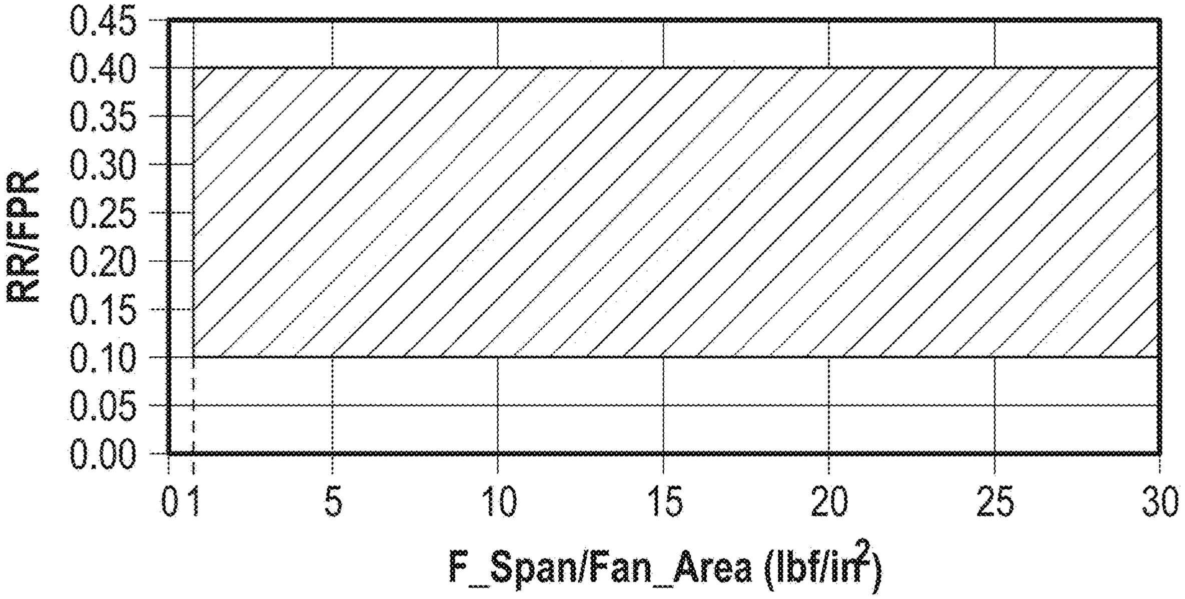
FIG. 19 depicts an exemplary range of a first VPF parameter relative to an exemplary range of a second VPF parameter, which can be particularly advantageous for a turbomachinery comprising a variable pitch fan.
Figure 20:
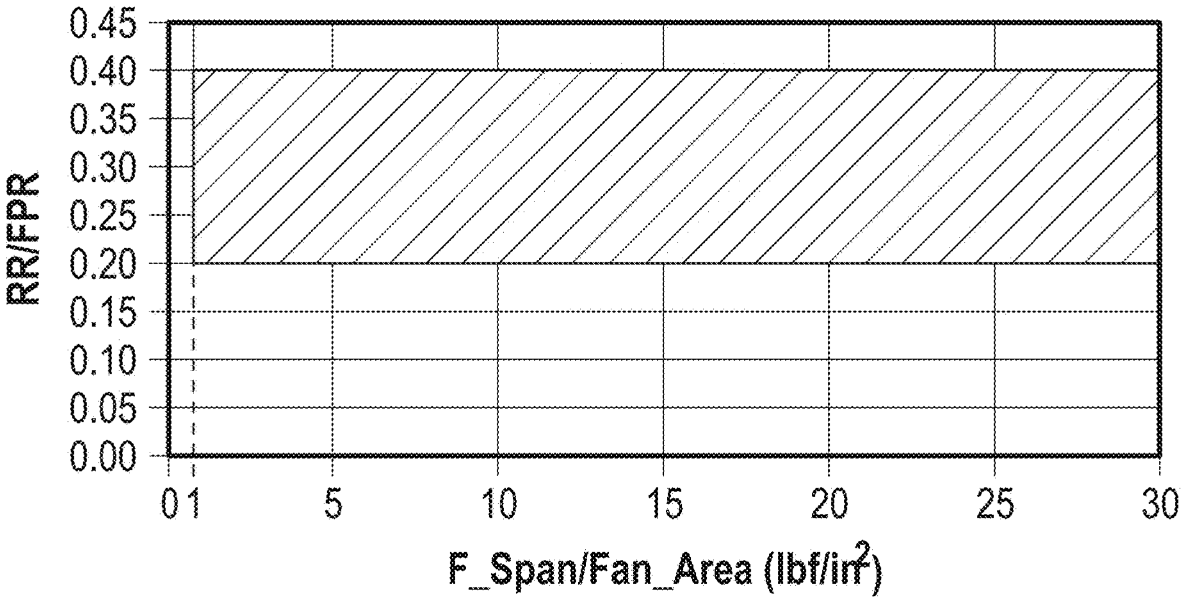
FIG. 20 depicts an exemplary range of a first VPF parameter relative to an exemplary range of a second VPF parameter, which can be particularly advantageous for a turbomachinery comprising a variable pitch fan.

As depicted in FIG. 19, in some examples, a VPF can be configured such that the first VPF parameter (i.e., RR/FPR) is or is about 0.10-0.40 and the second VPF parameter (i.e., F_span/Fan_area) is or is about 1-30 lbf/in$^2$.

As depicted in FIG. 920, in some examples, a VPF can be configured such that the first VPF parameter is or is about 0.20-0.40 and the second VPF parameter is or is about 1-30 lbf/in$^2$.

Figure 21:
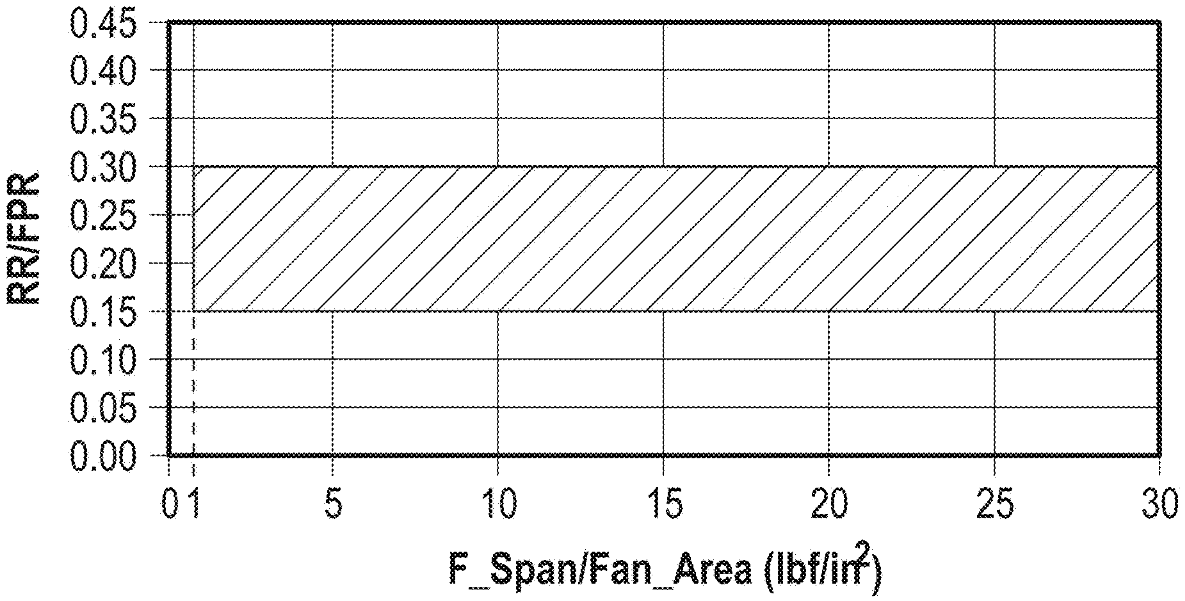
FIG. 21 depicts an exemplary range of a first VPF parameter relative to an exemplary range of a second VPF parameter, which can be particularly advantageous for a turbomachinery comprising a variable pitch fan.

As depicted in FIG. 21, in some examples, a VPF can be configured such that the first VPF parameter is or is about 0.15-0.30 and the second VPF parameter is or is about 1-30 lbf/in$^2$.

Figure 22:
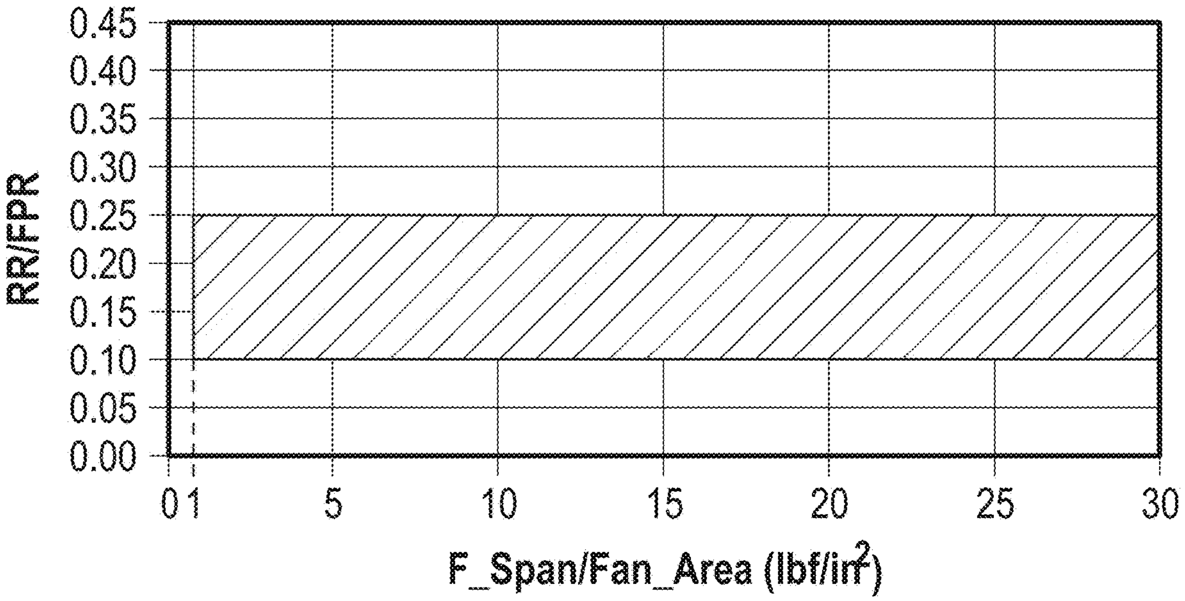
FIG. 22 depicts an exemplary range of a first VPF parameter relative to an exemplary range of a second VPF parameter, which can be particularly advantageous for a turbomachinery comprising a variable pitch fan.

As depicted in FIG. 22, in some embodiments, a VPF can be configured such that the first VPF parameter is or is about 0.10-0.25 and the second VPF parameter is or is about 1-30 lbf/in$^2$.

Figure 23:
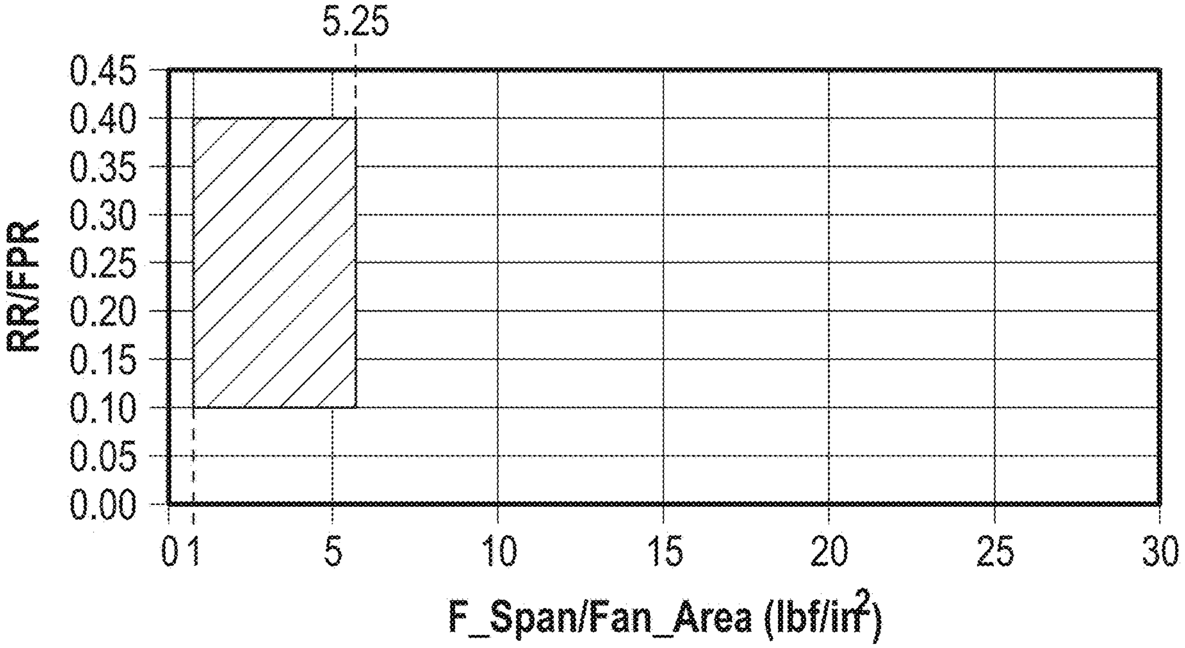
FIG. 23 depicts an exemplary range of a first VPF parameter relative to an exemplary range of a second VPF parameter, which can be particularly advantageous for a turbomachinery comprising a variable pitch fan.

As depicted in FIG. 23, in some examples, a VPF can be configured such that the first VPF parameter is or is about 0.10-0.40 and the second VPF parameter is or is about 1-5.25 lbf/in$^2$. This range of VPF parameters can, for example, be particularly advantageous for unducted fans.

Figure 24:
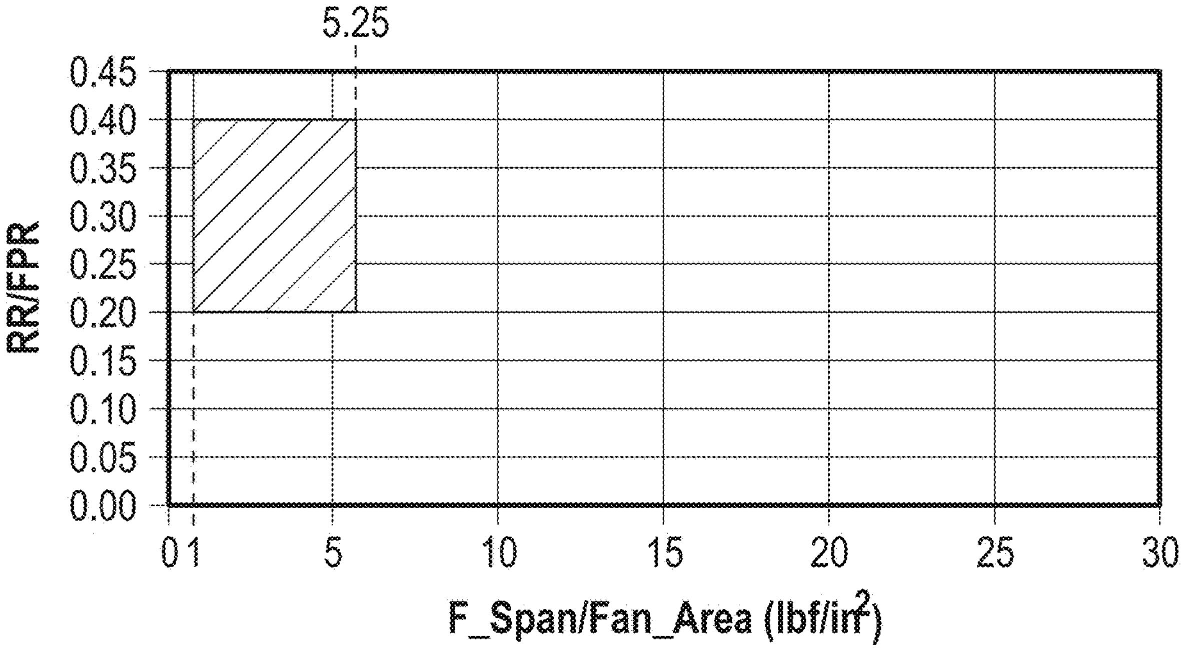
FIG. 24 depicts an exemplary range of a first VPF parameter relative to an exemplary range of a second VPF parameter, which can be particularly advantageous for a turbomachinery comprising a variable pitch fan.

As depicted in FIG. 24, in some examples, a VPF can be configured such that the first VPF parameter is or is about 0.20-0.40 and the second VPF parameter is or is about 1-5.25 lbf/in$^2$. This range can, for example, include fans with relatively high radius ratio. In some instances, these may be unducted fans. Configuring a fan such that it is within the range depicted in FIG. 24 can, for example, enable increased pitch change mechanism design space to help improve durability pitch change mechanism and/or improve compatibility with the gearbox.

Figure 25:
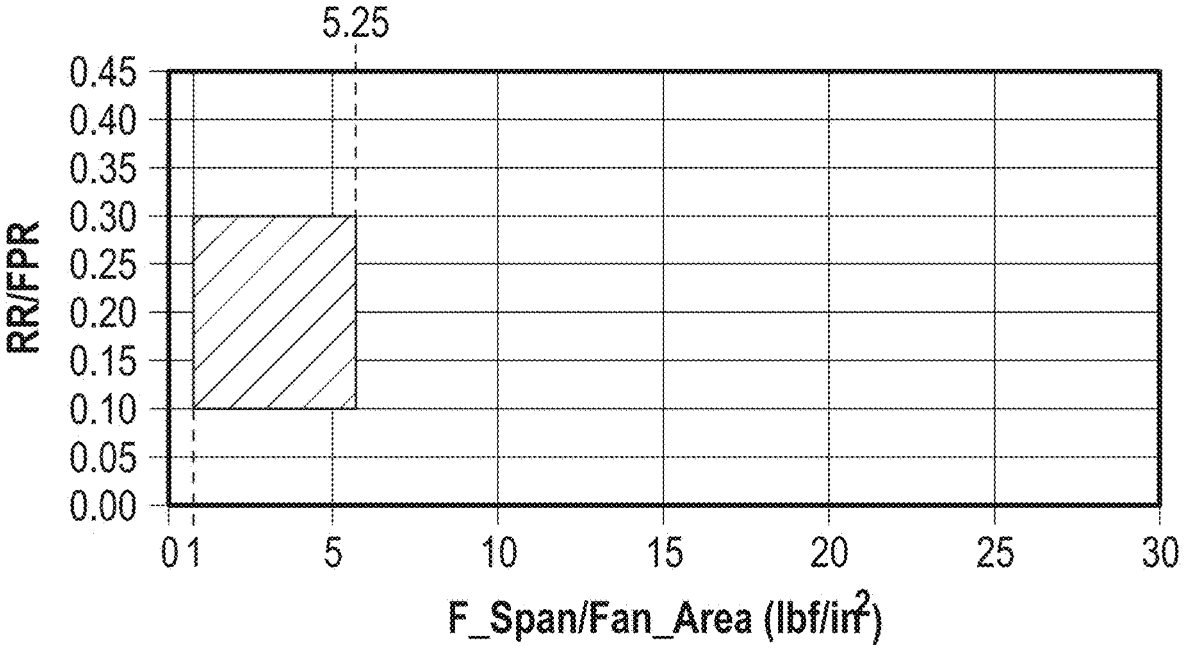
FIG. 25 depicts an exemplary range of a first VPF parameter relative to an exemplary range of a second VPF parameter, which can be particularly advantageous for a turbomachinery comprising a variable pitch fan.

As depicted in FIG. 25, in some examples, a VPF can be configured such that the first VPF parameter is or is about 0.10-0.30 and the second VPF parameter is or is about 1-5.25 lbf/in$^2$.

Figure 26:
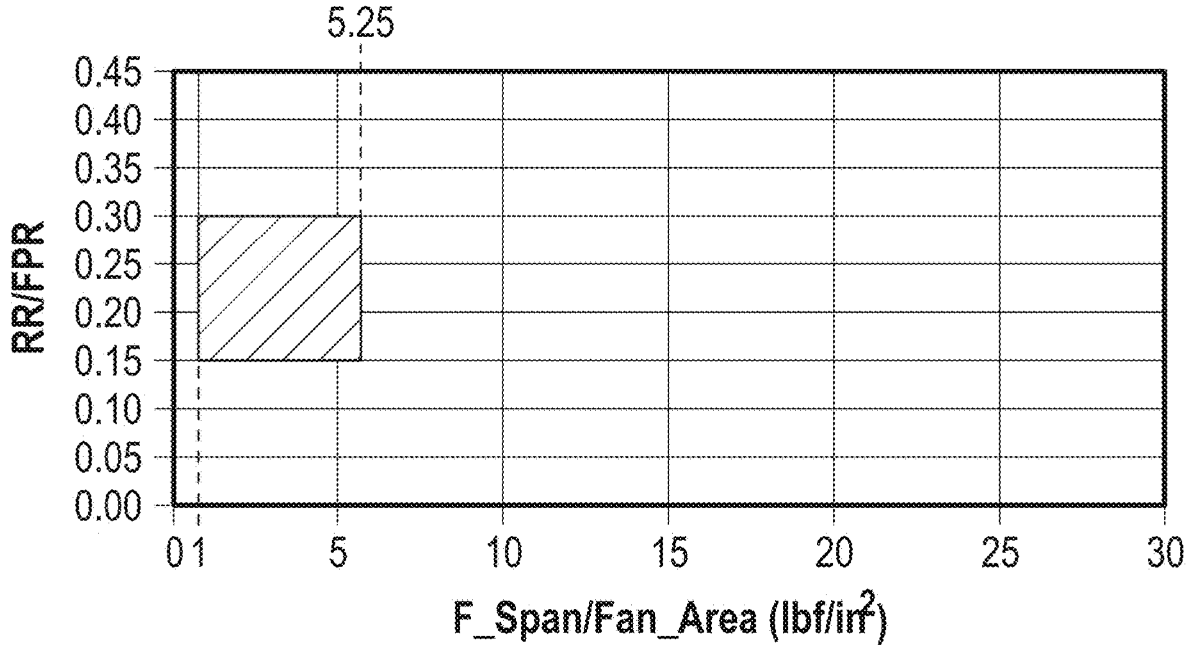
FIG. 26 depicts an exemplary range of a first VPF parameter relative to an exemplary range of a second VPF parameter, which can be particularly advantageous for a turbomachinery comprising a variable pitch fan.

As depicted in FIG. 26, in some examples, a VPF can be configured such that the first VPF parameter is or is about 0.15-0.30 and the second VPF parameter is or is about 1-5.25 lbf/in$^2$.

Figure 27:
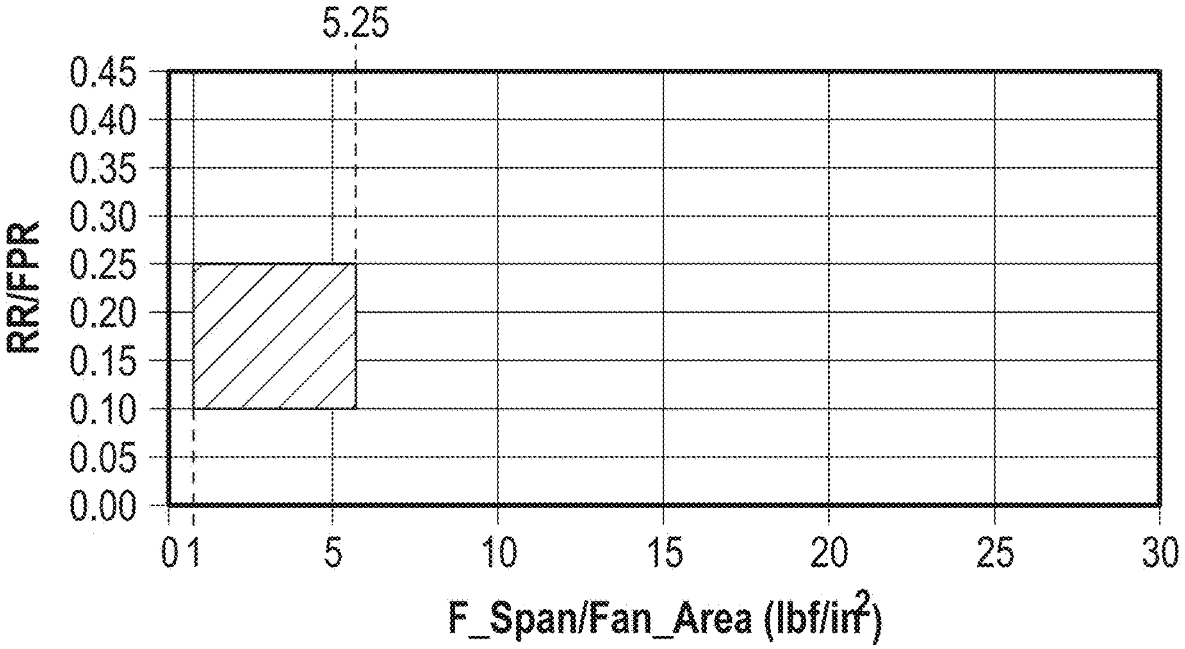
FIG. 27 depicts an exemplary range of a first VPF parameter relative to an exemplary range of a second VPF parameter, which can be particularly advantageous for a turbomachinery comprising a variable pitch fan.

Referring to FIG. 27, in some examples, a VPF can be configured such that the first VPF parameter is or is about 0.1-0.25 and the second VPF parameter is or is about 1-5.25 lbf/in$^2$.

FIG. 28 comprises a table listing a plurality of exemplary unducted engines with a variable pitch fan. The example engines of FIG. 28 comprise first VPF parameters (i.e., RR/FPR) and second VPF parameters (i.e., F_span/Fan_area) that fall within one or more of the disclosed ranges of first and second VPF parameters depicted in FIGS. 19-27. FIG. 28 also depicts various other parameters of the VPFs. It should be noted that in FIG. 28 the fan tip speeds, fan redline speed (ω), and bearing spanwise force of the fan (F_span) are listed at a redline operating condition, and the fan pressure ratio (FPR) is listed at a static sea-level takeoff operating condition.

Thus, the exemplary engines listed in FIG. 28 each define a variable pitch fan compatible with achieving, for example, a particular weight, size, and/or drag requirement, and/other factors relevant to the mechanical packaging of the engine. As discussed earlier, the disclosed engines and their VPFs account for other limitations (e.g., bearing stress), thereby allowing for adequate mechanical integration. As explained earlier and demonstrated further in FIG. 28, the relationship of the VPF parameters to turbomachinery embodiments provides a relatively quick and straightforward way of determining the feasibility of a particular VPF design. Accordingly, the disclosed methods and VPF parameters can improve the design of unducted turbomachinery engines.

The fan blades disclosed herein (e.g., the fan blades 108, 208, and the fan blades listed in FIG. 28) can comprise various materials. For example, in some instances, a fan can comprise a metal alloy. In some instances, the metal alloy can comprise aluminum, lithium, titanium, and/or other suitable metals for fan blades. In some instances, a fan can comprise composite material. In some examples, a fan can comprise a metal alloy core and a composite cover.

Various pitch change mechanisms can be adopted for varying fan blade pitch for the examples disclosed herein (e.g., those in FIG. 28). These pitch change mechanisms can comprise various components including actuators, kinematic mechanisms, counterweights, pitch-locking mechanisms, and blade bearings.

In some examples, an actuator can comprise one or more of rotary motion and linear motion. In some instances, an actuator can be driven hydraulically and/or electrically. In some examples, an actuator can reside on an engine centerline axis. In some examples, an actuator can reside offset from an engine centerline axis.

Various kinematic mechanisms can be used. For example, adjustable linkages with a unison ring to a blade crank can be used. In some examples, an actuator yoke to a blade crank can be used. In some examples, a quill shaft driven via gears to blade root, in unison or individually, can be used.

Various types of counterweights can be used. For example, in some instances, counterweights directly mounted to the blade root can be used. In some examples, counterweights in a remote position, driven by gears, can be used. In some examples, counterweights with a remote position, driven by levers and linkages can be used.

Various pitch-locking mechanisms can be used. In some examples, a pitch-locking mechanism comprises a ball-screw mechanism. In some examples, pitch-locking is accomplished via hydraulic chamber manipulation. In some examples, a pitch-locking mechanism includes locking via a clutch plate.

Various types of blade bearing can be used in a pitch change mechanism. For example, a duplex combination of tapered roller, spherical roller, and/or ball bearings can be used. In some instances, a preloading device above, below, or between the bearing pair can be used. The bearings can comprise various materials including metal (e.g., steel) and/or ceramic.

A variable pitch fan can comprise a plurality of fan blades. Each of the fan blades can be rotatably attached to a disk about respective pitch axes, and the disk may be rotatable about a central axis by the one or more shafts of the core. For example, each fan blade can be attached to a trunnion mechanism which extends through an individual disk segment of the disk. The trunnion mechanism can, in turn, be retained within a respective disk segment by a keyed connection. For example, the trunnion mechanism may define a key slot and the disk segment may include a support surface. A key positioned in the key slot interacts with the key slot and the support surface to retain the trunnion mechanism within the respective disk segments.

Figure 30:
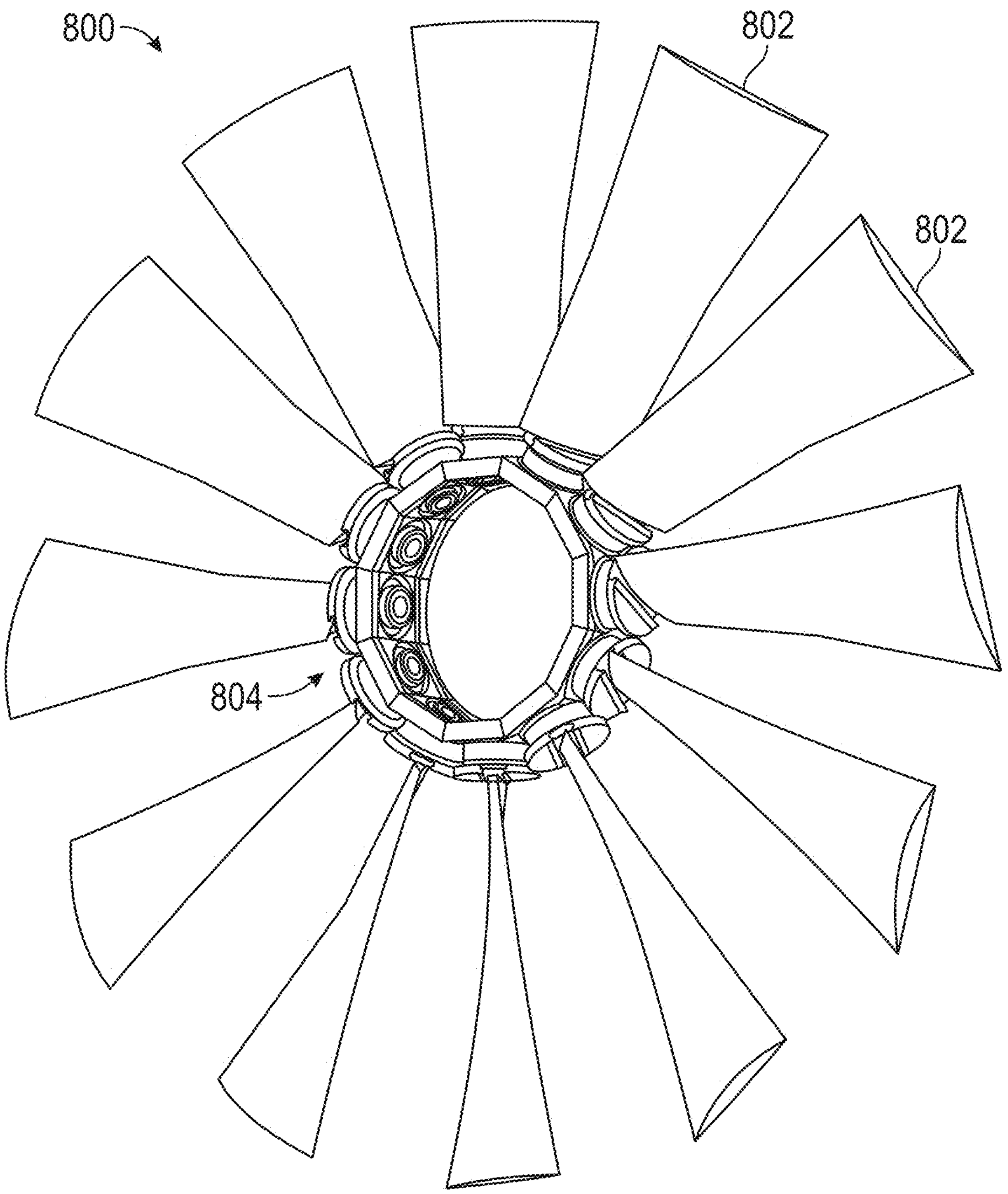
FIG. 30 is perspective view of a variable pitch fan of the exemplary turbomachinery engines disclosed herein.
Figure 31:
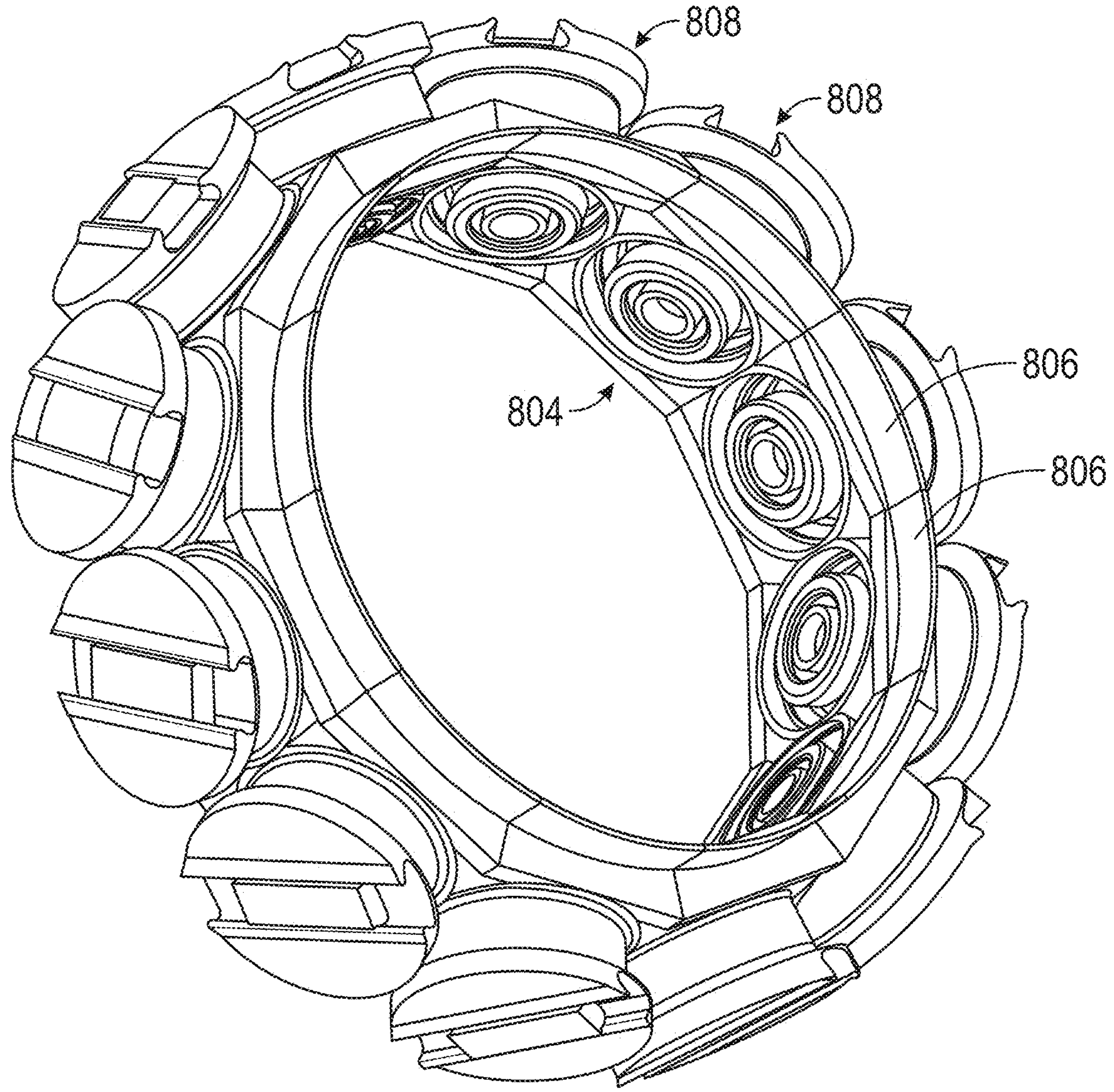
FIG. 31 is a perspective view of a disk and trunnion mechanisms of the exemplary variable pitch fan of FIG. 30.

Referring now to FIGS. 30-34, a variable pitch fan assembly 800 will be described in greater detail. The variable pitch fan assembly 800 can be used with any of the engines disclosed herein. The variable pitch fan assembly 800 (also referred to herein as "the fan 800") comprises a plurality of fan blades 802 and a disk 804. FIG. 30 provides a perspective view of the fan 800. FIG. 31 provides a perspective view of the disk 804.

In the depicted example, the fan 800 includes twelve (12) fan blades 804. Various other fan blade counts can be used. In some examples, the fan 800 can be configured as an open rotor and comprise 8-20 fan blades. In some examples, the fan 1200 can be configured as an unducted rotor and comprise 12-16 fan blades.

The fan 800 can have a diameter of 72-216 inches. In some examples, the fan 800 can have a diameter of 100-200 inches. In some examples, the fan 800 can have a diameter of 120-190 inches. In some examples, the fan 800 can have a diameter of 72-120 inches.

The fan 800 may have any suitable blade count and any suitable diameter, including those explicitly disclosed herein.

Referring to FIG. 31, the disk 804 includes a plurality of disk segments 806 that are rigidly coupled together or integrally molded together in a generally annular shape (e.g., a polygonal shape). Each fan blade 802 is coupled to a respective disk segment 806 at a trunnion mechanism 808 that facilitates retaining the fan blade 802 on the disk 804 during rotation of disk 804 (i.e., the trunnion mechanism 808 facilitates providing a load path to disk 804 for the centrifugal load generated by the fan blades 802 during rotation about an engine centerline axis), while still rendering its associated fan blade 802 rotatable relative to disk 804 about pitch axis P (FIG. 34).

Figure 32:
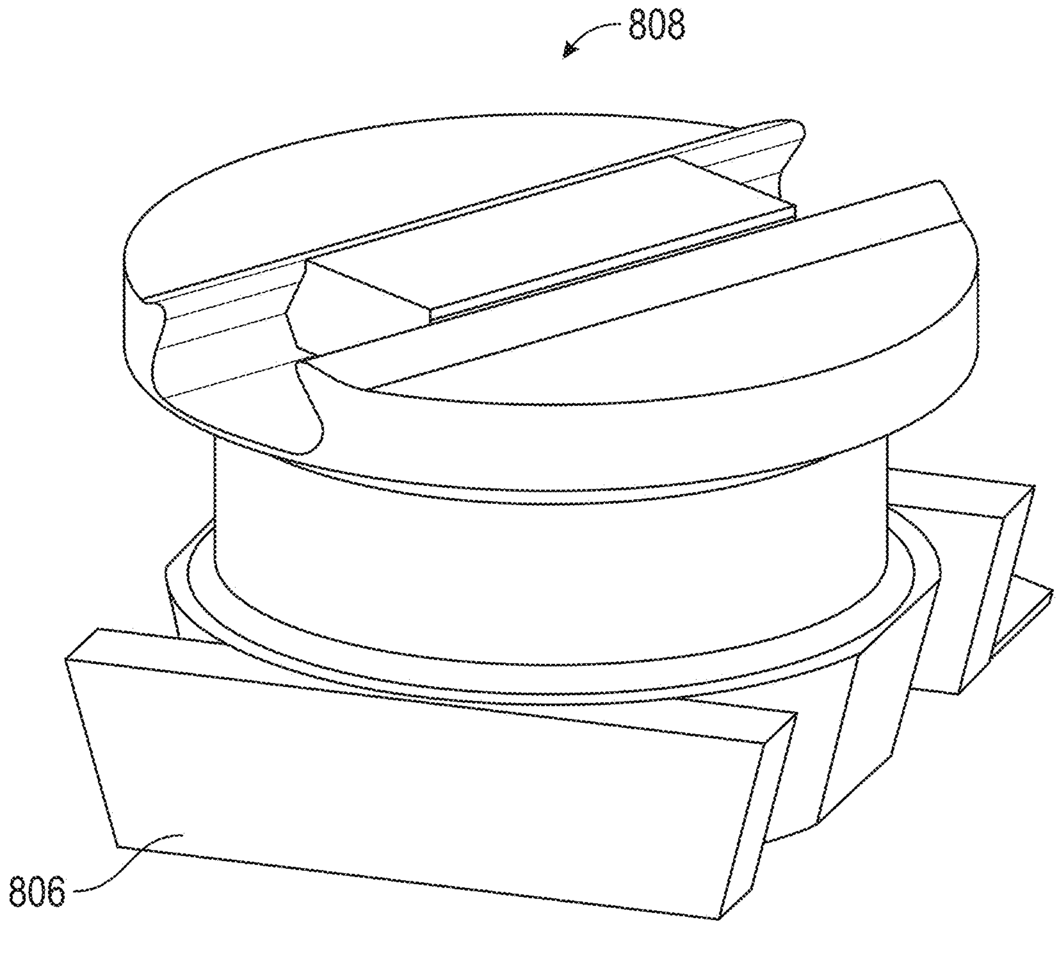
FIG. 32 is a perspective view of a segment of the disk and one of the associated trunnion mechanisms of FIG. 31.
Figure 33:
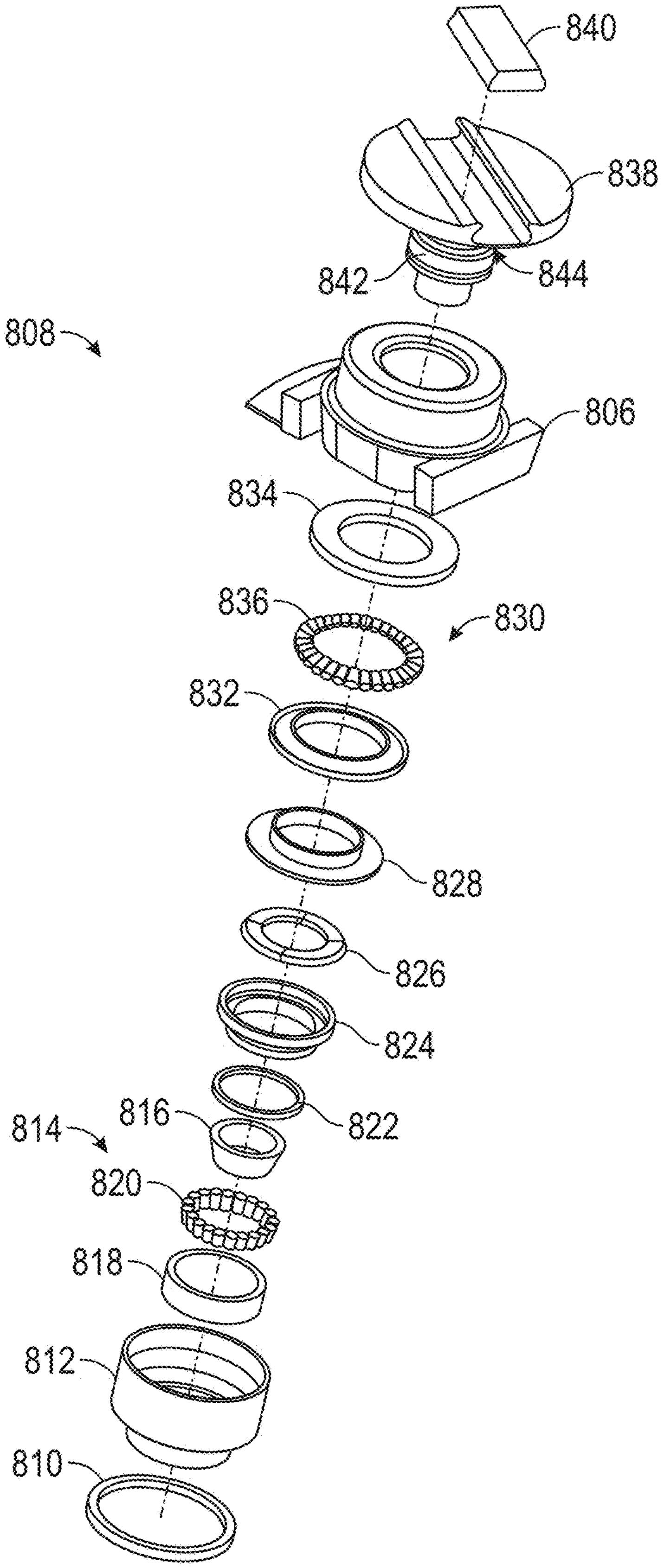
FIG. 33 is an exploded view of the trunnion mechanism shown in FIG. 31.
Figure 34:
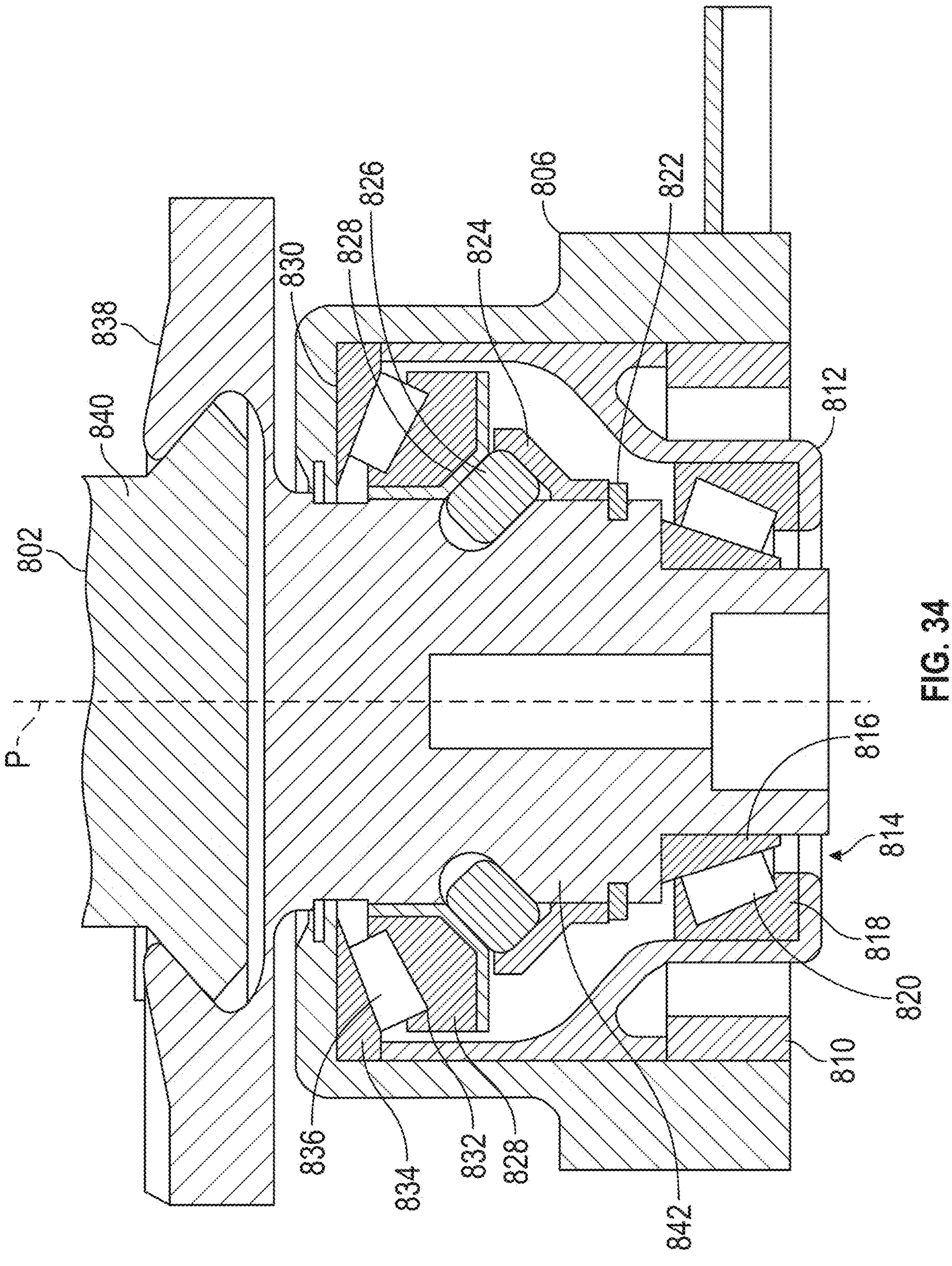
FIG. 34 is a cross-sectional view of the segment of the disk and the trunnion mechanism of FIG. 32 with a blade attached to the trunnion mechanism.

Referring now to FIGS. 32-34, an individual disk segment 806 and trunnion mechanism 808 in accordance with an example is depicted. More specifically, FIG. 32 provides an assembled perspective view of the exemplary disk segment 806 and trunnion mechanism 808. FIG. 33 provides an exploded, perspective view of the exemplary disk segment 806 and trunnion mechanism 808. FIG. 34 provides a side, cross-sectional view of the exemplary disk segment 806 and trunnion mechanism 808.

In the exemplary embodiment depicted, each trunnion mechanism 808 extends through its associated disk segment 806 and includes: a coupling nut 810; a lower bearing support 812; a first line contact bearing 814 (having, for example, an inner race 816, an outer race 818, and a plurality of rollers 820); a snap ring 822; a key hoop retainer 824; a key 826; a bearing support 828; a second line contact bearing 830 (having, for example, an inner race 832, an outer race 834, and a plurality of rollers 836); and a trunnion 838 which receives a dovetail 840 of a fan blade 802. In alternative embodiments, however, the trunnion 838 may be integrated into a hub of the fan blade 802 as a spar attachment or an additional key may be inserted into overlapping openings of the hub of the fan blade 802 and trunnion 838 to form a pinned root. For use as bearings 814, 830, at least the following types of line contacting type rolling element bearings are contemplated: cylindrical roller bearings; cylindrical roller thrust bearings; tapered roller bearings; spherical roller bearings; spherical roller thrust bearings; needle roller bearings; and tapered roller needle bearings. Additionally, the bearings may be formed of any suitable material, such as a suitable stainless steel or other metal material, or alternatively of any suitable nonferrous material.

Referring particularly to FIG. 34, in the exemplary embodiment depicted, the first line contact bearing 814 is oriented at a different angle than the second line contact bearing 830. More specifically, line contact bearings 814, 830 are preloaded against one another in a face-to-face (or duplex) arrangement, wherein centerline axes of the bearings 814, 830 are oriented substantially perpendicular to one another.

It should be appreciated, however, that in other exemplary embodiments, the line contact bearings 814, 830 may instead be arranged in tandem so as to be oriented substantially parallel to one another. It should also be appreciated that in other exemplary embodiments, the trunnion mechanism 808 may additionally or alternatively include any other suitable type of bearing, formed of any suitable material. For example, in other exemplary embodiments, the trunnion mechanism 808 may include roller ball bearings or any other suitable bearing.

When assembled, the coupling nut 810 is threadably engaged with disk segment 806 so as to sandwich the remaining components of trunnion mechanism 808 between coupling nut 810 and disk segment 806, thereby retaining trunnion mechanism 808 attached to disk segment 806. Moreover, as is depicted, the individual disk segment 806 and trunnion mechanism 808 depicted includes a keyed configuration for carrying a centrifugal load of the fan blade 802 during operation. The centrifugal load, which may generally be a function of a mass of the fan blade 802 and a rotational speed of the fan blade 802, can be relatively high during operation of the fan 800 of the engine.

Additional details of the variable pitch fan 800 and its pitch change mechanism can be found in U.S. Pat. No. 10,100,653, which is incorporated by reference.

Figure 35:
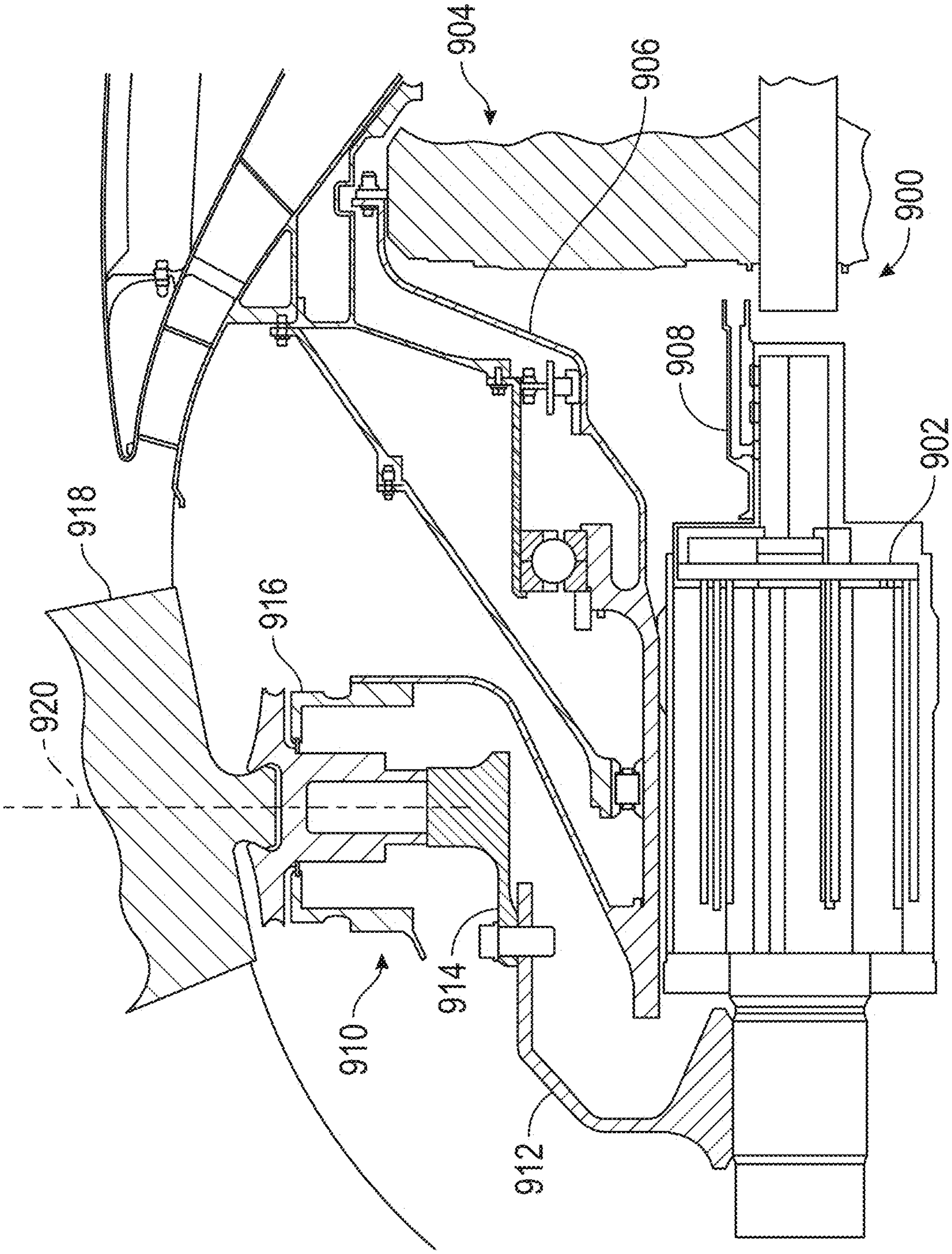
FIG. 35 is a side elevation view of a gas turbine engine fan rotor assembly including a hydraulic pitch change mechanism actuator assembly.

FIG. 35 is a side elevation view of a variable pitch fan assembly 900 including an integrated pitch change mechanism (PCM) actuator assembly 902. The variable pitch fan assembly 900 (which can also be referred to as "the fan 900") can be used with any of the engines disclosed herein. The PCM actuator assembly 902 comprises a hydraulic actuation mechanism. The fan 900 includes the integrated PCM actuator assembly 902, an epicyclic gearbox 904, a power engine rotor 906, a stationary hydraulic fluid transfer sleeve 908, and a hub assembly 910. Hub assembly 910 includes a unison ring 912, a plurality of fan blade trunnion yokes 914, a plurality of trunnion assemblies 918, and a plurality of fan blades 916. In some embodiments, a low-pressure shaft is fixedly coupled to epicyclic gearbox 904 which is rotationally coupled to power engine rotor 906. Power engine rotor 906 is rotationally coupled to hub assembly 910 and integrated PCM actuator assembly 902 which is rotationally coupled to unison ring 912 through integrated PCM actuator assembly 902. Hub assembly 910 is rotationally coupled to fan blades 918. Unison rings 912 are rotationally coupled to fan blade trunnion yokes 914 which are rotationally coupled to trunnion assemblies 916. Trunnion assemblies 916 are rotationally coupled to fan blades 918. Stationary hydraulic fluid transfer sleeve 908 is coupled to supports within epicyclic gearbox 904 and circumscribes integrated PCM actuator assembly 902. Stationary hydraulic fluid transfer sleeve 908 is coupled in flow communication with integrated PCM actuator assembly 902.

In operation, the low-pressure shaft is configured to rotate a plurality of gears within epicyclic gearbox 904 which are configured to rotate power engine rotor 906. Power engine rotor 906 is configured to rotate integrated PCM actuator assembly 902 which is configured to rotate unison rings 912. Unison ring 912 is configured to rotate fan blade trunnion yokes 914 which are configured to rotate trunnion assemblies 916. Trunnion assemblies 916 are configured to rotate fan blades 918 about their respective axis. Stationary hydraulic fluid transfer sleeve 908 is configured to remain stationary while integrated PCM actuator assembly 902 is configured to rotate along with the fan module.

Stationary hydraulic fluid transfer sleeve 908 is coupled in flow communication with integrated PCM actuator assembly 902. Hydraulic fluid pressure from stationary hydraulic fluid transfer sleeve 908 actuates integrated PCM actuator assembly 902 which rotates unison ring 912 about a radially extending pitch axis of rotation 920. Unison ring 912 translates fan blade trunnion yokes 914 along an arcuate path, which rotate respective trunnion assemblies 916 about radially extending pitch axis of rotation 920. Trunnion assemblies 916 are configured to rotate fan blades 918 about radially extending pitch axis of rotation 920.

Additional details regarding the fan 900 and the hydraulic PCM 902 can be found in U.S. Pat. No. 10,393,137, which is incorporated by reference.

Figure 36:
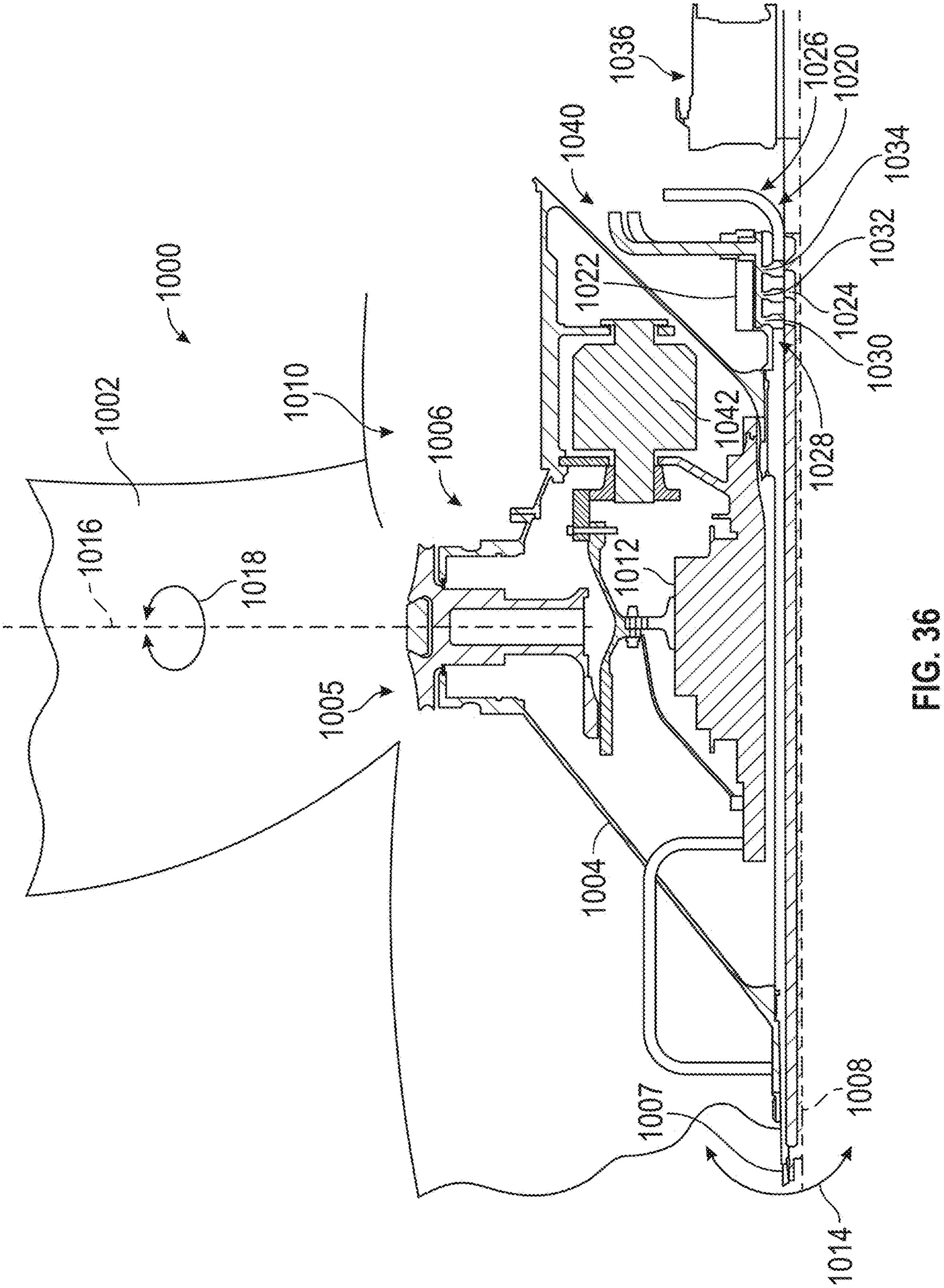
FIG. 36 is a cross-sectional view of a portion of a fan assembly that may be implemented with the turbomachinery engines disclosed herein.

FIG. 36 is a cross-sectional view of a portion of a variable pitch fan assembly 1000, which can be used with any one of the engines disclosed herein. Fan assembly 1000 includes a plurality of blades 1002 (though only one blade is 1002 is shown in FIG. 36) mounted on a rotatable frame 1004. More specifically, blades 1002 are retained within blade retention mechanisms 1005 of an annular fan hub 1006. Moreover, blades 1002 are disposed symmetrically about a shaft 1007 (e.g., a low-pressure shaft). Shaft 1007 defines a shaft axis 1008, which is co-axial with an engine centerline. Accordingly, shaft axis 1008 may be referred to herein as "engine centerline axis 1008." Fan assembly 1000 further includes a pitch control mechanism (PCM) 1010 for controlling a pitch of blades 1002. PCM 1010 includes a single master hydraulic actuator 1012 positioned axisymmetric with respect to centerline 1008 and fan assembly 1000. In the illustrated embodiment, hydraulic actuator 1012 is a rotary actuator configured to rotate about an axis defined by engine centerline 1008, as indicated by arrow 1014. In one embodiment, hydraulic actuator 1014 circumscribes shaft 1007.

Hydraulic actuator 1012 is configured to angularly displace blades 1002 of fan assembly 1000 between a first position and a second position. More specifically, hydraulic actuator 1012 drives rotation of blades 1002 about respective pitch axes 1016. In the illustrated embodiment, hydraulic actuator 1012 is configured to angularly displace blades 1002 upon rotation of hydraulic actuator 1012. The angular displacement of blades 1002 around pitch axes 1016 is indicated generally by arrow 1018.

PCM 1010 also includes a hydraulic fluid transfer system, including a power gearbox 1036 configured to drive hydraulic fluid (e.g., hydraulic oil) through shaft 1007 to hydraulic actuator 1012. Gearbox 1036 may be a star gearbox, such that hydraulic fluid is channeled therethrough, a planetary gearbox, in which the hydraulic is transferred therearound, or another suitable gearbox configuration (including those disclosed herein). Hydraulic fluid transfer system also includes a hydraulic fluid transfer sleeve 1020, such as, for example, a hydraulic oil transfer "slip ring," in fluid communication with gearbox 1036. Hydraulic transfer sleeve 1020 includes a stationary member 1022, fixed relative to fan assembly 1000, and a rotatable member 1024, which rotates with hydraulic actuator 1012. Hydraulic fluid transfer sleeve 1020 is configured to transfer a flow of pressurized hydraulic fluid, for example, hydraulic oil, across a gap 1026 between stationary member 1022 and rotatable member 1024. In the example embodiment, PCM 1010 further includes a plurality of hydraulic fluid supply lines 1028 coupled in flow communication between hydraulic actuator 1012 and hydraulic fluid transfer sleeve 1020. The plurality of fluid supply lines 1028 includes a first supply line 1030, configured to channel pressurized fluid to hydraulic actuator 1012 to increase pitch of blades 1002, a second supply line 1032, configured to channel pressurized fluid to hydraulic actuator 1012 to decrease pitch of blades 1002, and a third supply line 1034 configured to facilitate draining at least a portion of hydraulic actuator 1012.

PCM 1010 includes a remote counterweight system 1040. Remote counterweight system 1040 includes a plurality of counterweights 1042 configured to affect a position of blades 1002, for example, when fluid pressure in PCM 1010 is outside a predetermined range. Remote counterweight system 1040 is remote from blade retention mechanisms 1005.

Additional details regarding the fan 1000 and its PCM 1010 can be found in U.S. Pat. No. 10,533,436, which is incorporated by reference.

Further aspects of the disclosure are provided by the subject matter of the following clauses:

Clause 1: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

In the preceding clause, the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

In any of the preceding clauses, the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

In any of the preceding clauses, the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

In any of the preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

In any of the preceding clauses, the rotating blades diameter is between 8 to 16 feet or between 12 to 16 feet. In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

Clause 2: An aircraft is provided including a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein $0.065 < RL/D < 1.98$ and θ is between 187° and 340°, and wherein RL/D and θ of the P of the unducted fan propulsor adhere to the following expressions:

$$\frac{RL}{D}+\frac{\left(\sqrt{1.4161*\left[\begin{matrix}1.88978*\sin^2(\theta)-0.0875*\cos^2(\theta)+0.477*\\ \sin(\theta)*\cos(\theta)\end{matrix}\right]}+1.764*\sin(\theta)+0.19146*\cos(\theta)\right)}{1.96*\sin^2(\theta)+0.7225*\cos^2(\theta)}>0$$

$$\frac{RL}{D}+\frac{\left(-\sqrt{1.4161*\left[\begin{matrix}1.88978*\sin^2(\theta)-0.0875*\cos^2(\theta)+0.477*\\ \sin(\theta)*\cos(\theta)\end{matrix}\right]}+1.764*\sin(\theta)+0.19146*\cos(\theta)\right)}{1.96*\sin^2(\theta)+0.7225*\cos^2(\theta)}<0.$$

In the preceding clause, $0.254 < RL/D < 1.86$ and θ is between 199° and 306°, and the P of the unducted fan propulsor is defined by the following expressions:

$$\frac{RL}{D}+\frac{\left(\sqrt{0.52621*\left[\begin{matrix}0.7205*\sin^2(\theta)-0.352*\cos^2(\theta)+0.7448*\\ \sin(\theta)*\cos(\theta)\end{matrix}\right]}+0.8476*\sin(\theta)+0.23119*\cos(\theta)\right)}{0.8649*\sin^2(\theta)+0.6084*\cos^2(\theta)}>0$$

$$\frac{RL}{D}+\frac{\left(-\sqrt{0.52621*\left[\begin{matrix}0.7205*\sin^2(\theta)-0.352*\cos^2(\theta)+0.7448*\\ \sin(\theta)*\cos(\theta)\end{matrix}\right]}+0.8476*\sin(\theta)+0.23119*\cos(\theta)\right)}{0.8649*\sin^2(\theta)+0.6084*\cos^2(\theta)}<0.$$

In any of the two preceding clauses, $0.369 < RL/D < 1.43$ and θ is between 204° and 291°, and the P of the unducted fan propulsor is defined by the following expressions:

$$\frac{RL}{D}+\frac{\left(\sqrt{\begin{array}{l}0.5261*[0.7205*\sin^2(\theta)-0.352*\\ \cos^2(\theta)+0.7448*\sin(\theta)*\cos(\theta)]\end{array}}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{\begin{array}{l}0.52621*[0.7205*\sin^2(\theta)-0.352*\\ \cos^2(\theta)+0.7448*\sin(\theta)*\cos(\theta)]\end{array}}+0.8476*\sin(\theta)+0.23119*\cos(\theta)\right)}{0.8649*\sin^2(\theta)+0.6084*\cos^2(\theta)}<0.$$

In any of the three preceding clauses: 0.477<RL/D<0.9455 and θ is between 211° and 274°, and the P of the unducted fan propulsor is defined by the following expressions:

$$\frac{RL}{D}+\frac{\left(\sqrt{\begin{array}{l}0.01069156*[0.036*\sin^2(\theta)-0.3485*\\ \cos^2(\theta)+0.5418*\sin(\theta)*\cos(\theta)]\end{array}}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{\begin{array}{l}0.01069156*[0.036*\sin^2(\theta)-0.3485*\\ \cos^2(\theta)+0.5418*\sin(\theta)*\cos(\theta)]\end{array}}+0.139167*\sin(\theta)+0.020812*\cos(\theta)\right)}{0.2209*\sin^2(\theta)+0.0484*\cos^2(\theta)}<0.$$

In any of the four preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

Clause 3: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein RL/D≤2 and θ is between 187° and 342°.

In any of the preceding clauses, 0.15≤RL/D.

In any of the preceding clauses, 0.35≤RL/D, and preferably RL/D is about 0.72.

In any of the preceding clauses, wherein θ is between 198° and 310°, and preferably between 205° and 285°.

In any of the preceding clauses, the unducted fan propulsor operates at a cruise flight Mach $M_0$ of between 0.5 and 0.9, preferably between 0.7 and 0.9, and more preferably between 0.75 and 0.9.

In any of the preceding clauses, the unducted fan propulsor has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

In any of the preceding clauses, the unducted fan propulsor is undermounted to the airfoil with one or more intermediate structures.

In any of the foregoing clauses, the P of the unducted fan propulsor is variable to accommodate different operating conditions.

In any of the preceding clauses, the aircraft includes a plurality of the unducted fan propulsors.

In the preceding clause, the plurality of the unducted fan propulsors may be each mounted to the same airfoil, such as a wing or horizontal stabilizer; or the plurality of the unducted fan propulsors may be each mounted to different airfoils, such as a wing or horizontal stabilizer; or combinations thereof.

In any of the preceding clauses, wherein the unducted propulsor has two arrays of blades and only one of the array of blades is rotating.

Clause 4: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of counterclockwise rotating blades arranged in a forward array and a plurality clockwise rotating blades arranged in a rearward array, wherein one of the forward and rearward array of blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 5: An aircraft is provided that includes a fuselage; an airfoil extending from the fuselage, the airfoil having an airfoil section and the airfoil section having an effective quarter chord point (QC), and a plurality of rotating blades defining a maximum outer diameter (D); a point (P) located at an intersection of the CL and a line perpendicular to the CL that passes through a midpoint between leading and trailing edges nearest the root of one of the plurality of blades, and an ellipse origin positioning line (EOR) having a length (EORL) extending from the QC to an ellipse origin (OR) and at an angle θ measured positive in a counter-clockwise direction when the high pressure side of the airfoil section is below the airfoil section, and measured positive in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 6: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein $0.065<RL/D<1.98$ and θ is between 187° and 340°; and wherein RL/D and θ of the P of the unducted fan propulsor adhere to the following expressions:

$$\frac{RL}{D}+\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0.$$

The aircraft of Clause 6, wherein:

$0.254<RL/D<1.86$ and θ is between 199° and 306°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

The aircraft of Clause 6, wherein:

$0.369<RL/D<1.43$ and θ is between 204° and 291°, and the P of the unducted fan propulsor is defined by the following expressions:

$$\frac{RL}{D}+\frac{\left(\sqrt{0.09923*\left[0.2964*\sin^2(\theta)-0.36*\cos^2(\theta)+0.66*\sin(\theta)*\cos(\theta)\right]}+0.3675*\sin(\theta)+0.0891*\cos(\theta)\right)}{0.49*\sin^2(\theta)+0.2025*\cos^2(\theta)}>0$$

and

-continued $$\frac{RL}{D} + \frac{\left(-\sqrt{0.09923*[0.2964*\sin^2(\theta) - 0.36* + \cos^2(\theta) + 0.66*\sin(\theta)*\cos(\theta)]}\; 0.3675*\sin(\theta) + 0.0891*\cos(\theta)\right)}{0.49*\sin^2(\theta) + 0.2025*\cos^2(\theta)} < 0.$$

The aircraft of Clause 6, wherein:

0.477<RL/D<0.9455 and θ is between 211° and 274°, and the P of the unducted fan propulsor is defined by the following expressions:

$$\frac{RL}{D} + \frac{\left(\sqrt{0.01069156*[0.036*\sin^2(\theta) - 0.3485* + \cos^2(\theta) + 0.5418*\sin(\theta)*\cos(\theta)]}\; 0.139167*\sin(\theta) + 0.020812*\cos(\theta)\right)}{0.2209*\sin^2(\theta) + 0.0484*\cos^2(\theta)} > 0$$

and $$\frac{RL}{D} + \frac{\left(-\sqrt{0.01069156*[0.036*\sin^2(\theta) - 0.3485* + \cos^2(\theta) + 0.5418*\sin(\theta)*\cos(\theta)]}\; 0.139167*\sin(\theta) + 0.020812*\cos(\theta)\right)}{0.2209*\sin^2(\theta) + 0.0484*\cos^2(\theta)} < 0.$$

The aircraft of Clause 6, wherein the unducted fan propulsor is undermounted to the airfoil with one or more intermediate structures.

The aircraft of Clause 6, wherein the P of the unducted fan propulsor is variable to accommodate different operating conditions.

Clause 7: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein RL/D≤2 and θ is between 187° and 342°.

The aircraft of Clause 7, wherein 0.15≤RL/D.

The aircraft of Clause 7, wherein 0.35≤RL/D, and preferably RL/D is about 0.72.

The aircraft of Clause 7, wherein θ is between 198° and 310°, and preferably between 205° and 285°.

The aircraft of Clause 7, wherein the unducted fan propulsor operates at a cruise flight Mach $M_0$ of between 0.5 and 0.9, preferably between 0.7 and 0.9, and more preferably between 0.75 and 0.9.

The aircraft of Clause 7, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The aircraft of Clause 7, wherein the unducted fan propulsor is undermounted to the airfoil with one or more intermediate structures.

The aircraft of Clause 7, wherein the P of the unducted fan propulsor is variable to accommodate different operating conditions.

Clause 8: A method of assembly, comprising: using an aircraft body comprising a fuselage and an airfoil extending from the fuselage, wherein the airfoil has an airfoil section defining an effective quarter chord point (QC); and attaching an unducted fan propulsor to the aircraft body relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a line HP perpendicular to the axial centerline CL that passes through the axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position; wherein 0.07≤RL/D≤2.0 and θ is between 187° and 342.°.

The method of Clause 8, wherein 0.15≤RL/D.

The method of Clause 8, wherein 0.35≤RL/D, and preferably RL/D is about 0.72.

The method of Clause 8, wherein θ is between 198° and 310°, and preferably between 205° and 285°.

The method of Clause 8, wherein the unducted fan propulsor operates at a cruise flight Mach $M_0$ of between 0.5 and 0.9, preferably between 0.7 and 0.9, and more preferably between 0.75 and 0.9.

The method of Clause 8, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The method of Clause 8, wherein the unducted fan propulsor is undermounted to the airfoil with one or more intermediate structures.

The method of Clause 8, wherein the P of the unducted fan propulsor is variable to accommodate different operating conditions.

Clause 9: A method of assembly, comprising: using an aircraft body comprising a fuselage and an airfoil extending from the fuselage, the airfoil having an airfoil section with a leading edge (LE) and a trailing edge (TE), a chord extending between the LE and TE, and an effective quarter chord point (QC) along the chord measured from the LE, wherein the airfoil has an airfoil section defining an effective quarter chord point (QC); and attaching an unducted fan propulsor to the aircraft body relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

The method of Clause 9, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The method of Clause 9, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The method of Clause 9, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

Clause 10: An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°.

Clause 11: An aircraft comprising:

a fuselage;

a pair of horizontal stabilizers extending relative to the fuselage, two or more unducted fan propulsors, each of the unducted fan propulsors is mounted relative to one of the horizontal stabilizers on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a clockwise direction when the high pressure side of the airfoil section is above the airfoil section when viewed looking from an outboard position towards an inboard position of the wing; wherein 0.07≤RL/D≤2.0 and θ is between 187° and 342°.

In any of the preceding clauses, the unducted fan propulsor is undermounted to the airfoil, such as a wing, with one or more intermediate structures.

In any of the preceding clauses, the P of the unducted fan propulsor is variable to accommodate different operating conditions.

In any of the preceding clauses the drive mechanism may be a gas turbine engine and associated transmission to delivers torque from the drive mechanism to the propeller assembly.

In any of the preceding clauses, the unducted fan propulsor is incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9.

In any of the preceding clauses, the unducted fan propulsors is connected to the wing (or horizontal stabilizer) through a pylon.

In any of the preceding clauses, the rotating blades diameter (D) may be between 8 to 16 feet or 12 to 16 feet.

In any of the preceding clauses, each of the propulsors including a drive mechanism comprising a gas turbine engine assembly comprising in serial order a compressor, combustor, high pressure turbine and power turbine.

In any of the preceding clauses, the propulsor having a pitch angle between −5 and +5 degrees, or −3 and 0 degrees.

In any of the preceding clauses, the propulsor having an inward toe angle of between 0 and 5 degrees, or 1 and 3 degrees.

In any of the preceding clauses, the rotating blades diameter is between 8 to 16 feet or between 12 to 16 feet.

In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

Clause 12: A turbofan engine comprising a fan assembly, a pitch change mechanism, a vane assembly, a core engine, and a gearbox. The fan assembly includes a plurality of fan blades, a first VPF parameter, and a second VPF parameter. The first VPF parameter is defined by a fan blade radius ratio (RR) divided by a fan pressure ratio (FPR) at a static sea-level takeoff operating condition. The second VPF parameter is defined by a bearing spanwise force (F_Span) at a redline operating condition measured in pounds force divided by a fan area (F_Area) measured in square inches. The first VPF parameter is within a range of 0.1 to 0.25 and the second VPF parameter is within a range of 2-30 lbf/in$^2$, or the first VPF parameter is within a range of 0.1 to 0.4 and the second VPF parameter is within a range of 5.25-30 lbf/in$^2$. The pitch change mechanism is coupled to the plurality of fan blades and configured for adjusting a pitch of the plurality of fan blades. The vane assembly includes a plurality of vanes disposed aft of the fan blades. The core engine includes one or more compressor sections and one or more turbine sections. The gearbox includes an input and an output. The input is coupled to the one or more turbine sections of the core engine and comprises a first rotational speed, and the output is coupled to the fan assembly and has a second rotational speed which is less than the first rotational speed.

The turbofan engine of any preceding clause, wherein the plurality of fan blades is 8-20 fan blades.

The turbofan engine of any preceding clause, wherein the plurality of fan blades is 12-16 fan blades.

The turbofan engine of any preceding clause, wherein the plurality of fan blades is exactly 12-14 fan blades.

The turbofan engine of any preceding clause, wherein the RR is within a range of 0.125-0.55.

The turbofan engine of any preceding clause, wherein the RR is within a range of 0.2-0.5.

The turbofan engine of any preceding clause, wherein the RR is within a range of 0.25-0.35.

The turbofan engine of any preceding clause, wherein the RR is within a range of 0.25-0.3.

The turbofan engine of any preceding clause, wherein the FPR at the static sea-level takeoff operating condition is within a range of 1.05-1.5.

The turbofan engine of any preceding clause, wherein the FPR at the static sea-level takeoff operating condition is within a range of 1.05-1.15.

The turbofan engine of any preceding clause, wherein the FPR at the static sea-level takeoff operating condition is within a range of 1.2-1.4.

The turbofan engine of any preceding clause, wherein the F_Span at the redline operating condition is within a range of 20,000-200,000 lbf.

The turbofan engine of any preceding clause, wherein the F_Span at the redline operating condition is within a range of 100,000-175,000 lbf.

The turbofan engine of any preceding clause, wherein the F_Span at the redline operating condition is within a range of 50,000-100,000 lbf.

The turbofan engine of any preceding clause, wherein the F_Span at the redline operating condition is within a range of 65,000-85,000 lbf.

The turbofan engine of any preceding clause, wherein the F_Area is within a range of 3,000-25,000 in$^2$.

The turbofan engine of any preceding clause, wherein the F_Area is within a range of 15,000-20,000 in$^2$.

The turbofan engine of any preceding clause, wherein the F_Area is within a range of 17,000-18,000 in$^2$.

The turbofan engine of any preceding clause, wherein the F_Area is within a range of 3,000-10,000 in$^2$.

The turbofan engine of any preceding clause, wherein the F_Area is within a range of 4,000-7,000 in$^2$.

The turbofan engine of any preceding clause, wherein a fan blade tip speed of the fan assembly at a redline operating condition is within a range of 700-1,400 ft/s.

The turbofan engine of any preceding clause, wherein the fan blade tip speed of the fan assembly at a redline operating condition is within a range of 800-950 ft/s.

The turbofan engine of any preceding clause, wherein the fan blade tip speed of the fan assembly at a redline operating condition is within a range of 1,000-1,200 ft/s.

The turbofan engine of any preceding clause, wherein the gearbox comprises a gear ratio of 4.1-14, wherein the gear ratio is defined by the first rotational speed divided by the second rotational speed.

Clause 13: A turbofan engine comprises a fan assembly, a core engine, and a gearbox. The fan assembly includes a plurality of variable pitch fan blades, a first VPF parameter, and a second VPF parameter. The first VPF parameter is defined by a fan blade radius ratio (RR) divided by a fan pressure ratio (FPR) at a static sea-level takeoff operating condition. The second VPF parameter is defined by a bearing spanwise force (F_Span) at a redline operating condition measured in pounds force divided by a fan area (F_Area) measured in square inches. The first VPF parameter is within a range of 0.1 to 0.25, and the second VPF parameter is within a range of 2-30 lbf/in$^2$. The core engine includes one or more compressor sections and one or more turbine sections. The gearbox includes an input and an output. The input is coupled to the one or more turbine sections of the core engine and comprises a first rotational speed, and the output is coupled to the fan assembly and has a second rotational speed, which is less than the first rotational speed.

The turbofan engine of any preceding clause, further comprising a pitch change mechanism coupled to the plurality of variable pitch fan blades and configured for adjusting a pitch of the plurality of variable pitch fan blades.

The turbofan engine of any preceding clause, wherein the pitch change mechanism is a linear actuated pitch change mechanism.

The turbofan engine of any preceding clause, wherein the plurality of fan blades is 10-18 fan blades.

The turbofan engine of any preceding clause, wherein the plurality of fan blades is 12-14 fan blades.

The turbofan engine of any preceding clause, wherein the plurality of fan blades is exactly 14 fan blades.

The turbofan engine of any preceding clause, wherein the RR is within a range of 0.125-0.55.

The turbofan engine of any preceding clause, wherein the RR is within a range of 0.2-0.5.

The turbofan engine of any preceding clause, wherein the RR is within a range of 0.25-0.35.

The turbofan engine of any preceding clause, wherein the FPR at the static sea-level takeoff operating condition is within a range of 1.05-1.5.

The turbofan engine of any preceding clause, wherein the FPR at the static sea-level takeoff operating condition is 1.05-1.15.

The turbofan engine of any preceding clause, wherein the FPR at the static sea-level takeoff operating condition is within a range of 1.20-1.40.

The turbofan engine of any preceding clause, wherein the F_Span at the redline operating condition is within a range of 20,000-200,000 lbf.

The turbofan engine of any preceding clause, wherein the F_Span at the redline operating condition is within a range of 60,000-90,000 lbf.

The turbofan engine of any preceding clause, wherein the F_Span at the redline operating condition is within a range of 100,000-150,000 lbf.

The turbofan engine of any preceding clause, wherein the F_Area is within a range of 3,000-25,000 $in^2$.

The turbofan engine of any preceding clause, wherein the F_Area is within a range of 16,000-18,000 $in^2$.

The turbofan engine of any preceding clause, wherein the F_Area is within a range of 5,500-6,500 $in^2$.

The turbofan engine of any preceding clause, wherein a fan blade tip speed of the fan assembly at a redline operating condition is within a range of 800-1,200 ft/s.

The turbofan engine of any preceding clause, wherein the gearbox comprises a gear ratio of 6:1 to 11:1, and wherein the gear ratio is defined by the first rotational speed divided by the second rotational speed.

The turbofan engine of any preceding clause, wherein the second VPF parameter is within a range of 2.0-5.25 $lbf/in^2$.

The turbofan engine of any preceding clause, wherein the second VPF parameter is within a range of 5.25-30 $lbf/in^2$.

Clause 14: A turbofan engine comprises a fan assembly, a core engine, and a gearbox. The fan assembly includes a plurality of variable pitch fan blades, a first VPF parameter, and a second VPF parameter. The first VPF parameter is defined by a fan blade radius ratio (RR) divided by a fan pressure ratio (FPR) at a static sea-level takeoff operating condition. The second VPF parameter is defined by a bearing spanwise force (F_Span) at a redline operating condition measured in pounds force divided by a fan area (F_Area) measured in square inches. The first VPF parameter is within a range of 0.10 to 0.40, and the second VPF parameter is within a range of 5.25-30 $lbf/in^2$. The core engine includes one or more compressor sections and one or more turbine sections. The gearbox includes an input and an output. The input is coupled to the one or more turbine sections of the core engine and comprises a first rotational speed, and the output is coupled to the fan assembly and has a second rotational speed, which is less than the first rotational speed.

The turbofan engine of any preceding clause, further comprising a linear actuated pitch change mechanism coupled to the fan assembly and configured for adjusting a pitch of the plurality of variable pitch fan blades.

The turbofan engine of any preceding clause, wherein the plurality of fan blades is 12-16 fan blades.

The turbofan engine of any preceding clause, wherein the plurality of fan blades is 12-14 fan blades.

The turbofan engine of any preceding clause, wherein the RR is within a range of 0.125-0.55.

The turbofan engine of any preceding clause, wherein the RR is within a range of 0.2-0.5.

The turbofan engine of any preceding clause, wherein the RR is within a range of 0.25-0.35.

The turbofan engine of any preceding clause, wherein the FPR at the static sea-level takeoff operating condition is within a range of 1.05-1.5.

The turbofan engine of any preceding clause, wherein the FPR at the static sea-level takeoff operating condition is within a range of 1.05-1.15.

The turbofan engine of any preceding clause, wherein the FPR at the static sea-level takeoff operating condition is within a range of 1.2-1.4.

The turbofan engine of any preceding clause, wherein the F_Span at the redline operating condition is within a range of 20,000-200,000 lbf.

The turbofan engine of any preceding clause, wherein the F_Span at the redline operating condition is within a range of 140,000-183,000 lbf.

The turbofan engine of any preceding clause, wherein the F_Span at the redline operating condition is within a range of 50,000-75,000 lbf.

The turbofan engine of any preceding clause, wherein the F_Area is within a range of 3,500-18,000 $in^2$.

The turbofan engine of any preceding clause, wherein the F_Area is within a range of 15,000-18,000 $in^2$.

The turbofan engine of any preceding clause, wherein the F_Area is within a range of 4,000-5,500 $in^2$.

The turbofan engine of any preceding clause, wherein a fan blade tip speed of the fan assembly at a redline operating condition is within a range of 800-950 ft/s.

The turbofan engine of any preceding clause, wherein the gearbox comprises a gear ratio of 4.5:1 to 12:1.

The turbofan engine of any preceding clause, wherein the first VPF parameter is within a range of 0.10 to 0.25.

The turbofan engine of any preceding clause, wherein the first VPF parameter is within a range of 0.25 to 0.40.

The turbofan engine of any preceding clause, further comprising a third stream.

Clause 15: A variable pitch fan assembly for a turbofan engine can be provided. The variable pitch fan assembly includes a plurality of variable pitch fan blades, a fan blade radius ratio (RR), a fan pressure ratio (FPR) at a static sea-level takeoff operating condition, a bearing spanwise force (F_Span) at a redline operating condition measured in pounds force, and a fan area (F_Area) measured in square inches. The variable pitch fan assembly is configured such that the RR divided by the FPR is within a range of 0.10-0.25 and the F_Span divided by the F_Area is within a range of 2.0-30.0 $lbf/in^2$.

The variable pitch fan assembly of any preceding clause, wherein the F_Span divided by the F_Area is within a range of 2-5.25 lbf/in$^2$.

The variable pitch fan assembly of any preceding clause, wherein the F_Span divided by the F_Area is within a range of 5.25-30 lbf/in$^2$.

Clause 16: A variable pitch fan assembly for a turbofan engine can be provided. The variable pitch fan assembly includes a plurality of variable pitch fan blades, a fan blade radius ratio (RR), a fan pressure ratio (FPR) at a static sea-level takeoff operating condition, a bearing spanwise force (F_Span) at a redline operating condition measured in pounds force, and a fan area (F_Area) measured in square inches. The variable pitch fan assembly is configured such that the RR divided by the FPR is within a range of 0.10-0.40 and the F_Span divided by the F_Area is within a range of 5.25-30.0 lbf/in$^2$.

The variable pitch fan assembly of any preceding clause, wherein the RR divided by the FPR is within a range of 0.1-0.25.

The variable pitch fan assembly of any preceding clause, wherein the RR divided by the FPR is within a range of 0.25-0.40.

The variable pitch fan assembly of any preceding clause, wherein the fan blades are configured to be used with an unducted engine.

The variable pitch fan assembly of any preceding clause, wherein the fan blades are configured to be used with an engine comprising a third stream.

Clause 17: A turbofan engine comprising a fan assembly, a vane assembly, a core engine, and a gearbox. The fan assembly includes a plurality of variable pitch fan blades, a first VPF parameter, and a second VPF parameter. The first VPF parameter is within a range of 0.10-0.40 and is defined by a fan blade radius ratio (RR) divided by a fan pressure ratio (FPR) at a static sea-level takeoff operating condition. The second VPF parameter 1-30 lbf/in$^2$ and is defined by a bearing spanwise force (F_Span) at a redline operating condition measured in pounds force divided by a fan area (F_Area) measured in square inches. The vane assembly includes a plurality of vanes disposed aft of the plurality of variable pitch fan blades. The core engine includes one or more compressor sections and one or more turbine sections. The gearbox includes an input and an output. The input is coupled to the one or more turbine sections of the core engine and comprises a first rotational speed, and the output is coupled to the fan assembly and has a second rotational speed which is less than the first rotational speed.

The turbofan engine of any preceding clause, wherein the first VPF parameter is within a range of 0.20 to 0.40.

The turbofan engine of any preceding clause, wherein the first VPF parameter is within a range of 0.15 to 0.30.

The turbofan engine of any preceding clause, wherein the second VPF parameter is within a range of 2-30 lbf/in$^2$.

The turbofan engine of any preceding clause, wherein the second VPF parameter is within a range of 1-5.25 lbf/in$^2$.

The turbofan engine of any preceding clause, wherein the second VPF parameter is within a range of 2-5.25 lbf/in$^2$.

The turbofan engine of any preceding clause, further comprising a pitch change mechanism coupled to the plurality of variable pitch fan blades and configured for adjusting a pitch of the plurality of variable pitch fan blades.

Clause 18: A turbofan engine comprising a fan assembly, a core engine, and a gearbox. The fan assembly includes a plurality of variable pitch fan blades, a first VPF parameter, and a second VPF parameter. The first VPF parameter is within a range of 0.10-0.40 and is defined by a fan blade radius ratio (RR) divided by a fan pressure ratio (FPR) at a static sea-level takeoff operating condition. The second VPF parameter is within a range of 1.0-5.25 lbf/in$^2$ and is defined by a bearing spanwise force (F_Span) at a redline operating condition measured in pounds force divided by a fan area (F_Area) measured in square inches. The core engine includes one or more compressor sections and one or more turbine sections. The gearbox includes an input and an output. The input is coupled to the one or more turbine sections of the core engine and comprises a first rotational speed. The output is coupled to the fan assembly and has a second rotational speed which is less than the first rotational speed.

The turbofan engine of any preceding clause, further comprising a pitch change mechanism coupled to the plurality of variable pitch fan blades and configured for adjusting a pitch of the plurality of variable pitch fan blades.

The turbofan engine of any preceding clause, wherein the pitch change mechanism comprises at least one of a linear motion pitch change mechanism, a rotatory motion pitch change mechanism, a hydraulically driven pitch change mechanism, or an electrically driven pitch change mechanism.

The turbofan engine of any preceding clause, wherein the pitch change mechanism is disposed on an engine centerline axis.

The turbofan engine of any preceding clause, wherein the pitch change mechanism is offset from an engine centerline axis.

The turbofan engine of any preceding clause, wherein the first VPF parameter is within a range of 0.20 to 0.40.

The turbofan engine of any preceding clause, wherein the first VPF parameter is within a range of 0.10 to 0.30.

The turbofan engine of any preceding clause, wherein the first VPF parameter is within a range of 0.15 to 0.30.

The turbofan engine of any preceding clause, wherein the first VPF parameter is within a range of 0.10 to 0.25.

Clause 19: A turbofan engine comprising a fan assembly, a core engine, and a gearbox. The fan assembly includes a plurality of variable pitch fan blades, a first VPF parameter, and a second VPF parameter. The first VPF parameter is within a range of 0.15-0.39 and is defined by a fan blade radius ratio (RR) divided by a fan pressure ratio (FPR) at a static sea-level takeoff operating condition. The second VPF parameter is within a range of 2-27 lbf/in$^2$ and is defined by a bearing spanwise force (F_Span) at a redline operating condition measured in pounds force divided by a fan area (F_Area) measured in square inches. The core engine includes one or more compressor sections and one or more turbine sections. The gearbox includes an input and an output. The input is coupled to the one or more turbine sections of the core engine and comprises a first rotational speed. The output is coupled to the fan assembly and has a second rotational speed which is less than the first rotational speed.

The turbofan engine of any preceding clause, wherein the fan assembly is disposed within a fan case, wherein the first VPF parameter is within a range of 0.2-0.36, and wherein the second VPF parameter is within a range of 5-27 lbf/in$^2$.

The turbofan engine of any preceding clause, wherein the fan assembly is an unducted fan assembly, and wherein the second VPF parameter is within a range of 2-4.6 lbf/in$^2$.

The turbofan engine of any preceding clause, further comprising a pitch change mechanism coupled to the plurality of variable pitch fan blades and configured for adjusting a pitch of the plurality of variable pitch fan blades, and wherein the pitch change mechanism comprises at least one of a linear motion pitch change mechanism, a rotatory motion pitch change mechanism, a hydraulically driven pitch change mechanism, or an electrically driven pitch change mechanism.

The turbofan engine of any preceding clause, wherein the plurality of variable pitch fan blades is 8-20 fan blades.

The turbofan engine of any preceding clause, wherein the plurality of variable pitch fan blades is 12-20 fan blades.

The turbofan engine of any preceding clause, wherein the plurality of variable pitch fan blades is exactly 12 fan blades.

The turbofan engine of any preceding clause, wherein the plurality of variable pitch fan blades is exactly 14 fan blades.

The turbofan engine of any preceding clause, wherein the plurality of variable pitch fan blades is exactly 16 fan blades.

The turbofan engine of any preceding clause, wherein the plurality of variable pitch fan blades is exactly 18 fan blades.

The turbofan engine of any preceding clause, wherein the plurality of variable pitch fan blades is exactly 20 fan blades.

The turbofan engine of any preceding clause, wherein the one or more compressor sections of the core engine comprises a low-pressure compressor having 1-8 stages and a high-pressure compressor comprising 7-11 stages, and wherein the one or more turbine sections of the core engine comprises a high-pressure turbine comprising 1-2 stages and a low-pressure turbine comprising 3-6 stages.

The turbofan engine of any preceding clause, wherein the one or more compressor sections of the core engine comprises a low-pressure compressor having 3-5 stages and a high-pressure compressor comprising 9-10 stages, and wherein the one or more turbine sections of the core engine comprises a high-pressure turbine comprising 2 stages and a low-pressure turbine comprising 3-4 stages.

The turbofan engine of any preceding clause, wherein the one or more turbine sections of the core engine comprises a high-pressure turbine comprising exactly 2 stages and a low-pressure turbine comprising exactly 3 stages.

The turbofan engine of any preceding clause, wherein the one or more turbine sections of the core engine comprises a high-pressure turbine comprising exactly 2 stages and a low-pressure turbine comprising exactly 4 stages.

The turbofan engine of any preceding clause, wherein the one or more compressor sections of the core engine comprises a high-pressure compressor comprising exactly 8 stages.

The turbofan engine of any preceding clause, wherein the one or more compressor sections of the core engine comprises a high-pressure compressor comprising exactly 9 stages.

The turbofan engine of any preceding clause, wherein the one or more compressor sections of the core engine comprises a high-pressure compressor comprising exactly 10 stages.

The turbofan engine of any preceding clause, wherein the one or more compressor sections of the core engine comprises a high-pressure compressor comprising exactly 11 stages.

The turbofan engine of any preceding clause, wherein the RR is within a range of 0.16-0.48.

The turbofan engine of any preceding clause, wherein the RR is within a range of 0.16-0.30.

The turbofan engine of any preceding clause, wherein the RR is within a range of 0.25-0.48.

The turbofan engine of any preceding clause, wherein the FPR is within a range of 1.25-1.35.

The turbofan engine of any preceding clause, wherein the FPR is within a range of 1.07-1.08.

The turbofan engine of any preceding clause, wherein the FPR is within a range of 1.07-1.35.

The turbofan engine of any preceding clause, wherein the F_Span is within a range of 37,459-81,293 lbf.

The turbofan engine of any preceding clause, wherein the F_Span is within a range of 36,626-182,593 lbf.

The turbofan engine of any preceding clause, wherein the F_Area is within a range of 4,000-7,000 $in^2$.

The turbofan engine of any preceding clause, wherein the F_Area is within a range of 12,000-25,000 $in^2$.

The turbofan engine of any preceding clause, wherein the F_Area is within a range of 4,000-25,000 $in^2$.

Clause 20: An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array, a plurality of blades arranged in a rearward array, a first VPF parameter, and a second VPF parameter, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an airfoil section having an effective quarter chord point QC; and a positioning line (R) having a length (RL) and extending from the QC to the point P of the unducted fan propulsor at an angle θ measured positive in a counterclockwise direction when the high pressure side of the airfoil section is below the airfoil section when viewed looking from an outboard position towards an inboard position of the wing; wherein $0.07 \leq RL/D \leq 2.0$ and θ is between 187° and 342°, wherein the first VPF parameter of at least one of the unducted fan propulsors is within a range of 0.10-0.40 and is defined by a fan blade radius ratio (RR) divided by a fan pressure ratio (FPR) at a static sea-level takeoff operating condition, and wherein the second VPF parameter of at least one of the unducted fan propulsors is within a range of 1-30 $lbf/in^2$ and is defined by a bearing spanwise force (F_Span) at a redline operating condition measured in pounds force divided by a fan area (F_Area) measured in square inches.

The aircraft of any preceding clause, wherein $0.15 \leq RL/D$.

The aircraft of any preceding clause, wherein $0.35 \leq RL/D$, and preferably RL/D is about 0.72.

The aircraft of any preceding clause, wherein θ is between 198° and 310°, and preferably between 205° and 285°.

The aircraft of any preceding clause, wherein the two or more unducted fan propulsors are configured to operate at a cruise flight Mach $M_0$ of between 0.7 and 0.9, and more preferably between 0.75 and 0.9; or the two or more unducted fan propulsors are configured to propel the aircraft at a cruise flight Mach $M_0$ of between 0.7 and 0.9, and more preferably between 0.75 and 0.85.

The aircraft of any preceding clause, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The aircraft of any preceding clause, wherein the unducted fan propulsor is undermounted to the airfoil with one or more intermediate structures.

The aircraft of any preceding clause, wherein the P of the unducted fan propulsor is variable to accommodate different operating conditions.

The aircraft of any preceding clause, wherein the second VPF parameter of the at least one of the unducted fan propulsors is within a range of 1.0-5.25 lbf/in$^2$.

The aircraft of any preceding clause, wherein the first VPF parameter of at least one of the unducted fan propulsors is within a range of 0.10-0.30.

The aircraft of any preceding clause, wherein the first VPF parameter of at least one of the unducted fan propulsors is within a range of 0.10-0.25.

The aircraft of any preceding clause, wherein the first VPF parameter of at least one of the unducted fan propulsors is within a range of 0.15-0.30.

The aircraft of any preceding clause, wherein the first VPF parameter of at least one of the unducted fan propulsors is within a range of 0.20-0.40.

Clause 21: An aircraft, comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array, a plurality of blades arranged in a rearward array, a first VPF parameter, and a second VPF parameter, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7, wherein the first VPF parameter of the unducted fan propulsor is within a range of 0.10-0.40 and is defined by a fan blade radius ratio (RR) divided by a fan pressure ratio (FPR) at a static sea-level takeoff operating condition, and wherein the second VPF parameter of the fan unducted propulsor is within a range of 1-30 lbf/in$^2$ and is defined by a bearing spanwise force (F_Span) at a redline operating condition measured in pounds force divided by a fan area (F_Area) measured in square inches.

The aircraft of any preceding clause, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The aircraft of any preceding clause, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The aircraft of any preceding clause, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

Clause 22: An aircraft, comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array, a plurality of blades arranged in a rearward array, a first VPF parameter, and a second VPF parameter, wherein one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein $0.065 < RL/D < 1.98$ and θ is between 187° and 340°; and wherein RL/D and θ of the P of the unducted fan propulsor adhere to the following expressions:

$$\frac{RL}{D} + \frac{\left(\sqrt{\begin{array}{l}1.4161*[1.88978*\sin^2(\theta)-0.0875*\\ \cos^2(\theta)+0.477*\sin(\theta)*\cos(\theta)]\end{array}} + 1.764*\sin(\theta)+0.19146*\cos(\theta)\right)}{1.96*\sin^2(\theta)+0.7225*\cos^2(\theta)} >$$

$$0 + ((-\sqrt{}(1.4161*[1.88978*\sin\hat{}2(\theta)-0.0875*\cos\hat{}2(\theta)+0.477*\sin(\theta)*\cos(\theta)])+1.764*\sin(\theta)+0.19146*\cos(\theta)))/(1.96*\sin\hat{}2(\theta)+0.7225*\cos\hat{}2(\theta)) < 0,$$

wherein the first VPF parameter of the unducted fan propulsor is within a range of 0.10-0.40 and is defined by a fan blade radius ratio (RR) divided by a fan pressure ratio (FPR) at a static sea-level takeoff operating condition, and wherein the second VPF parameter of the fan unducted propulsor is within a range of 1-30 lbf/in$^2$ and is defined by a bearing spanwise force (F_Span) at a redline operating condition measured in pounds force divided by a fan area (F_Area) measured in square inches.

The aircraft of any preceding clause, wherein the second VPF parameter of the unducted fan propulsor is within a range of 1.0-5.25 lbf/in$^2$.

The aircraft of any preceding clause, wherein the first VPF parameter of at least one of the unducted fan propulsors is within a range of 0.10-0.30.

Clause 23: An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array, a plurality of blades arranged in a rearward array, and a first VPF parameter, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an airfoil section having an effective quarter chord point QC; and a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°, wherein the first VPF parameter of at least one of the unducted fan propulsors is within a range of 0.10-0.40 and is defined by a fan blade radius ratio (RR) divided by a fan pressure ratio (FPR) at a static sea-level takeoff operating condition.

The aircraft of any preceding clause, wherein the first VPF parameter of at least one of the unducted fan propulsors is within a range of 0.10-0.30.

The aircraft of any preceding clause, wherein the first VPF parameter of at least one of the unducted fan propulsors is within a range of 0.10-0.25.

The aircraft of any preceding clause, wherein the first VPF parameter of at least one of the unducted fan propulsors is within a range of 0.15-0.30.

The aircraft of any preceding clause, wherein the first VPF parameter of at least one of the unducted fan propulsors is within a range of 0.20-0.40.

Clause 24: An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array, a plurality of blades arranged in a rearward array, and a second VPF parameter, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an airfoil section having an effective quarter chord point QC; and a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°, wherein the second VPF parameter of at least one of the unducted fan propulsors is within a range of 1-30 lbf/in$^2$ and is defined by a bearing spanwise force (F_Span) at a redline operating condition measured in pounds force divided by a fan area (F_Area) measured in square inches.

The aircraft of any preceding clause, wherein the second VPF parameter of the at least one of the unducted fan propulsors is within a range of 1.0-5.25 lbf/in$^2$.

Clause 25: An aircraft, comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array, a plurality of blades arranged in a rearward array, and a first VPF parameter, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7, wherein the first VPF parameter of the unducted fan propulsor is within a range of 0.10-0.40 and is defined by a fan blade radius ratio (RR) divided by a fan pressure ratio (FPR) at a static sea-level takeoff operating condition.

The aircraft of any preceding clause, wherein the first VPF parameter of at least one of the unducted fan propulsors is within a range of 0.10-0.30.

The aircraft of any preceding clause, wherein the first VPF parameter of at least one of the unducted fan propulsors is within a range of 0.10-0.25.

The aircraft of any preceding clause, wherein the first VPF parameter of at least one of the unducted fan propulsors is within a range of 0.15-0.30.

The aircraft of any preceding clause, wherein the first VPF parameter of at least one of the unducted fan propulsors is within a range of 0.20-0.40.

Clause 26: An aircraft, comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array, a plurality of blades arranged in a rearward array, and a second VPF parameter, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7, wherein the second VPF parameter of the fan unducted propulsor is within a range of 1-30 lbf/in$^2$ and is defined by a bearing spanwise force (F_Span) at a redline operating condition measured in pounds force divided by a fan area (F_Area) measured in square inches.

The aircraft of any preceding clause, wherein the second VPF parameter of the at least one of the unducted fan propulsors is within a range of 1.0-5.25 lbf/in$^2$.

Clause 27: An aircraft, comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array, a plurality of blades arranged in a rearward array, and a first VPF parameter, wherein one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein $0.065<RL/D<1.98$ and θ is between 187° and 340°; and wherein RL/D and θ of the P of the unducted fan propulsor adhere to the following expressions:

$$\frac{RL}{D}+\frac{\left(\sqrt{\begin{matrix}1.4161*[188978*\sin^2(\theta)-00875*\\ \cos^2(\theta)+0477*\sin(\theta)*\cos(\theta)]\end{matrix}}+1.764*\sin(\theta)+0.19146*\cos(\theta)\right)}{1.96*\sin^2(\theta)+0.7225*\cos^2(\theta)}>$$

$$0+((-\sqrt{}(1.4161*[1.88978*\sin\hat{}2(\theta)-0.0875*\cos\hat{}2(\theta)+0.477*\sin(\theta)*\cos(\theta)])+1.764*\sin(\theta)+0.19146*\cos(\theta)))/(1.96*\sin\hat{}2(\theta)+0.7225*\cos\hat{}2(\theta))<0,$$

wherein the first VPF parameter of the unducted fan propulsor is within a range of 0.10-0.40 and is defined by a fan blade radius ratio (RR) divided by a fan pressure ratio (FPR) at a static sea-level takeoff operating condition.

The aircraft of any preceding clause, wherein the first VPF parameter of at least one of the unducted fan propulsors is within a range of 0.10-0.30.

The aircraft of any preceding clause, wherein the first VPF parameter of at least one of the unducted fan propulsors is within a range of 0.10-0.25.

The aircraft of any preceding clause, wherein the first VPF parameter of at least one of the unducted fan propulsors is within a range of 0.15-0.30.

The aircraft of any preceding clause, wherein the first VPF parameter of at least one of the unducted fan propulsors is within a range of 0.20-0.40.

Clause 28: An aircraft, comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array, a plurality of blades arranged in a rearward array, and a second VPF parameter, wherein one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°; and wherein RL/D and θ of the P of the unducted fan propulsor adhere to the following expressions:

$$\frac{RL}{D}+\frac{\left(\sqrt{\begin{matrix}1.4161*[1.88978*\sin^2(\theta)-0.0875*+\\ \cos^2(\theta)+0.477*\sin(\theta)*\cos(\theta)]\end{matrix}}\;1.764*\sin(\theta)+0.19146*\cos(\theta)\right)}{1.96*\sin^2(\theta)+0.7225*\cos^2(\theta)}>$$

$$0+((-\surd(1.4161*[1.88978*\sin\hat{\ }2(\theta)-0.0875*\cos\hat{\ }2(\theta)+0.477*\sin(\theta)*\cos(\theta)])+1.764*\sin(\theta)+0.19146*\cos(\theta)))/(1.96*\sin\hat{\ }2(\theta)+0.7225*\cos\hat{\ }2(\theta))<0,$$

wherein the second VPF parameter of the fan unducted propulsor is within a range of 1-30 lbf/in$^2$ and is defined by a bearing spanwise force (F_Span) at a redline operating condition measured in pounds force divided by a fan area (F_Area) measured in square inches.

The aircraft of any preceding clause, wherein the second VPF parameter of the at least one of the unducted fan propulsors is within a range of 1.0-5.25 lbf/in$^2$.

The invention claimed is:

1. An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array, a plurality of blades arranged in a rearward array, a first variable pitch fan (VPF) parameter, and a second VPF parameter, wherein only one of the forward and rearward array of blades are variable pitch rotating blades and the variable pitch rotating blades define a maximum outer diameter (D);

a pitch change mechanism coupled to the variable pitch rotating blades, wherein the pitch change mechanism is configured to adjust a pitch of the variable pitch rotating blades;

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an airfoil section having an effective quarter chord point QC; and a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°, wherein the first VPF parameter of the variable pitch rotating blades is within a range of 0.10-0.40 and is defined by a fan blade radius ratio (RR) divided by a fan pressure ratio (FPR) at a static sea-level takeoff operating condition, and wherein the second VPF parameter of the variable pitch rotating blades is in a range from 1.0 to 5.25 lbf/in$^2$ and is defined by a bearing spanwise force (F_Span) at a redline operating condition measured in pounds force divided by a fan area (F_Area) measured in square inches.

2. The aircraft of claim 1, wherein 0.15≤RL/D.

3. The aircraft of claim 1, wherein 0.35≤RL/D, and preferably RL/D is about 0.72.

4. The aircraft of claim 1, wherein θ is between 198° and 310°, and preferably between 205° and 285°.

5. The aircraft of claim 1, wherein the two or more unducted fan propulsors are configured to operate at a cruise flight Mach $M_0$ of between 0.7 and 0.9, and more preferably between 0.75 and 0.9; or the two or more unducted fan propulsors are configured to propel the aircraft at a cruise flight Mach $M_0$ of between 0.7 and 0.9, and more preferably between 0.75 and 0.85.

6. The aircraft of claim 1, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

7. The aircraft of claim 1, wherein the unducted fan propulsor is undermounted to the airfoil with one or more intermediate structures.

8. The aircraft of claim 1, wherein the P of the unducted fan propulsor is variable to accommodate different operating conditions.

9. The aircraft of claim 1, wherein the second VPF parameter of the at least one of the unducted fan propulsors is in a range from 2.0 to 4.6 $lbf/in^2$.

10. The aircraft of claim 1, wherein the first VPF parameter of at least one of the unducted fan propulsors is within a range of 0.10-0.30.

11. The aircraft of claim 1, wherein the first VPF parameter of at least one of the unducted fan propulsors is within a range of 0.10-0.25.

12. The aircraft of claim 1, wherein the first VPF parameter of at least one of the unducted fan propulsors is within a range of 0.15-0.30.

13. The aircraft of claim 1, wherein the first VPF parameter of at least one of the unducted fan propulsors is within a range of 0.20-0.40.

14. An aircraft, comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array, a plurality of blades arranged in a rearward array, a first variable pitch fan (VPF) parameter, and a second VPF parameter, wherein only one of the forward and rearward array of blades are variable pitch rotating blades and the variable pitch rotating blades define a maximum outer diameter (D);

a pitch change mechanism coupled to the variable pitch rotating blades, wherein the pitch change mechanism is configured to adjust a pitch of the variable pitch rotating blades;

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counterclockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7, wherein the first VPF parameter of the variable pitch rotating blades is within a range of 0.10-0.40 and is defined by a fan blade radius ratio (RR) divided by a fan pressure ratio (FPR) at a static sea-level takeoff operating condition, and wherein the second VPF parameter of the variable pitch rotating blades is in a range from 1.0 to 5.25 $lbf/in^2$ and is defined by a bearing spanwise force (F_Span) at a redline operating condition measured in pounds force divided by a fan area (F_Area) measured in square inches.

15. The aircraft of claim 14, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

16. The aircraft of claim 14, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

17. The aircraft of claim 14, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

18. An aircraft, comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array, a plurality of blades arranged in a rearward array, a first variable pitch fan (VPF) parameter, and a second VPF parameter, wherein one of the forward and rearward array of blades are variable pitch rotating blades and the variable pitch rotating blades define a maximum outer diameter (D);

a pitch change mechanism coupled to the variable pitch rotating blades, wherein the pitch change mechanism is configured to adjust a pitch of the variable pitch rotating blades;

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counterclockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°; and wherein RL/D and θ of the P of the unducted fan propulsor adhere to the following expressions:

$$\frac{RL}{D} + \frac{\left(\sqrt{1.4161*[1.88978*\sin^2(\theta)-0.0875*\cos^2(\theta)+0.477*\sin(\theta)*\cos(\theta)]}+1.764*\sin(\theta)+0.19146*\cos(\theta)\right)}{1.96*\sin^2(\theta)+0.7225*\cos^2(\theta)} >$$

-continued $$0 + ((-\sqrt{}(1.4161*[1.88978*\sin\hat{}2(\theta)-0.0875*\cos\hat{}2(\theta)+0.477*\sin(\theta)*\cos(\theta)])+1.764*\sin(\theta)+0.19146*\cos(\theta)))/(1.96*\sin\hat{}2(\theta)+0.7225*\cos\hat{}2(\theta)) < 0,$$

wherein the first VPF parameter of the variable pitch rotating blades is within a range of 0.10-0.40 and is defined by a fan blade radius ratio (RR) divided by a fan pressure ratio (FPR) at a static sea-level takeoff operating condition, and wherein the second VPF parameter of the variable pitch rotating blades is in a range from 1.0 to 5.25 lbf/in$^2$ and is defined by a bearing spanwise force (F_Span) at a redline operating condition measured in pounds force divided by a fan area (F_Area) measured in square inches.

19. The aircraft of claim 18, wherein the second VPF parameter of the unducted fan propulsor is in a range from 2.0 to 4.6 lbf/in$^2$.

20. The aircraft of claim 18, wherein the first VPF parameter of at least one of the unducted fan propulsors is within a range of 0.10-0.30.

* * * * *